US011492270B2

(12) United States Patent
Curlett et al.

(10) Patent No.: US 11,492,270 B2
(45) Date of Patent: Nov. 8, 2022

(54) APPARATUS, SYSTEMS AND METHODS FOR MANAGEMENT OF RAW WATER AND EMISSIONS UTILIZING HEAT AND/OR PRESSURE ENERGY WITHIN COMBUSTION GAS SOURCES

(71) Applicant: CLEANTEK Industries Inc., Rockyview (CA)

(72) Inventors: Joshua Curlett, Calgary (CA); Hugues Wanlin, Canmore (CA)

(73) Assignee: CLEANTEK INDUSTRIES INC., Rockyview (CA)

( * ) Notice: Subject to any disclaimer, the term of this patent is extended or adjusted under 35 U.S.C. 154(b) by 0 days.

(21) Appl. No.: 17/132,572

(22) Filed: Dec. 23, 2020

(65) Prior Publication Data

US 2021/0114897 A1 Apr. 22, 2021

Related U.S. Application Data

(62) Division of application No. 15/750,664, filed as application No. PCT/CA2016/050929 on Aug. 8, 2016, now abandoned.
(Continued)

(51) Int. Cl.
*C02F 1/16* (2006.01)
*B01D 1/14* (2006.01)
(Continued)

(52) U.S. Cl.
CPC .............. *C02F 1/16* (2013.01); *B01D 1/0058* (2013.01); *B01D 1/0082* (2013.01); *B01D 1/14* (2013.01);
(Continued)

(58) Field of Classification Search
CPC .. C02F 1/008; C02F 1/048; C02F 1/10; C02F 1/12; C02F 1/16; C02F 2101/10;
(Continued)

(56) References Cited

U.S. PATENT DOCUMENTS 2,101,112 A 12/1937 Vicary
2,890,166 A 6/1959 Heinze
(Continued)

FOREIGN PATENT DOCUMENTS

CA 2 531 870 A1 7/2006
CA 2 554 471 A1 8/2007
(Continued)

OTHER PUBLICATIONS

Keister, T., Marcellus Hydrofracture Flowback and Production Wastewater Treatment, Recycle, and Disposal Technologies, Jan. 29, 2010.

*Primary Examiner* — Jonathan Miller
(74) *Attorney, Agent, or Firm* — McGlew and Tuttle, P.C.

(57) ABSTRACT

The invention relates to methods, systems and apparatus for distributed management of raw water and internal combustion engine (ICE) gas emissions generated during industrial operations. One aspect of the invention at least partially utilizes a hot gas air knife to increase or partially increase surface area between a raw water and a hot gas in order to vaporize a proportion of the aqueous phase of the raw water and concentrate contaminants within a residual raw water concentrate. The water vapor generated by the vaporization process may be demisted, discharged directly to the atmosphere or alternatively condensed and captured for use. Another aspect relates to how the liquids and gasses interact to continuously flush the surfaces of the system which may help mitigate scaling issues. The invention may help facilitate rapid transfer of ICE combustion gas particulate and
(Continued)

US 11,492,270 B2

Page 2

ICE combustion gas chemicals onto and into the raw water as it concentrates.

4 Claims, 45 Drawing Sheets

Related U.S. Application Data

(60) Provisional application No. 62/202,663, filed on Aug. 7, 2015.

(51) Int. Cl.
| | |
|---|---|
| B01D 3/34 | (2006.01) |
| F22D 5/00 | (2006.01) |
| B01D 53/92 | (2006.01) |
| C02F 1/10 | (2006.01) |
| B01D 1/30 | (2006.01) |
| E03B 1/04 | (2006.01) |
| B01D 1/00 | (2006.01) |
| B01D 1/16 | (2006.01) |
| B01D 5/00 | (2006.01) |
| B01D 45/08 | (2006.01) |
| B01D 45/16 | (2006.01) |
| C02F 1/00 | (2006.01) |
| C02F 1/04 | (2006.01) |
| C02F 1/12 | (2006.01) |
| C02F 101/10 | (2006.01) |
| C02F 101/30 | (2006.01) |
| C02F 101/32 | (2006.01) |
| C02F 103/10 | (2006.01) |
| B01D 47/06 | (2006.01) |

(52) U.S. Cl.
CPC .............. *B01D 1/16* (2013.01); *B01D 1/30* (2013.01); *B01D 1/305* (2013.01); *B01D 3/346* (2013.01); *B01D 5/0003* (2013.01); *B01D 5/006* (2013.01); *B01D 45/08* (2013.01); *B01D 45/16* (2013.01); *B01D 53/92* (2013.01); *C02F 1/008* (2013.01); *C02F 1/048* (2013.01); *C02F 1/10* (2013.01); *C02F 1/12* (2013.01); *E03B 1/041* (2013.01); *F22D 5/00* (2013.01); *B01D 47/06* (2013.01); *C02F 2101/10* (2013.01); *C02F 2101/301* (2013.01); *C02F 2101/32* (2013.01); *C02F 2103/10* (2013.01); *C02F 2209/38* (2013.01); *C02F 2303/22* (2013.01)

(58) Field of Classification Search
CPC ............ C02F 2101/301; C02F 2101/32; C02F 2103/10; C02F 2209/38; C02F 2303/22; B01D 1/0058; B01D 1/0082; B01D 1/14; B01D 1/16; B01D 1/30; B01D 1/305; B01D 1/346; B01D 5/0003; B01D 5/006; B01D 45/08; B01D 45/16; B01D 53/92; B01D 47/06; E03B 1/041; F22D 5/00
See application file for complete search history.

(56) References Cited

U.S. PATENT DOCUMENTS

| | | | |
|---|---|---|---|
| 3,116,348 A | 12/1963 | Walker | |
| 3,350,076 A | 10/1967 | Crommelin, Jr. | |
| 3,517,485 A | 6/1970 | Dell'Agnese et al. | |
| 3,601,374 A | 8/1971 | Wheeler | |
| 3,648,440 A | 3/1972 | Egan | |
| 3,761,065 A | 9/1973 | Rich et al. | |
| 4,375,439 A | 3/1983 | Hegemann et al. | |
| 4,478,616 A | 10/1984 | Järvenpää | |
| 4,668,441 A | 5/1987 | Hess et al. | |
| 5,259,931 A | 11/1993 | Fox | |
| 5,573,895 A | 11/1996 | Komatsu et al. | |
| 5,770,019 A | 6/1998 | Kurematsu et al. | |
| 6,200,428 B1 | 3/2001 | VanKouwenberg | |
| 6,669,839 B2* | 12/2003 | Tipton | E03F 3/02 210/134 |
| 6,746,652 B2 | 6/2004 | Khorzad et al. | |
| 7,442,035 B2 | 10/2008 | Duesel, Jr. et al. | |
| 7,513,972 B2 | 4/2009 | Hart et al. | |
| 7,722,739 B2 | 5/2010 | Haslem et al. | |
| 7,950,464 B2* | 5/2011 | Atencio | G05B 15/02 166/360 |
| 8,066,844 B2 | 11/2011 | Duesel, Jr. et al. | |
| 8,066,845 B2 | 11/2011 | Duesel, Jr. et al. | |
| 8,172,565 B2 | 5/2012 | Duesel, Jr. et al. | |
| 8,282,772 B2 | 10/2012 | Jepson | |
| 8,425,666 B2 | 4/2013 | Batty et al. | |
| 8,568,557 B2 | 10/2013 | Duesel, Jr. et al. | |
| 8,585,869 B1 | 11/2013 | Duesel, Jr. et al. | |
| 8,594,851 B1* | 11/2013 | Smaidris | G05D 9/12 700/282 |
| 8,600,568 B2* | 12/2013 | Smaidris | C02F 1/008 700/282 |
| 8,679,291 B2 | 3/2014 | Duesel, Jr. et al. | |
| 8,741,100 B2 | 6/2014 | Duesel, Jr. | |
| 8,801,897 B2 | 8/2014 | Duesel, Jr. et al. | |
| 8,834,726 B2 | 9/2014 | Keister | |
| 8,852,393 B2 | 10/2014 | Panz et al. | |
| 9,199,861 B2 | 12/2015 | Duesel, Jr. et al. | |
| 9,221,697 B2 | 12/2015 | Keister | |
| 9,296,624 B2 | 3/2016 | Duesel, Jr. et al. | |
| 9,366,479 B2 | 6/2016 | Duesel, Jr. et al. | |
| 9,821,268 B2* | 11/2017 | Touyama | B01D 53/50 |
| 10,697,155 B2* | 6/2020 | McKinney | E03B 1/041 |
| 2003/0066804 A1* | 4/2003 | Tipton | E03F 3/02 210/739 |
| 2004/0045682 A1 | 3/2004 | Liprie | |
| 2005/0069820 A1 | 3/2005 | Nomura | |
| 2008/0251419 A1 | 10/2008 | Stein et al. | |
| 2009/0199972 A1 | 8/2009 | Lakatos et al. | |
| 2009/0294074 A1 | 12/2009 | Forstmanis | |
| 2010/0176064 A1 | 7/2010 | Batty et al. | |
| 2012/0168092 A1 | 7/2012 | Keckler, III et al. | |
| 2013/0075245 A1* | 3/2013 | Frick | B01D 5/006 203/22 |
| 2013/0126102 A1 | 5/2013 | Kitamura et al. | |
| 2014/0014278 A1 | 1/2014 | Duesel, Jr. | |
| 2014/0216033 A1 | 8/2014 | Duesel, Jr. et al. | |
| 2015/0083652 A1* | 3/2015 | Hawks | B01D 3/14 210/198.1 |
| 2016/0258266 A1* | 9/2016 | Frick | B01D 3/007 |
| 2017/0001143 A1* | 1/2017 | Touyama | B01D 53/73 |

FOREIGN PATENT DOCUMENTS

| | | |
|---|---|---|
| CA | 2 751 895 A1 | 3/2011 |
| CA | 2 897 415 A1 | 8/2014 |

* cited by examiner

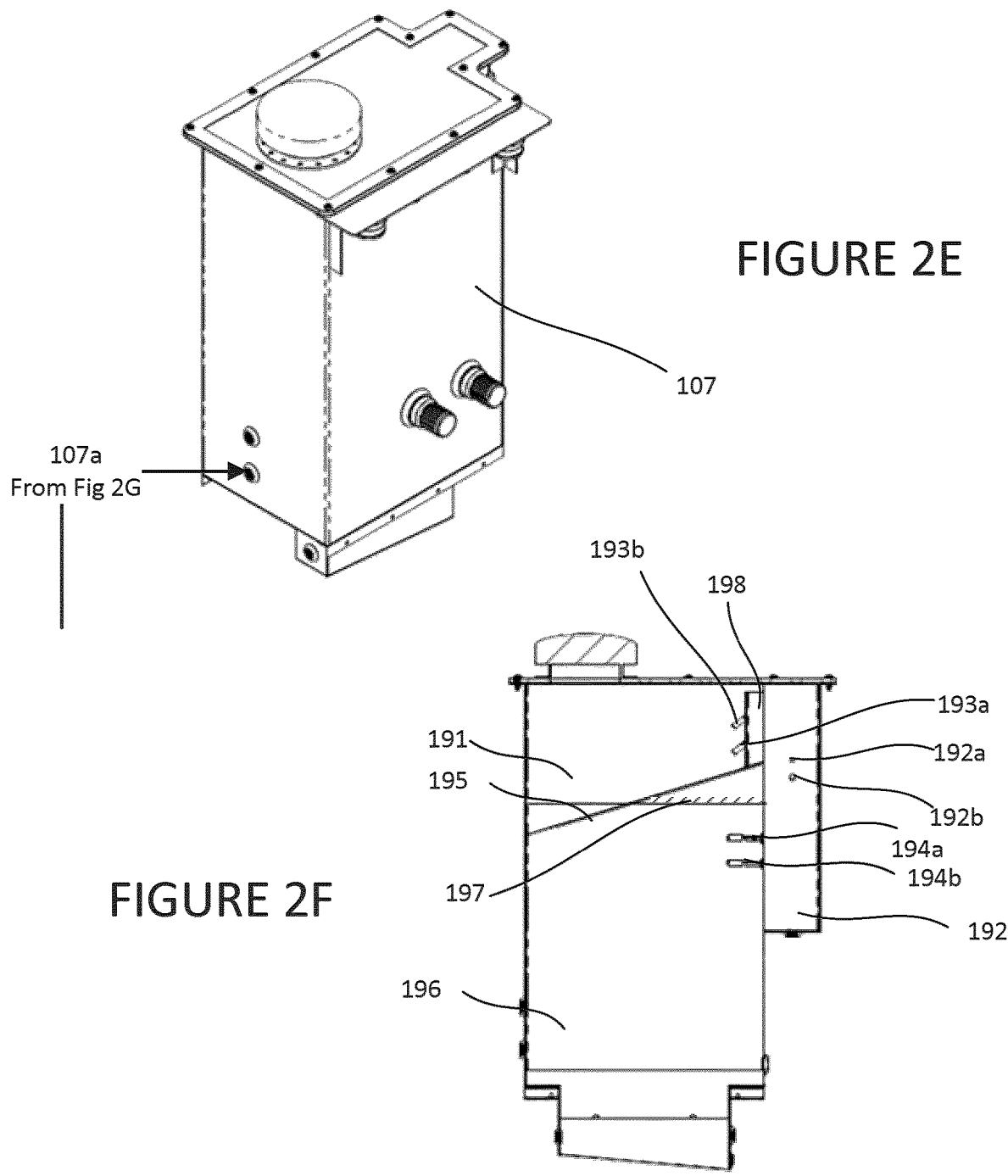

I

II

III

FIGURE 7A
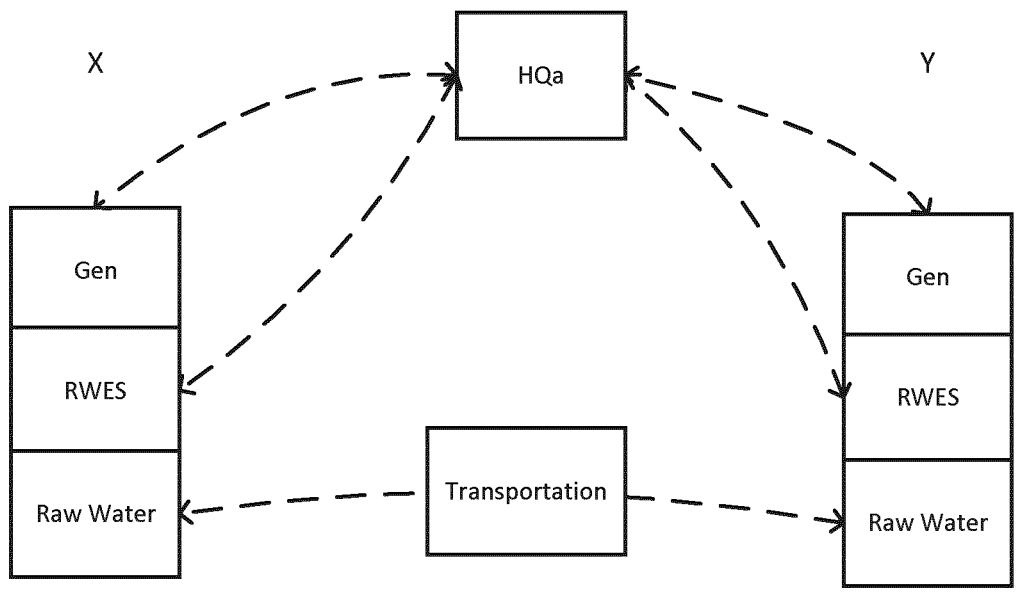
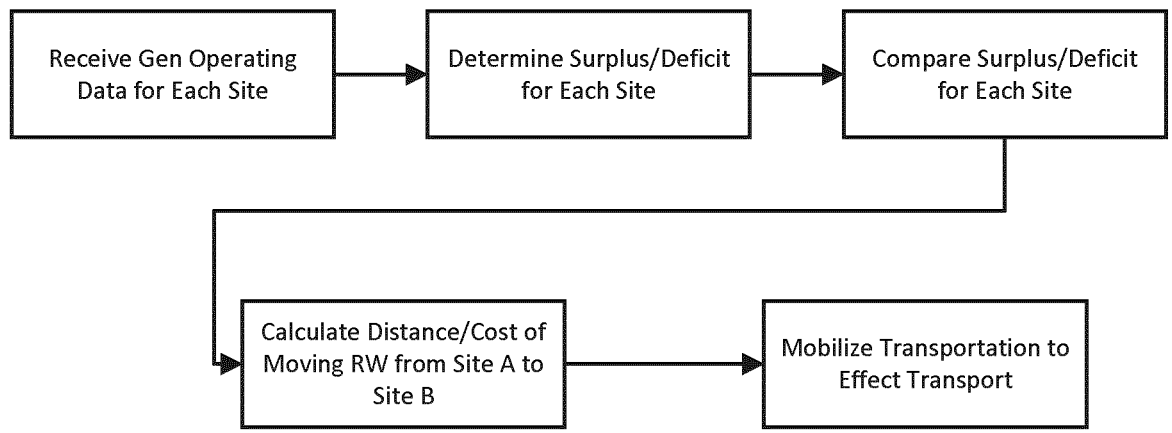
FIGURE 7B

APPARATUS, SYSTEMS AND METHODS FOR MANAGEMENT OF RAW WATER AND EMISSIONS UTILIZING HEAT AND/OR PRESSURE ENERGY WITHIN COMBUSTION GAS SOURCES

CROSS REFERENCE TO RELATED APPLICATIONS

This application is a continuation of pending U.S. application Ser. No. 15/750,664, having a 35 U.S.C. 371 (c) (1), (2) date of Feb. 6, 2018, which is a United States National Phase Application of International Application PCT/CA2016/050929, filed Aug. 8, 2016, and claims the benefit of priority of U.S. provisional application 62/202,663, filed Aug. 7, 2015, the entire contents of which are incorporated herein by reference.

FIELD OF THE INVENTION

The invention relates to methods, systems and apparatus for distributed management of raw water, heat energy within combustion gas and internal combustion engine (ICE) gas heat and pressure generated during industrial operations. Such operations include but are not limited to oilfield drilling, completions and production operations with mobile, semi-permanent and/or permanent processing units. One primary aspect of the invention provides a compact, in-line, all-in-one concentrator, vaporizer, demister, and muffler apparatus. The apparatus can be configured in various embodiments and can provide various advantages to operators seeking to vaporize raw water and/or concentrate contaminants within raw water using waste heat and pressure from such operations including ICE's and other sources. These advantages can include:
  a. minimal new energy input over and above a primary heat source such as an ICE, combustion gas, flare gas or other similar source;
  b. minimal pressure drop related to water vaporization and/or entrainment separation;
  c. maximization use of available waste pressure and/or heat;
  d. low maintenance through the design and operation of a system that minimizes scale, particulate, salts and other build-up;
  e. effective and maximized use of low grade waste heat not typically suitable or accessible;
  f. reduce the release of volatiles and pollutants to the atmosphere;
  g. recovery of condensates/concentrates from raw water;
  h. reduced capital cost of raw water vaporization equipment;
  i. reduced ongoing operating expense due to minimized need for operator oversight;
  j. light weight and compact system for remote or satellite installations closer to a heat source;
  k. light weight and compact system that can be made with plastics allowing rapid mass production and the ability to custom manufacture various embodiments;
  l. a modular system inline system that can be built into either one unit or a cluster of units all working in conjunction with one another;
  m. a monitoring and reporting system for remote management of many distributed systems within a larger grid;
  n. reduced ground level footprint when installed or retrofit to existing oilfield equipment.

One primary aspect of the invention may at least partially or substantially utilize positive pressure waste within distributed ICE exhaust sources as a substantially free energy shearing force to increase or partially increase interfacial surface area between a raw water and an engine exhaust gas for rapid mass and thermal transfer of engine exhaust gas heat into the raw water in order to vaporize a proportion of the aqueous phase of the raw water and concentrate contaminants within a residual raw water concentrate. The water vapor generated by the vaporization process may be demisted, discharged directly to the atmosphere or alternatively condensed and captured for use. The system may help allow many economical and environmentally positive alternatives over historical raw water management techniques and can substantially limit atmospheric discharge of contaminants entrained within ICE combustion gas. Advantageously the invention simultaneously facilitates rapid transfer of combustion gas particulate chemicals into the raw water as it concentrates. Another aspect of the invention is an exhaust diversion system to provide energy within exhaust, i.e. heat and pressure, to a dual fluid interaction zone within the system.

Another aspect of the invention is that due to some of its various features and benefits such as being compact, in-line and/or self-cleaning it can be placed at or near to a waste heat source minimizing the need for ground level footprint. A further aspect of the invention provides an economically viable and environmentally synergistic means of distributed raw water and emissions management to reduce and recycle large volumes of industrial raw water and emissions within localized regions, often remote and stranded from waste management infrastructure, in which both raw water and emissions are generated, are in abundance and are considered waste byproducts of industrial operations. Distributed management of raw water and emissions may be enhanced by networking data from these remote raw water management processing units as a means to ensure that each satellite system in the network can be utilized to its full capacity either by actors within an organization operating within a geographic region or by many organizations operating within a geographic region utilizing each other's raw water processing system. An algorithm may be used as a means to communicate data points to those within the network such as individual system run time, raw water processing rates, available or unused capacity of raw water, re-condensed water, heat, pressure, brine, salt, etc., timing and/or availability of upcoming spare capacity, etc. As described herein part of the novelty of the present invention is its simplicity.

BACKGROUND OF THE INVENTION

There are many examples where vaporization is used to reduce the liquid phase of water solutions containing contaminants for the purpose of concentrating the contaminants for disposal. Often referred to as thermal separation or thermal concentration processes, these processes generally begin with a liquid and end up with a more concentrated but still pump-able concentrate or a dry salt that may be subjected to further processing and/or disposal. In the context of this description, waste water solutions containing dissolved and/or suspended contaminants are referred to as "raw water" or "wastewater". In particular, raw water refers to water solutions containing contaminants, for example, brackish or brine fluid (including sodium, potassium, calcium and other salts) and some particulates. Other contaminants including hydrocarbons (generally C5 and higher), soaps and particulates may also be within the raw water. The concentrations of contaminants within the raw water may range, in the case of salts from about 0 to about 25 wt %, in the case of hydrocarbons from about 0 to about 5 wt %, in the case of soaps from about 0 to about 2 wt %.

Raw water may be production water from a gas or liquid hydrocarbon production facility where the raw water has been separated from a gas or liquid hydrocarbon production stream. In this instance, the raw water may include connate water, connate water salts and particulates together with hydrocarbons. Raw water may also be raw water from drilling operations including cement water, wash water, contaminated lease water, drilling fluid, water from recovered drilling fluids which may include connate water, connate water salts, emulsifiers/soaps, viscosifying agents, hydrocarbons and particulates and others.

As is generally known with aqueous concentrator systems, as water vapor is vaporized, the concentrate progressively comprises increasing percentages of the original contaminants in the solution including the salts, hydrocarbons and particulates. Due to the nature of different contaminants, as the solutions become more concentrated, there has been a need for systems and methods that can effectively manage the solutions as the contaminants become more concentrated.

In the case of dilute solutions containing hydrocarbons, that may include heavy oil, medium oil and light oil fractions, the handling of such solutions must be managed in order to enable operators to collect what might be valuable amounts of these hydrocarbons but also to prevent flammable solutions from being created particularly in locations where heat and oxygen may be present in the concentrator system. For example, a feed or raw water solution with 1% condensate concentration may result in a 10% (or higher) condensate solution over time as water is vaporized from the solution which may represent a sufficiently valuable volume to warrant collection but also that could become a potentially flammable mixture wherein the hydrocarbons should be removed.

Similarly, in the case of a brackish wastewater solution having a 1-2% salt concentration or brine wastewater solutions having a 4-20% salt concentration, the solution will become progressively more concentrated with salt up to a point where the solution becomes fully saturated with the salt and will precipitate from the solution. As a result, there has been a need for systems and methods that can effectively manage concentrated salt solutions that do not lead to scaling within the equipment that will require maintenance and/or precipitates that could cause clogging of lines. Moreover, as the solubility of many salts varies as a function of temperature, there has been a need for concentration systems that can maintain consistent temperatures to minimize precipitation issues that may occur as temperatures vary within a system.

Particulates in a typical wastewater solution may range in size from about 0.2 microns (fine clay or silt particles) to about 500-1,000 microns (sand and gravel particles) and may comprise from about 0 to about 10 wt % of the raw water solution. As with other contaminants, particulates will become more concentrated during the concentration processes. While larger particles are generally easily removed, finer particles can become increasingly problematic within the concentrating solutions as viscosity increases and increasingly larger particles may become suspended in the solution and can lead to scaling and/or plugging of lines. As such, there has been a need for systems and methods that minimize the effect of particulates.

In addition, there has also been a need for a system with the capability to concentrate waste water using waste heat and waste pressure, pushed by mechanical force of engine pistons. These can be generated from remote or stranded industrial operations, such as drilling rig operations, and there has been a need to provide further operational and efficiency advantages over systems that use standalone hydrocarbon (e.g. fuels) and/or electric sources as prime energy inputs and that add to the cost of vaporizing and/or processing raw water.

Further still, there is also a need for a system that is also simultaneously effective in vaporizing water and removing combustion related soot, particulate and combustion chemicals from the combustion gas source of the particular heating source. In other words, heretofore there has been no incentive for mobile treatment of flue gasses on remote or stranded drilling sites because there are local and national exemptions to standard air emission regulations on oil and gas drilling sites related to diesel engine exhaust volume and concentration of discharge within relatively short timeframes. As such, until an economical and functional solution is provided, enabling regulators and operators to insist on change, the cleaning of these collectively large volumes of acid gasses prior to atmospheric discharge will not occur. Accordingly, by marrying the technology for cleaning exhaust gasses with another use such as vaporizing raw water, there is an economic incentive to the operator to take this environmentally responsible action.

In regards to the emissions from drilling rig operations, in recent years as many as 2,000 rigs have been operating in North America each day with each one consuming on average approximately 3,000-9,000 liters per day of diesel fuel within the various power generating machinery. For example, for a typical 500 kW engine-generator set at a drilling site will exhaust 50 to 120 $m^3$/min, 1200 kW produces 273 $m^3$/min, of acid gas exhaust into the environment thereby polluting the environment and wasting the heat and pressure energy contained therein. However, the heat contained within this exhaust is capable of vaporizing up to about 10 cubic meters of water per day depending on average engine load through-out the day. This equates to 95-285 billion cubic meters of uncleaned acid gas discharge from all North American rigs every year and a heat/pressure resource that is otherwise unutilized. As can be imaged when 1200-2500 kW engine-generator sets are used for these operations, the amount of waste heat and waste pressure are much larger and become substantial sources of free prime mover energy input.

Thus, there has also been a need for systems that can reduce the amount of exhaust contaminants that may be released to the atmosphere while at the same time using that heat/pressure resource for reducing the total volumes of contaminated waste water that requiring shipping and/or removal from a drilling rig site, in-ground injection or the like.

Other oilfield operations include heavy oil production through steam injection, including steam assisted gravity drainage (SAGD), and gas production where large quantities of water are utilized within and recovered from heavy oil reservoirs. Water will be recovered from the reservoir with varying contaminants and concentrations of contaminants. For example, steam injection techniques result in the production of mixtures of produced water (containing sodium and calcium salts inter alia) and hydrocarbons (complex mixtures of heavy and light fractions) and particulates (sand, minerals etc.). While the majority of hydrocarbons are removed from this produced water and the majority of water is recycled for steam production a certain volume of produced water is raw water that is contaminated with a combination of salts, hydrocarbons and particulates. These facilities use one to many dozen steam generators, such as Once-Though Steam Generators and Heat-Recovery Steam Generators (HRSG). These generators typically have power outputs ranging from 3 MW to 250 MW. The byproduct of the combustion heat utilized by these systems is a low grade heat that is no longer economically usable by current heat exchange technology and which is vented to atmosphere using large chimney stacks. As one example a 50 MW Steam Generator may have a 2-3 meter diameter flue stack, downstream of an economizer, which releases flue gas to atmosphere with an approximate temperature of 150° C.-200° C. Drawbacks of prior art systems are an inability to utilize this low grade heat. Drawbacks to other prior art systems is they have to bring the heat from 30+ meters up a flue stack to ground level for processing, and by doing so lose more heat. These latter systems although described as compact are not light nor compact enough satellite installation at the top of the flue stack. Further, even if prior art systems were light and compact, they are prone scale buildup within their systems, requiring ground level operator access for ongoing cleaning and maintenance, which results in ongoing, undesirable operational expense.

Similarly, at gas production facilities, gas plants or remote compressor stations, where produced gas is recovered at surface and compressed for delivery to pipelines, connate water is recovered with the gas which is substantially raw water. As noted above, this raw water is also a varying mixture of salts, hydrocarbons and particulates and can be produced in volumes of up to several hundred cubic meters of water per day, per single site. There are a variety of engine types and sizes utilized in oilfield operations. These generators and associated engines can vary greatly, but typically range in size and power ratings from about 500 kW at a drilling rig to about 2500 kW at gas production and compression facilities. Such engines are typically used to generate power and to drive gas compression systems at gas production facilities. Generally, the temperate of the exhaust gas is about 300-700° C., depending on engine type and engine load.

At a drilling rig, engines are typically portable systems that are positioned adjacent to drilling equipment whereas at a gas production facility, the engines and compressors are typically permanent or semi-permanent installations. At each operation, each engine is connected to muffler systems to manage noise associated with the engine. Typically, large muffler systems for example paired to a 2,000 kW engine-generator set are installed in a vertical orientation adjacent to or above the engine which smaller engines for example 500-1200 kW may have a horizontal orientation. Similarly, the temperature of the exhaust gas is about 300-700° C.

Such engines have variable performance characteristics including varying exhaust pressures, exhaust flow rates/speeds, exhaust temperatures and backpressure tolerances. Table 1 show typical performance characteristics for different engine sizes.

TABLE 1

Representative Engine Performance Characteristics (not muffled)

| Engine Power Rating (bhp) | Exhaust Temperature (° C.) @100% Max Load | Exhaust Pipe Diameter (Typical) | Exhaust Flow Rate @100% Max Load | Exhaust Backpressure (max) WC inches (kPa) | Push Power (kW) |
|---|---|---|---|---|---|
| 600-850 | 550 | 5-8" | 112 m³/min | 40" WC (10 kPa) | 19 |
| 1000-1500 | 400-450 | 10-16" | 221 m³/min | 27" WC (7 kPa) | 25 |
| 2300-2500 | 450-500 | 18-22" | 451 m³/min | 10-14" WC (2.5-3.5 kPa) | 19-27 |

As can be seen from Table 1, in many cases as an engine becomes larger it is generally less able to tolerate significant backpressure. As a result, there has been a need for raw water vaporization systems that can be adapted to different engines without adversely affecting the performance of that engine to conduct its primary function at a work site.

More specifically, there has been a need for an ICE Exhaust gas delivery system that provides any one of or a combination of static, control actuated, flow actuated or pressure actuated control systems that directs and allows ICE exhaust to be effectively used to at least partially shear, boil and/or vaporize raw water while ensuring the maximum backpressure limits as seen by the engine are not exceeded. As can be seen in Table 1, the push pressure of an ICE is significant when utilized for the purpose of shearing, vaporizing and as discussed below can also be used as input pressure for an induced cyclone for demisting entrained water droplets from the exhaust gas.

Furthermore, to further enhance the scope of using different heat sources, there has been a need for low pressure combustion gas delivery systems that, as needed, can be enhanced by additional pressure inducing devices (e.g. blowers).

Further still, in order to reduce the capital costs associated with implementing vaporizer systems, there has been a need for compact and relatively light weight vaporizer systems that can be manufactured from plastics whilst operating in hot environments. In addition, to reduce manufacturing costs, such systems can also provide advantages for the installation of vaporizing systems on existing equipment, such as tall chimney stacks. Further, a vaporization and demisting system with non-stick inner surfaces minimizes scale buildup within the system thereby reducing the need for maintenance, as with prior art systems, and allows for remote installation on tall exhaust stack structures.

Further still, in order to improve the efficiency of vaporization, there has been a need for improved combustion gas velocity modifier, stabilizer, manipulator or generator systems, referred to collectively as an "air knife" system designed to utilize the waste pressure within ICE combustion gas for shearing and vaporizing raw water by mixing/interfacing exhaust gases with raw water. Alternatively, in embodiments where there little or no waste pressure is available, an air knife system may be used in conjunction with a blower, rotor, fan or the like in order to assist with shearing and vaporization of raw water. In various other embodiments an air knife system can be used in conjunction with a demisting cyclone system.

Further still, there has been a need for vaporizing systems that in addition to vaporizing raw water are effective as muffler systems for large ICE's. That is, there has been a need for an inline, muffling, self-washing vaporizer that can be placed remotely adjacent to, upstream from or downstream from an existing muffler is desirable.

Further still, there has been a need for vaporizing and concentrating systems that are effective in reducing the build-up of scale within the systems that require maintenance to remove the scale. There is a particular need for such systems where the raw water being vaporized is continuing to be enriched in contaminants that due to the enrichment are particularly susceptible to precipitation within the system. In particular, there has been a need for vaporizing systems that are effectively and efficiently being continually cleaned during operation.

Furthermore, there has also been a need for systems that can reduce the amount of exhaust contaminants that may be released to the atmosphere while at the same time reducing the total volumes of contaminated waste water that requiring shipping and/or removal from an industrial waste generation site.

Furthermore, there has been a need for a concentrically aligned processing vessel wherein key components such as an air knife, a dual fluid mixing chamber and a cyclone demister are concentrically aligned and can be used individually or in combinations with one another. There has also been a need for a concentrically aligned all-in-one vessel wherein the inner surfaces are substantially wetted, cooled and washed during operation. There has been a need for systems that can be used as a single unit as a single larger system configured to a single heat source or comprised of many individual vessels in a cluster or arrayed in various configurations, for example in a row or concentrically around an exhaust stack.

Additionally, there is a need for a system for the management, reporting, distribution and/or controlling of many distributed systems within a grid of systems that allows for feedback to a central processing system wherein processing rates, raw water storage, condensed water storage, combustion gas temperature and pressure, run time, processing volumes and the like are collected and managed.

Furthermore, there has also been a need for systems that effectively manage concentrated salt solutions, either by drying salts so there is substantially zero liquid concentrate discharge or a system that can concentrate a salt solution to just under its maximum saturation point so the salts stay in solutions and can be disposed of by deep well injection.

Further still, there has also been a need for systems that can be readily retrofit to existing oilfield equipment with minimal capital cost, operating cost, footprint, or operational impact.

Examples of past systems include U.S. Pat. No. 8,066,844 which describes a concentrator designed to operate utilizing waste "heat" from land fill gas in which the system is under negative pressure. Applying vacuum pressure on the system is taught due to lack of positive push pressure from the land fill gas heat source. The prior art discusses an alternative use of "heat" only from an engine exhaust system as a preheating method, but does not contemplate the use of the positive pressure resource within engine exhaust. In operation, the effect of the negative pressure applied to the exit of the prior art system would at least in part neutralize the effect of positive engine exhaust pressure. Additionally, as a result of the focus of US '844 on land fill gas waste heat utilization with no or little associated positive pressure, there is no teaching of using the positive pressure within engine exhaust gas to at least partially atomize, shear or break droplets as a means for interfacial surface area generation. Importantly, in the US '844 system, negative pressure at the exit of the system allows a venturi effect upstream of the suction as a means of creating raw water interfacial surface area generation. In other embodiments the US '844 system describes using a blower upstream of the vaporizer section of the system to provide required push pressure needed for the venturi water mixing system. Regarding the latter, a drawback to this system is that new energy input is required, at a cost, in order to shear and mix water with a heat source. Substantial drawbacks to various US '844 systems are the described requirement for cleaning and maintenance of scale and salt deposits due to many wet/dry surfaces within the system. These drawbacks are also associated with a cyclonic demister whose inlet is tangential rather than concentric in that within the cyclone there are substantial dry surfaces that buildup scale, salts, etc. and require much maintenance and cleaning.

Examples of past systems also include those described in U.S. Pat. Nos. 7,722,739, 5,259,931, US Patent Publication 2009/0199972, US Patent Publication 2009/0294074, U.S. Pat. Nos. 5,770,019, 5,573,895, 7,513,972, 2,101,112, and 6,200,428.

Applicant's Canadian patent 2,751,895 (and related co-pending applications based on PCT/CA2010/001440) also describes improved raw water vaporization systems and are incorporated herein by reference in their entirety.

SUMMARY OF THE INVENTION

In accordance with the invention, there is provided methods and apparatus to concentrate waste water contaminants. In a first aspect, the invention provides an adaptor for connecting an engine exhaust source from an associated engine to a raw water vaporization system (RWVS), the adaptor having an exhaust conduit having an engine exhaust connector for connecting the conduit to engine exhaust piping; a combustion gas velocity modifier, stabilizer, manipulator or generator known as an air knife at an outflow end of the exhaust conduit, the exhaust conduit having an outflow orifice adapted for any one of or a combination of constricting, expanding, and/or diverting at least a section of the engine exhaust within the exhaust conduit to within a shearing chamber of a RWVS to effect raw water shearing.

It will be appreciated that vaporization may encompass one or more of: vaporization, evaporation and boiling.

In various embodiments, the outflow orifice has a round, oval, square, irregular, rectangular, duckbill or helical configuration and may constrict exhaust flow or expand exhaust flow.

In one embodiment, the air knife includes a diverter within or adjacent the outflow orifice. The diverter can be manually or automatically adjustable based on gas pressures or PLC control increase or decrease exhaust gas velocity within the outflow orifice.

In one embodiment, the air knife has openings to enable introduction of additional gas to the air knife upstream of the outflow orifice.

In one embodiment a diversion valve is operatively connected to the engine exhaust connector for diverting exhaust under pressure to or from the engine exhaust source to the exhaust conduit and/or the air knife.

In another embodiment, the invention provides a raw water vaporization system (RWVS) comprising: a shearing chamber having: an exhaust connector for connecting the shearing chamber to the engine exhaust source and for introducing engine exhaust under positive pressure into the shearing chamber wherein the positive pressure is derived as a prime or secondary energy input from the operation of the associated engine; the shearing chamber containing a raw water influx system operatively positioned adjacent the exhaust connector to enable rapid interaction between input raw water and engine exhaust for i) increasing interfacial surface area between the input raw water and the engine exhaust gas and ii) rapid heat transfer between the input raw water and the engine exhaust to effect vaporization of water from the raw water and the concentration of raw water contaminants.

In one embodiment, the exhaust connector is adapted for any one of or a combination of constricting, expanding, diverting and focusing engine exhaust within the shearing chamber as a means to utilize the engine exhaust pressure and velocity to effect raw water shearing.

In one embodiment, the shearing chamber includes an atmosphere discharge port for discharging water vapor and exhaust gas to the atmosphere.

In one embodiment, the exhaust connector is an air knife having an exhaust conduit and an outflow orifice operatively connected to the shearing chamber.

In one embodiment, the shearing chamber is vertical and the exhaust connector is at a lower position of the shearing chamber such that exhaust gases rise upwardly within the shearing chamber and the raw water influx system is above the exhaust connector such that raw water enters the shearing chamber above the exhaust connector. In one embodiment, the exhaust connector incudes a lip projecting above a lower surface of the shearing chamber to prevent raw water flow into the exhaust source.

In one embodiment, a deflector is operatively connected above the exhaust connector to deflect raw water away from the exhaust connector to prevent raw water flow into the exhaust source.

In other embodiments, the shearing chamber is angled with respect to a vertical axis and the exhaust connector is at a lower position of the shearing chamber such that exhaust gases rise upwardly within the shearing chamber and the raw water influx system is above the exhaust connector such that raw water enters the shearing chamber above the exhaust connector; the shearing chamber is angled with respect to a vertical axis and wherein the exhaust connector is at an upper position of the shearing chamber such that exhaust gases flow downwardly within the shearing chamber and the raw water influx system is below the exhaust connector such that raw water enters the shearing chamber below the exhaust connector; or the shearing chamber is horizontal and the exhaust connector and raw water influx system are substantially at the same height with respect to each other.

In one embodiment, the RWVS includes a controller operatively connected to i) a water pump operatively connected to a raw water conduit, the water pump for pumping raw water to the raw water influx system and ii) at least one thermocouple operatively connected to the shearing chamber for measuring a first temperature of gases exiting the shearing chamber and wherein the controller increases flow of raw water to the shearing chamber if the first temperature is above a first threshold and decreases the flow of raw water to the shearing chamber if the first temperature is below a second threshold. In one embodiment, the first threshold is 100° C. and the second threshold is 50° C. In other embodiments the first threshold is between 90° C. and 120° C. and the second threshold is between 65° C. and 90° C.

In another aspect, the invention provides a vaporization chamber (also referred to as a dual fluid reactor (DFR)) having a shearing chamber having a raw water influx system for operative connection to an engine exhaust pressure and temperature source to enable rapid interaction between input raw water and engine exhaust for i) increasing interfacial surface area between the input raw water and the engine exhaust gas ii) rapid heat transfer between the input raw water and the engine exhaust to effect vaporization of water from the raw water and the concentration of raw water contaminants iii) washing of the shearing chamber inner surfaces and/or iv) effective noise suppression when a engine exhaust source is conveying pressurized engine exhaust into the shearing chamber.

In one embodiment, the shearing chamber is adapted to receive engine exhaust from an associated engine at substantially the same pressure and temperature of the engine exhaust exiting the associated engine.

In one embodiment, at least one surface within a combination, 2-in-1 shearing chamber and demister imparts a centrifugal force to the exhaust gas and water vapor to enable entrained water droplets to impinge and coalesce on inner surfaces of the 2-in-1 vessel to effect demisting of exhaust gas and water vapor prior to release to the atmosphere.

In another aspect, the invention provides a raw water vaporization system comprising: an exhaust delivery system configured with a valve mechanism to maximize availability of exhaust pressure and flow, a raw water flood chamber for containing a volume of raw water; an engine exhaust inlet positioned below a level of raw water within the raw water flood chamber enabling engine exhaust under pressure to impact and rise through the raw water to enable rapid interaction between input raw water and engine exhaust for i) increasing interfacial surface area between the raw water and the engine exhaust gas and ii) rapid heat transfer between the raw water and the engine exhaust to effect vaporization of water from the raw water and the concentration of raw water contaminants.

In one embodiment, the raw water flood chamber includes at least one overflow outlet operatively positioned above the engine exhaust inlet and wherein engine exhaust pressure elevates raw water within the raw water flood chamber towards an overflow outlet where raw water will flow out an overflow outlet if the engine exhaust is above a threshold pressure.

In one embodiment, the difference in height between the engine exhaust inlet and the overflow outlet is less than a height that exceeds an allowable backpressure of the engine.

In one embodiment, the engine exhaust inlet diverts engine exhaust in a downward direction at the point of impact with the raw water.

In one embodiment, the raw water flood chamber includes at least two overflow outlets operatively positioned above the engine exhaust inlet and each overflow outlet can be opened or closed to control the level of raw water within the flood chamber and the backpressure.

In one embodiment, the raw water flood chamber includes an overflow outlet having an adjustable height within the raw water flood chamber.

In another aspect, the invention provides a centrifugal demisting apparatus having: a frustoconical drum having a first smaller outer diameter at an inlet end and a larger outer diameter at an outlet end, the frustoconcial drum having an inner surface for imparting centrifugal forces on a mixture of exhaust gas, water vapor and entrained water droplets as the mixture transits from the inlet end to the outlet end under pressure to effect impact of entrained water droplets on the inner surfaces and removal of the entrained water droplets from the mixture.

In yet another aspect, the invention provides a centrifugal demisting apparatus having: a chamber having an inlet end and an outlet end and having at least one inner surface within the chamber, at least one surface for imparting centrifugal forces on a mixture of exhaust gas, water vapor and entrained water droplets as the mixture transits from the inlet end to the outlet end to effect impact of entrained water droplets on the inner surfaces and removal of the entrained water droplets from the mixture.

In a further aspect, the invention provides a centrifugal demisting apparatus having: a chamber having an inlet end and an outlet end and having at least one inner surface within the chamber, at least one surface for imparting centrifugal forces on a mixture of exhaust gas, water vapor and entrained water droplets as the mixture transits from the inlet end to the outlet end to effect impact of entrained water droplets on the inner surfaces and removal of the entrained water droplets from the mixture, the inlet and the outlets being concentrically aligned.

In yet another aspect, the invention provides a raw water vaporization system (RWVS) kit having: an adaptor for connecting an engine exhaust source from an associated engine, the adaptor having an exhaust conduit having an engine exhaust connector for connecting the conduit to engine exhaust piping; an air knife at an outflow end having an outflow orifice adapted for connection to a shearing chamber; the shearing chamber having a raw water influx system for operative connection to an engine exhaust pressure and temperature source to enable rapid interaction between input raw water and engine exhaust for i) increasing interfacial surface area between the input raw water and the engine exhaust gas and ii) rapid heat transfer between the input raw water and the engine exhaust to effect vaporization of water from the raw water and the concentration of raw water contaminants when a engine exhaust source is conveying pressurized engine exhaust into the shearing chamber; wherein the adaptor and shearing chamber are independent apparatus operatively connectable to one another.

In one embodiment, the kit includes an independently connectable demisting system for connection to the shearing chamber and/or a raw water storage system independently connectable to the shearing chamber, the raw water storage system having piping for connection to the raw water influx system. In various embodiments, the shearing chamber and demisting chamber are inline with respect to one another and symmetrical about a central axis. In other various embodiments a raw water storage system or raw water concentration system may be part of or connected to either or both of the shearing chamber or demisting system.

In another aspect, the invention provides a method of vaporizing raw water within a shearing chamber for concentrating contaminants within raw water comprising the steps of: a) providing engine exhaust gas heat and pressure to the shearing chamber from an associated engine, the engine exhaust having sufficient heat to transfer heat energy into the raw water to vaporize at least a portion of the raw water and sufficient pressure to contribute to the shearing of raw water within the shearing chamber to smaller droplets; and, b) introducing raw water into the shearing chamber at a pressure sufficient to contribute to shearing of the raw water to smaller droplets in combination with the exhaust gas pressure and wherein in combination with the engine exhaust heat effects vaporization of a least a portion of the raw water. Steps "a" and "b" above may be done in reverse order.

In one embodiment, the raw water is introduced into the engine exhaust in a direction countercurrent to the direction of engine exhaust flow and/or concurrent to the direction of engine exhaust flow and/or between greater than 0 and less than 180 degrees to the direction of engine exhaust flow.

In various embodiments more than one water nozzle or water injection device may be used. In these embodiments various water injection systems may be under various pressures and injected at the same or various angles in relation to the flow of either the exhaust gas or the other water sources. Various water sources may be raw water, raw water concentrate and/or clean water, any of which may be preheated.

In other embodiments, the method includes the step of demisting water vapor from the shearing chamber by imparting a centrifugal force on the gas and entrained water vapor by swirl or cyclone-inducing surface(s) within or adjacent to the shearing chamber and/or the step of demisting water vapor from the shearing chamber by imparting a centrifugal force on the water vapor by cyclone-inducing surfaces within a centrifugal chamber external to the shearing chamber.

In one embodiment, the invention includes the step of monitoring the back pressure on the engine and controlling at least one diversion valve operatively connected between the shearing chamber and the engine exhaust source to maintain the back pressure below a threshold. In various embodiments depending on the size of the ICE, the backpressure threshold may be a maximum of 10"WC, 14"WC, 27"WC or 40"WC. Any valve configured to the exhaust delivery system may vent exhaust to atmosphere, to another vaporizer or to a muffler.

In other embodiments, the invention includes a counter-weighted valve adjustable or configurable to vent excess exhaust pressure, that would exceed an engine specific upper threshold, from the ICE exhaust delivery system to allow maximum delivered exhaust flow and pressure to a vaporization chamber. The counter weighted valve may be decoupled from a main valve controlled by a PLC or may be a separate valve adding redundant safety to the ICE exhaust delivery system. The counter-weighted valve(s) may vent exhaust to atmosphere, to another vaporizer or to a muffler.

In one embodiment, the method includes the step of measuring the temperature and/or pressure of any combustion gas prior to the shearing chamber and based on the combustion gas temperature and/or pressure adjusting the flow rate of water, the combustion gas volume, gas velocity and/or gas pressure delivered to a shearing chamber or an array of shearing chambers configured to one or more combustion gas sources.

In various embodiments, the method includes the step of measuring the temperature of the exhaust gas after exiting the shearing chamber and based on the temperature of the exhaust gas after exiting the shearing chamber adjusting the flow rate of the water or exhaust gas volume, gas velocity and/or gas pressure to the shearing chamber to maintain the temperature of the exhaust gas after exiting the shearing chamber with a range of temperature.

In other embodiments, the flow rate of raw water or combustion gas volume, gas velocity and/or gas pressure into the shearing chamber is controlled to maintain the temperature of exhaust gas exiting the shearing chamber between 50 and 100° C. In other embodiments the first threshold is between 65° C. and 90° C. and the second threshold is between 90° C. and 120° C.

In another embodiment, the engine exhaust is introduced to the shearing chamber under pressure and flow conditions substantially equivalent to the pressure and flow of exhaust gas exiting the associated engine or combustion gas source.

In another embodiment, a combustion gas exhaust is introduced to the shearing chamber under pressure and flow conditions greater than the pressure and flow conditions of the exhaust gas exiting the combustion gas source.

In another aspect, the invention provides a method of concentrating contaminants within a raw water by utilizing engine exhaust as a source of heat and pressure comprising the steps of: a) delivering engine exhaust gas having an exhaust gas temperature to a shearing chamber through an exhaust gas inlet; b) delivering the raw water into the shearing chamber in proximity to the exhaust gas inlet under conditions to optimize the shear impact of the exhaust gas temperature and pressure on the raw water to increase the interfacial surface area between the raw water and the exhaust gas and enable rapid heat transfer from the exhaust gas to the raw water and water vaporization; c) removing a raw water concentrate from the shearing chamber for additional concentration by repeating step b or removal; and d) discharging water vaporized in step b to the atmosphere or to a demisting device.

In another embodiment, the method includes the step of passing water vaporized from step b through a demister prior to atmospheric discharge.

In another embodiment, the method includes the step of delivering the engine exhaust to the shearing chamber through an air knife.

In another aspect, the invention provides a method of providing engine exhaust gas to a raw water vaporization system having a shearing chamber, the raw water vaporization system operatively connected to an engine via a piping system and actuatable valve comprising the steps of: a) actuating the valve to divert exhaust gas to the shearing chamber when i) an exhaust gas backpressure measured within the exhaust gas is less than a first threshold backpressure and ii) in response to an input actuation signal from an operator; and b) actuating the valve to divert exhaust gas from the shearing chamber when an exhaust gas backpressure measured within the exhaust gas is greater than the first threshold backpressure.

In another aspect, the invention provides a method for optimizing raw water vaporization, dry salt creation, brine concentration and/or re-condensed clean water vapor from a plurality of distributed raw water sources amongst a plurality of distributed raw water vaporization systems, combustion gas sources and/or engine exhaust systems, where each raw water vaporization system is operatively connected to a combustion gas source and where each distributed raw water source and distributed raw water vaporization system has a known geographical location, comprising the steps of: a) monitoring a volume of raw water at each raw water source; b) monitoring and/or calculating an amount of available heat at each combustion gas source location and determining a capacity for raw water vaporization, re-condensation of clean water vapor, salt creation and/or brine concentration based on the amount of available heat/energy; c) determining an estimated time of moving raw water, salt, brine and/or re-condensed clean water from a first location to an combustion gas source location, another processing location and/or disposal location; d) utilizing a determined distance or timeframe between the first location and another location and correlating the estimated time to a transportation factor or other resource consumption factor; and/or e) mobilizing transportation equipment to effect raw water, salt, brine and/or re-condensed clean water movement if the estimated time of moving such various resources is below a predetermined threshold when correlated to the transportation factor or other resource consumption factor.

In another aspect, the invention provides a method for distributed management of raw water and combustion gas as a means of maximizing resource utilization comprising the steps of: a) establishing at least one physical or virtual hub to receive raw water or other resource or waste inputs from members, member sites or member sub-sites within a network of raw water generators, resource consumers or waste collectors; b) analyzing location data of the members, member sites or member sub-sites within the network for utilization availability; and c) distributing or redistributing the raw water, condensed clean water, brine concentrate and/or salts to the members, member sites or member sub-sites in a prioritized manner as a means to enable maximum benefit, efficiencies, resource consumption reductions and/or use to those within the network.

In one embodiment, at least one central hub can communicate utilization data to members within a network, group or sub-group.

In another aspect, the invention provides a method of controlling a raw water vaporization system (RWVS) having an engine exhaust source operatively connected to a shearing chamber used to effect vaporization of raw water, the method comprising the steps of: a) monitoring backpressure on the engine exhaust and b) increasing or decreasing raw water flow to the shearing chamber to maintain the backpressure on the engine exhaust below a threshold.

In other aspects, the invention provides a method of controlling a raw water vaporization system (RWVS) having an combustion gas source operatively connected to a shearing chamber, the method comprising the steps of: a) monitoring at least one temperature at an exit of the shearing chamber or exit of demisting device and adjusting raw water flow or raw water pressure, manually or automatically, to the shearing chamber to maintain the at least one temperature within a temperature range.

In other aspects, the invention provides a method of controlling a raw water vaporization system (RWVS) having an combustion gas source operatively connected to a shearing chamber, the method comprising the steps of: a) monitoring at least one combustion gas pressure upstream or downstream of a shearing chamber or demisting device, b) monitoring at least one temperature upstream or downstream of a shearing chamber or demisting device and c) adjusting raw water inlet pressure against at least one water distribution nozzle to enable distribution of a desired average raw water droplet size as the raw water is distributed within the shearing chamber to maintain the at least one temperature within a temperature range. In various embodiments the desired temperature exiting a demisting device is above 65° C. and less than 120° C., preferably less than 90° C.

In another aspect, the invention provides a method of controlling a raw water vaporization system (RWVS) having an engine exhaust source operatively connected to a shearing chamber, the method comprising the steps of: a) monitoring engine output and adjusting engine exhaust flow through an inlet to a shearing chamber to maintain shearing conditions within the shearing chamber.

In another aspect, the invention provides a method of assembling a raw water vaporization system (RWVS) at a remote site having an engine and engine exhaust piping, the method comprising the steps of: a) configuring an adaptor as defined above to the exhaust source b) attaching a vaporization chamber as defined above to the adaptor; and c) attaching a raw water supply to the vaporization chamber.

According to a further aspect, there is provided a raw water vaporization system (RWVS) comprising:
a vaporization chamber comprising interior walls and a deflector plate;
at least one raw water nozzle configured to introduce raw water into the chamber;
a combustion gas conduit having a directed outflow orifice configured to direct combustion gas into the raw water ejected from the raw water nozzle so as to vaporize a portion of the raw water and to drive the remaining raw water portion into a deflector plate and/or onto the inner walls of the vaporization chamber;
wherein the deflector plate is configured to deflect at least a portion of the raw water flow from the deflector plate along the surface of the interior walls of the chamber.

The chamber and directed outflow orifice of the hot gas conduit may be substantially circularly symmetric.

The deflector plate may be configured to allow at least a portion of the raw water flow to drain from the vaporization chamber away from the vessel and/or into a demisting device.

The deflector plate may be configured to be at the base of the vaporization chamber and the hot gas outflow orifice is configured to introduce hot gas into the top of the chamber.

The chamber may be a cylinder. The chamber may be 18-24" high and 24" in diameter)

The outflow orifice may be formed from a hollow cone.

The raw water/gas mixture within the chamber may be in the form of a toroid.

The RWVS may comprise a rotational-flow inducer positioned below the deflector to induce an axially rotational motion to raw water draining from the chamber. The rotational-flow inducer may comprise a stator with angled blades. The rotational-flow inducer may comprise an actively or passively driven rotor.

According to a further aspect, there is provided a raw water vaporization system (RWVS) comprising:
a shearing chamber;
a raw water nozzle configured to introduce raw water into the chamber;
a hot gas conduit having an air knife at an outflow end of the hot gas conduit, the air knife configured to direct at least a portion of the engine exhaust within the exhaust conduit into the raw water flow inside the shearing chamber to effect raw water shearing.

The air knife may be configured to induce a combustion gas speed within the chamber of between 40 m/s and 100 m/s.

The air knife may comprise a hollow cone or a full cone

The air knife may be comprised of a cylindrical or frustoconical shape.

The RWVS may comprise a control system configured to control the air knife to maintain gas flow velocity from the air knife within a threshold range.

An RWVS may comprise an all-in-one concentrically aligned air knife, vaporization chamber and centrifugal demisting device, the RWVS configured to a combustion gas source wherein the pressure of the gas applied through the system is distributed between raw water shearing forces and forces need for the demisting device. In various embodiments the pressure may be generally applied ⅔ to water shearing and ⅓ to demisting cyclone. In other embodiments substantially most or all of the available or generated gas pressure is applied to a demisting cyclone and wherein the raw water shearing force is derived at least partially from raw water pump pressure acting against one or more water distribution nozzles. In any of these embodiments the gas pressure may be derived from a stand-alone ICE, from a stand-alone blower acting alone, a blower providing supplementary pressure in combination with ICE pressure or the exhaust gas from a gas turbine. An ICE may have a power in the range of one or more of: 600-850 bhp; 850-1000 bhp; 1000-1500 bhp; 1500-2300 bhp; and 2300-2500 bhp.

The air knife may be considered to be a pressurized air channel containing a series of holes or continuous slots through which pressurized air exits in a laminar flow pattern. The air knife may be straight or curved. The air knife may extend along an axis (e.g. straight or curved axis) and have a restricted lateral dimension. The exit velocity of the pressurized air from the air knife may be one or more of: between 40-50 m/s; between 50-70 m/s; between 70-100 m/s; and greater than 100 m/s.

The air knife may have openings to enable introduction of additional gas to the air knife upstream of the outflow orifice. The additional gas may comprise ambient air (e.g. to increase the water carrying capacity of the gas) or hot gas from an additional hot gas source.

The raw water nozzle may be configured to introduce raw water into the shearing chamber with one or more of: dry fog (<10 μm Volume Mean Diameter—VMD); fine mist (10-100 μm VMD); a fine droplet size (100-200 μm VMD); a medium droplet size (200-350 μm VMD); a coarse droplet size (350-600 μm VMD); a very coarse droplet size (600-900 μm VMD); an extremely coarse droplet size (900-2000 μm VMD); and an ultra coarse droplet size (>2000 μm VMD). In each case, the raw water flow, angle, direction and force should considered in combination with width and velocity of the gas stream its being injected into. It is desirable the chosen design is sufficient to permit raw water to penetrate the gas flow stream to at least 20% of the width/length of the gas flow stream, but preferably 30-100% penetration is preferred. In other words, it is desirable that the impact force between the gas and water streams is sufficient for the water to penetrate the gas stream to enable mixing and, hence, shearing. This improves system efficiency but also enables proper sizing of the chamber, washing of the chamber and the minimization or elimination of any dry spots.

Generally, the higher the raw water pump pressure acting as shearing force on a water nozzle (for a given water flow rate), the smaller the average droplet size. The smaller the average droplet size, the greater the surface area of the droplet in relation to the mass of the droplet. The greater the surface area in relation to droplet mass, the faster thermal energy can transfer from gas into the droplet enabling vaporization of a portion of the droplet. In an example embodiment if there is sufficient waste pressure in engine exhaust to perform the shearing of the raw water so the thermal transfer of combustion gas heat is enabled within a short timeframe and geometric space, then there would be no need to provide input energy to a raw water pump or provide energy input to a blower. In this case the push pressure of the engine mitigates or subsidizes the need for energy inputs. In other example embodiments where there is little or no pressure within a combustion gas source, the overall system can be designed to minimize supplementary energy inputs by balancing how input energy is used for raw water shearing and demisting of water entrainment. For example, an operator may choose to pressurize the raw water with a raw water pump to enable sufficient shearing of raw water thus minimizing the need for gas pressure to do the shearing. In this way input energy required for a blower is minimized and relegated primarily to drive a demisting cyclone. In other embodiments where there is at least partial pressure from a combustion gas source, such as downstream from a muffler, the system can be balanced to minimize energy input needed for blower pressure by at least partially utilizing waste pressure within the combustion gas.

As such, in some embodiments, the shear chamber may be considered to be a vaporization chamber in which a hot gas flow impinges on a raw water flow in order to reduce the size of the raw water droplets. A vaporization chamber may be considered to be a substantially enclosed vessel (with inlets and outlets for liquid and gas) in which heat is transferred from a hot gas to raw water to effect vaporization through vaporization and/or boiling.

After interaction between the raw water from the nozzle and the hot gas, the droplet size may be smaller than the droplets ejected from the nozzle.

The pressure applied to the raw water nozzle may be 30 psi or greater (or 40 psi or greater) for medium to course droplets. Dry fog may be induced by 100-500 psi pump pressure. The pressure may be 10-30 psi for medium to course droplets or under 20 psi for course to ultra-course droplets. As can be understood, various nozzle shapes and pressures can result in varying droplets sizes and the described sizes are not intended to be limiting, but used as examples.

The shearing chamber may be cylindrically shaped.

The width (e.g. diameter) of the chamber is typically less than 36 inches (e.g. around 2-4 feet). The height of the chamber may be between 12-36 inches (e.g. between 1.5 and 2 feet). Larger systems can vary in size and proportion, although it is desirable to limit the chambers inner surface area as much as possible to promote washing and limit dry surfaces within the shearing chamber.

The shearing chamber may comprise a raw water influx system operatively positioned adjacent the gas connector to enable rapid interaction between input raw water and gas for washing the interior surfaces of the vaporization chamber.

The cross-sectional width of the air knife stream may be configured to permit raw water being sprayed or delivered to it, under various pressure and with various average droplet sizes, to penetrate from 20%-100% of the entire width of the gas stream, or cross the gas stream. This may reduce or minimize the volume of space within the vaporization chamber needed for thermal transfer and so facilitates the washing effect within the vaporization chamber.

Regarding monitoring pressure of gases being delivered to the shearing chamber, when using an ICE, the controller helps ensure no overpressure or temperature is applied to the engine while increasing or maximizing heat and pressure used for optimal water vaporization and system washing. The pressure control system may be used to control the valves in the exhaust diversion system to ensure a desired pressure range is maintained.

The control system may comprise a processor and memory. The memory may store computer program code. The processor may comprise, for example, a central processing unit, a microprocessor, an application-specific integrated circuit or ASIC or a multicore processor. The memory may comprise, for example, flash memory, a hard-drive, volatile memory. The computer program may be stored on a non-transitory medium such as a CD.

The system may comprise a release valve upstream from the shearing or vaporization chamber to vent air into the atmosphere (e.g. directly or via a muffler). The release valve may be configured to open to various degrees in response to pressure signal from backpressure at any point in the exhaust circuit. This may be facilitated by enabling any one or all of the following to act upon the valve to open (or partially open) it:
   a counter-weighed stand alone, integrated or decoupled valve for non-automated venting control
   a direct air line from anywhere in the exhaust circuit,
   pressure transmitter signalling a PLC (programmable logic controller) to activate an electric, pneumatic, hydraulic, or other means.

The release valve may comprise a counterweighted vent. The counter-weighed vent valve may be decoupled for passive pressure control. The amount of counterweight or other bias may be tailored to the hot gas source and, in particular, to the tolerance the hot gas source has to overpressure. It will be appreciated that the release valve may open to allow gas to allow a portion of gas to vent without passing through the vaporization chamber whilst a 'control valve' also stays open allowing another portion of gas to travel through the vaporization chamber. If the pressure is even higher, the control valve may be closed to divert all exhaust gasses away from the vaporization chamber and into the atmosphere, either directly or through a muffler.

This configuration may help increase or maximise the use of the exhaust pressure and heat by venting as little as possible away from the air knife. For example, the weighted release valve can have weights associated with a balanced internal valve designed to only vent the minimal portion of over pressure gas. Gas delivery can be further optimized to the air knife when assisted with direct air pressure signal to an electric device that is configured to open the release valve incrementally due to predesignated pressures within the exhaust circuit in order to maintain a maximum pressure within the exhaust circuit. For example if the engine in use is a 2500 bph with a maximum allowable engine back pressure of 14"WC, then by a signal from PLC (programmable logic controller) or direct air pressure from an airline connected to the exhaust pipe closer to the engine and the other end to a small actuator, the actuator can be configured to assist the release valve with incremental opening to allow staged and controlled venting. This may help reduce or minimize the amount of exhaust being vented away from the air knife when the exhaust circuit pressure begins to climb, primarily due to engine load increases. The release valve, for placement inside an exhaust pipe system (e.g. to vent to a muffler) or at the exit of an exhaust pipe (e.g. to vent to atmosphere), may have the following traits or attributes:

(1) ensure low friction on a valve rod or other rotatable fixture that can withstand: high heat, rapid heating and cooling without warping from thermal shock, combustion gas particulate matter;

(2) ensure the placement of the valve within the exhaust pipe and on the bearing rod or similar fixture is optimized to allow a counter weight to open it with pressure and (3) configured with a counterweight or other biasing mechanism (e.g. spring), the bias being adjustable to enable a maximum pressure delivery to the air knife without creating excessive backpressure to the gas source (e.g. chosen engine type per manufacture specification).

These various exhaust delivery systems can be used with an air knife with a fixed cross-sectional orifice or with an air knife configured to actively or passively adjust the gas velocity at the outflow orifice. In other various embodiments or combinations they can be configured to allow a fixed gas volume through an air knife (by venting excess away from the air knife), a fixed pressure within the exhaust system (resulting in variable gas flow through the air knife) or modulated actively or passively to enable other desired combinations.

The RWVS may have a concentric design, and a round water nozzle (hollow or full cone). The water nozzle(s) may self-clean via pneumatic connection or periodic pulsing with air. In addition, portions or the system may be coated with PTFE or other non-stick coatings to help reduce scaling (formation of solid precipitate or other solids on the surfaces of the system).

Regarding controlling or adjusting the air knife, the air knife can be controlled actively or passively. Active control may use a control system with an actuator configured to adjust the air knife based on one or more of user input or sensed variables such as temperature or pressure. Passive control may be implemented by the air knife being spring loaded (or manually set in increments) to manage itself based on backpressure. That is, the back pressure itself may act on the spring to open or close off (or otherwise modify) the cross-sectional opening of the air knife exit orifice. This modulating of cross-sectional orifice in response to gas flow fluctuations and pressure, permits the velocity of the gas being delivered to the vaporization chamber to remain within a narrower band resulting in more predictable gas/water mixing behaviour.

A hollow cone is a geometric shape formed between two complete cones arranged coaxially with a displacement along the axis. It may describe the shape of fluid flow (liquid or gas) in which the fluid flows from a point within an angle range around a particular cone axis. It may also describe a gas conduit formed by placing a solid cone obstruction within a channel.

Regarding the stators described herein, the stator may comprise angled vanes with one or multiple angles surfaces, various channelled configurations or helical configurations to induce rotational motion of gas when pushed or pulled past the stator surfaces.

Regarding the pressure of the gas being supplied to the vaporization chamber, the gas may be introduced to the shearing chamber under pressure and flow conditions substantially equivalent to the pressure and flow of gas exiting the associated gas source. The pressure may be supplied by the gas source itself (e.g. an engine). In other embodiments, the pressure supplied by the gas source may be supplemented by active elements such as a blower for induction or suction. This may be advantageous in embodiments where the hot gas source does not provide pressure (e.g. flares or flames).

In some embodiments there may be no air knife and so gas velocity may be low. In such cases, the water may be mechanically sheared to reduce the droplet size. Mechanical shearing may be effected using higher water pump pressure or by impinging the water flow on a solid surface or through a mesh. In this case where water is atomized and sheared by the water pump, the gas may be cooled by vaporization causing cyclonic demisting takes place.

Some embodiments may use a blower to induce gas flow through the vaporization chamber primarily to reduce the pressure within the demisting chamber to induce cyclonic separation.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIGS. 2E and 2F are a perspective and cross-sectional view respectively of a concentrator tank in accordance with one embodiment of the invention.

FIGS. 2 and 2J are a perspective and plan view showing multiple RWVS's configured to a steam generation stack with multiple outlet fans in accordance with one embodiment of the invention.

FIG. 7A is a schematic diagram showing how a RWVS system may communicate with a headquarters and a headquarters with transportation in accordance with one embodiment of the invention.

FIG. 7B is a flow chart showing the generalized steps to effect mobilization of transportation resources to move raw water in accordance with one embodiment of the invention.

DETAILED DESCRIPTION OF THE INVENTION

Rationale and Introduction

Figure 1:
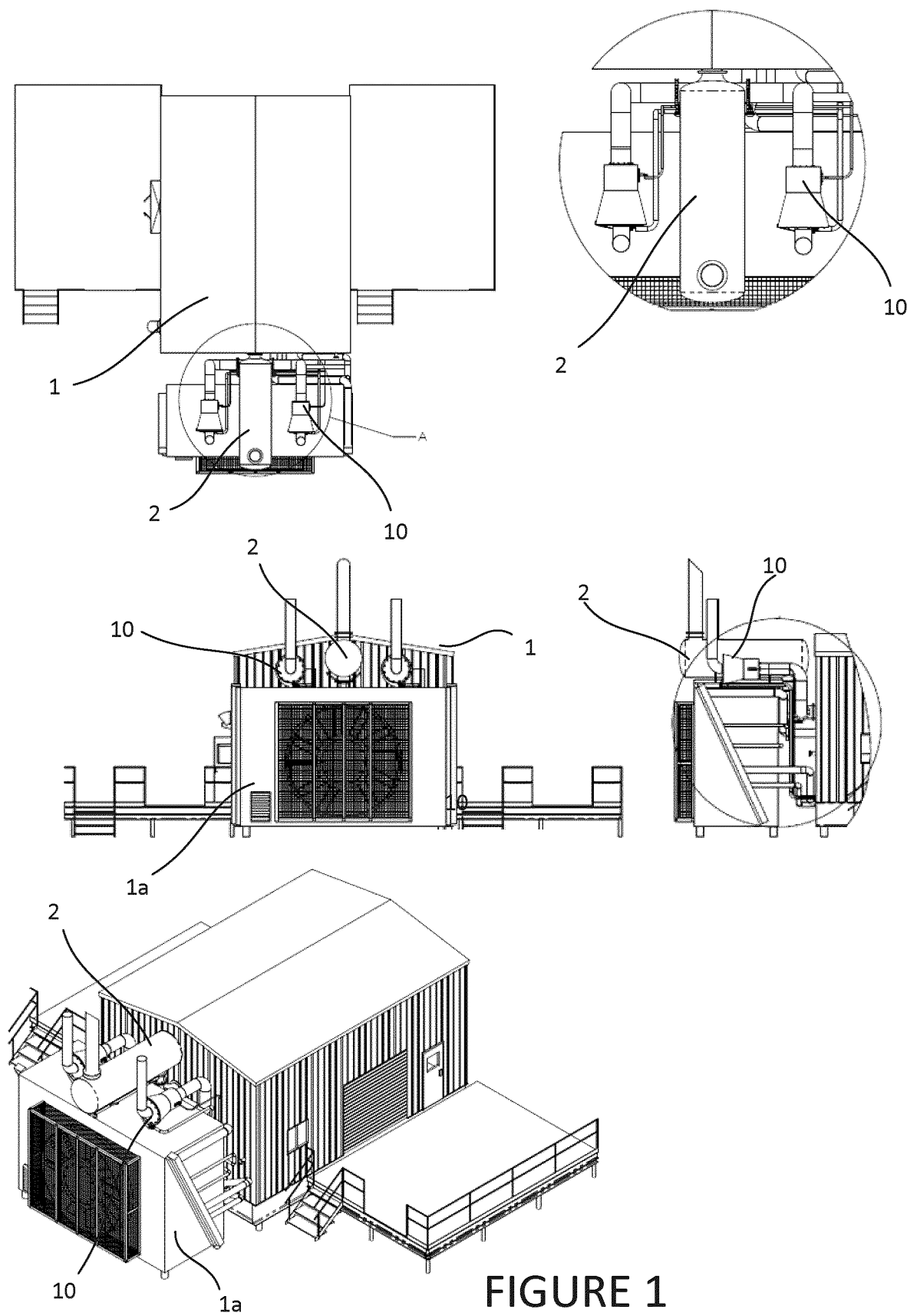
FIG. 1 are plan, isometric, end and detail views of compressor facilities configured with raw water vaporization systems (RWVS) in accordance with one embodiment of the invention.

The subject invention seeks to improve the efficiency of the vaporization of waste water utilizing "waste" heat and pressure from a heat source such as an engine (e.g. an engine/generator combo unit or exhaust from steam generators, turbines, boilers, flares, flame exhaust and the like) so as to effect a reduction of the volume of raw water and the concentration of contaminants within the raw water and/or the exhaust gasses. The invention also provides a low-maintenance solution for water vaporization by reducing the effects of scaling. In addition, the invention provides effective systems and methods to muffle ICE engine noise during water vaporization processes.

In various embodiments, the invention also seeks to perform one or more of the following:
 a. reduce or minimize new energy input over and above the primary heat source from an ICE, combustion gas, flare gas or other similar source;
 b. minimize pressure drop related to water vaporization and/or entrainment separation;
 c. maximize beneficial use of any available waste pressure and/or heat;
 d. reduce the need for maintenance through the design and operation of a system that minimizes scale, particulate, salt and other build-up;
 e. effectively use low grade waste heat to vaporize raw water;
 f. effectively use low grade waste heat not typically suitable for another industrial purpose or optimally accessible for use close to its source;
 g. reduce or minimize the creation and control of soapy foams associated with some raw waters;
 h. reduce the release of volatiles and pollutants to the atmosphere;
 i. enable effective recovery of condensates from raw water;
 j. enable recovery of re-condensed water for reuse;
 k. reduce the capital cost of raw water vaporization equipment;
 l. reduced ongoing operating expense and manpower due to minimized need for operator oversight;
 m. provide a light weight and compact system for remote or satellite installations close to a heat source;
 n. light weight and compact system that can be made with plastics allowing rapid mass production and the ability to custom manufacture and configure various embodiments;
 o. a modular system that can be built into either one unit or a cluster of units operating separately or in conjunction with one another;
 p. a monitoring and reporting system for remote management of many distributed systems, functions, products and resources within a larger grid;
 q. reduce ground level footprint when installed or retrofit to existing oilfield equipment;
 r. reduce or minimize the number of moving parts within a raw water vaporization system; and, s. reduce a ground level footprint of vaporization equipment when installed or retrofit to existing oilfield equipment.

In another aspect of the invention, the invention provides methods, systems and apparatus for distributed management of raw water and internal combustion engine (ICE) gas emissions generated during industrial operations, including but not limited to oilfield drilling, completions and production operations with a mobile processing unit.

In another aspect of the invention, the invention provides systems and methods that at least partially utilize positive pressure waste within distributed internal combustion engine (ICE) exhaust sources as a substantially free energy for demisting input pressure and/or shearing force to increase or partially increase interfacial surface area between raw water and an engine exhaust gas for rapid mass and thermal transfer of engine exhaust gas heat into the raw water in order to vaporize a proportion of the aqueous phase of the raw water and concentrate contaminants within a residual raw water concentrate. The water vapor generated by the vaporization process may be demisted, discharged directly to the atmosphere or alternatively condensed by a condenser and captured for use.

In one aspect, the invention simultaneously facilitates rapid transfer of at least a portion of ICE combustion gas particulate and ICE combustion gas chemicals into the raw water as it concentrates.

In another aspect of the invention, the invention provides an exhaust diversion system as means to provide exhaust heat and pressure to a region of a dual fluid interaction zone and continued pressure force for demisting within the system in a manner that does not affect the operation of an associated ICE.

In another aspect, the invention provides an economically viable and environmentally synergistic means of distributed raw water and emissions management to reduce and/or recycle large volumes of industrial raw water and emissions within localized regions. That is, the invention provides systems and methods to enable effective and efficient processing of raw water that is often remote and stranded from waste management infrastructure. In one aspect, the invention provides distributed management of raw water and emissions that is enhanced by networking data from remote raw water management processing units as a means to ensure that each satellite system in the network can be utilized to its full capacity either by actors within an organization operating within a geographic region/grid or by many organizations operating within a geographic region utilizing each other's raw water processing system(s), salts, brine fluids and/or condensed clean water vapor. An algorithm may be used as a means to communicate data points to those within the network such as individual system run time, raw water processing rates, available, accumulating or unused capacity, timing and/or availability of upcoming spare capacity, etc.

As described herein, part of the novelty of the present invention is its simplicity.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Overview

The invention is primarily described with reference to gas compression, drilling rig and steam generation operations although it is understood that the invention can be applied to other industries where the disposal of raw water is required or where engine exhaust, combustion gas and other heat source emissions are available.

Drilling Rigs, Gas Compression and Steam Generation Facilities

As is known, drilling rigs have high power requirements and are typically located away from the electricity grid. Hence, drilling rigs usually require that electrical power is generated on these often remote, stranded sites. A typical drilling rig may have one or more engines/generators used to generate power for various equipment and rig operations including the rig draw works, mud pumping, numerous auxiliary equipment as well as power for the personnel camps.

At gas compression facilities, high power engines and compressors are used to effect gas compression of produced gases. A typical gas compression facility may have one or more engines/compressors that are operated to compress produced gases to high pressure gas delivery pipelines.

At steam generation facilities, high power boilers are used to generate high pressure steam. Waste heat from such boilers is usually passed through various heat exchange systems to recover heat that may be usable in the steam generation and other processes prior to venting to the atmosphere. Such waste heat that is vented to the atmosphere is generally low temperature and low pressure heat generally without a further industrial benefit and not easily accessible.

An overview of the invention as deployed in accordance with various embodiments of the invention is provided with reference to FIGS. 1, 1A-1F. FIG. 1 shows a typical gas compression facility showing two raw water vaporization systems (RWVS's) 10 configured to an engine/compressor 12. At a typical installation, an engine/compressor is housed within building 1 with exhaust/muffler system 2 operatively configured to the engine/compressor that vents exhaust gases to the atmosphere during normal operation. The exhaust/muffler system is shown mounted on the top of engine radiator housing 1a. As shown, and in accordance with one embodiment of the invention, one or more RWVS's 10 are adjacent the exhaust/muffler system 2 and configured via a T-junction 3 where, as explained in greater detail below, may divert exhaust gases to the RWVS systems (see FIGS. 1A and 1B and FIG. 20).

Figure 1A:
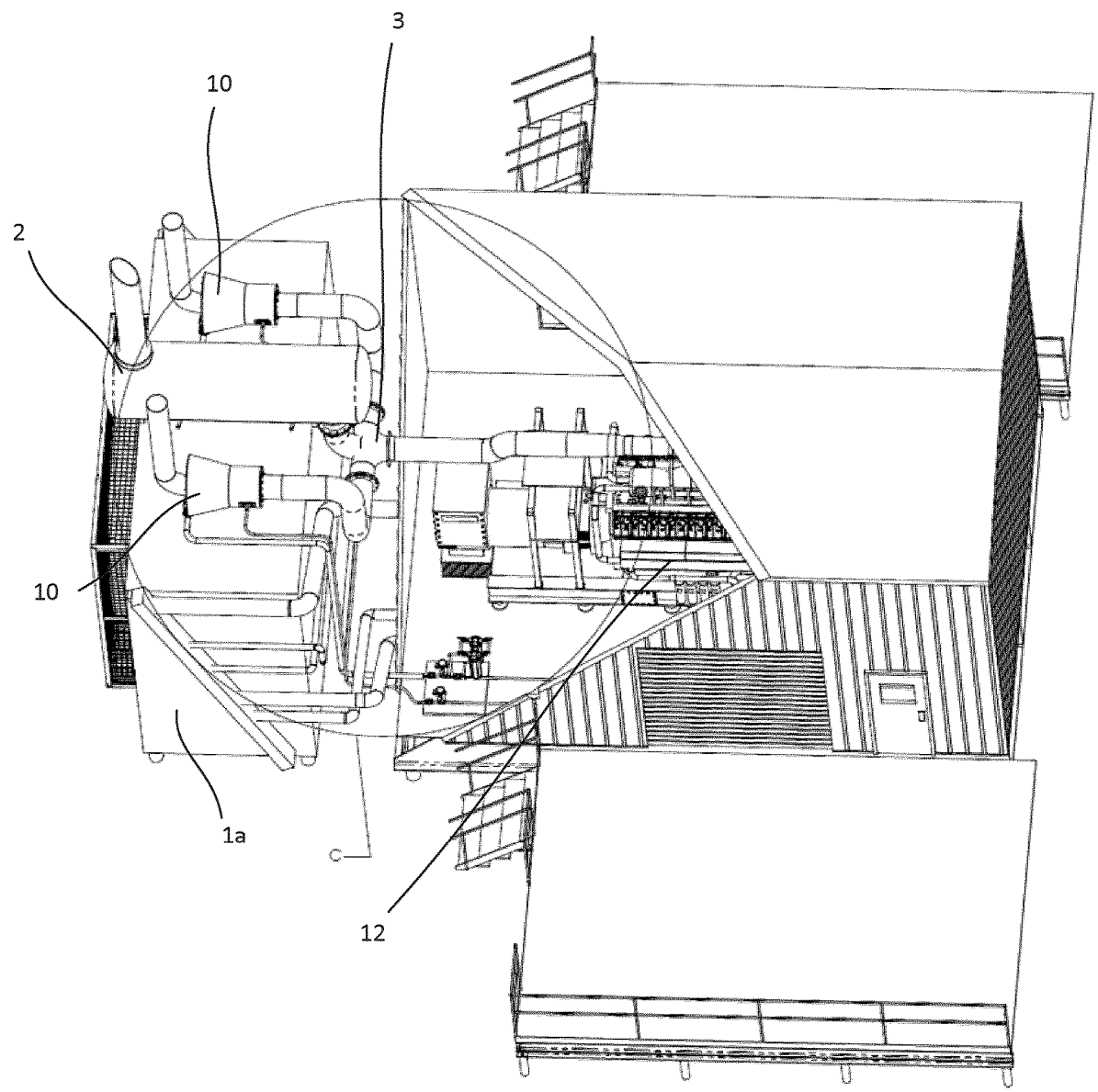
FIGS. 1A and 1B are perspective views of multiple RWVS's configured to a compressor facility in accordance with one embodiment of the invention.
Figure 1B:
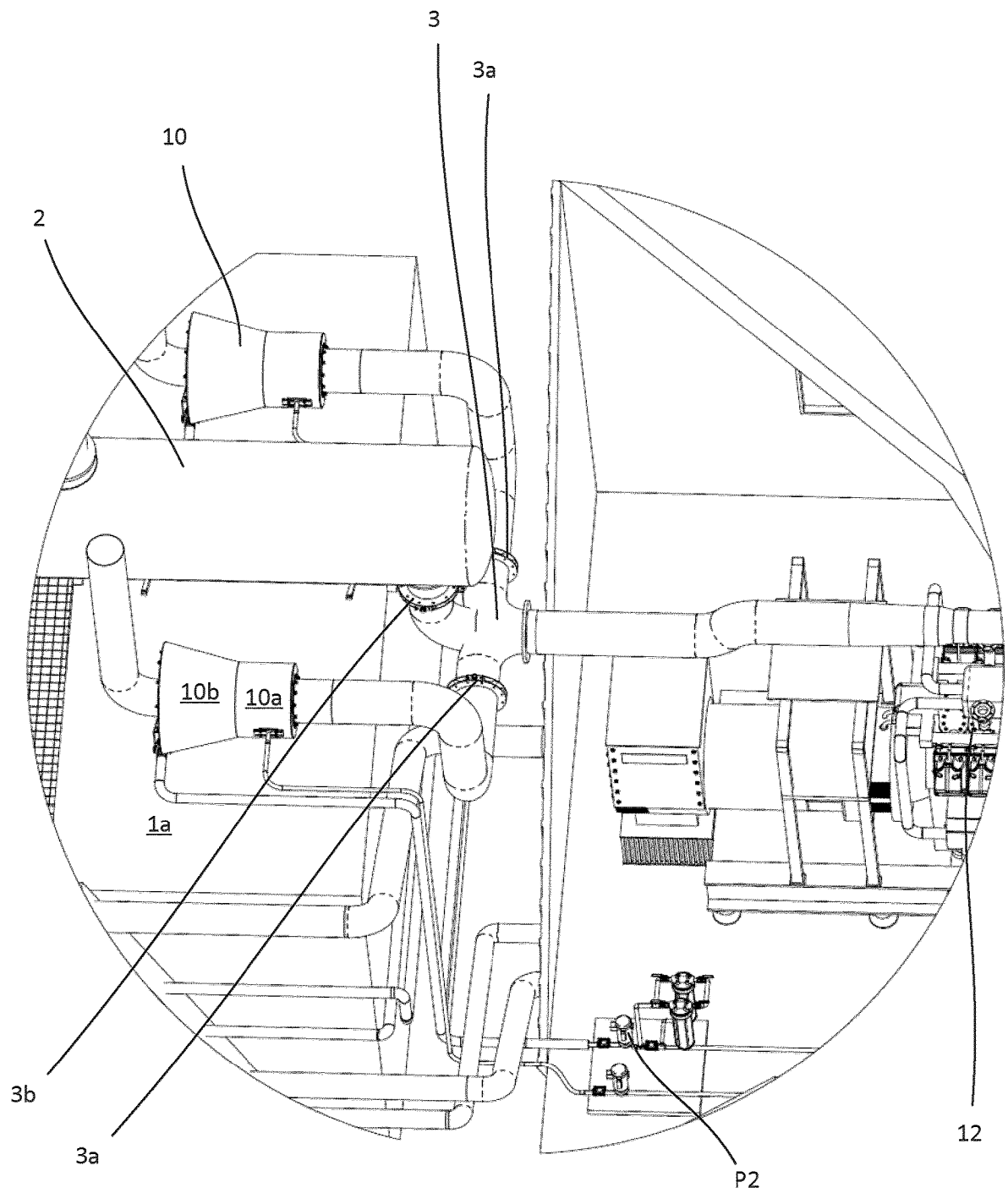
Figure 1C:
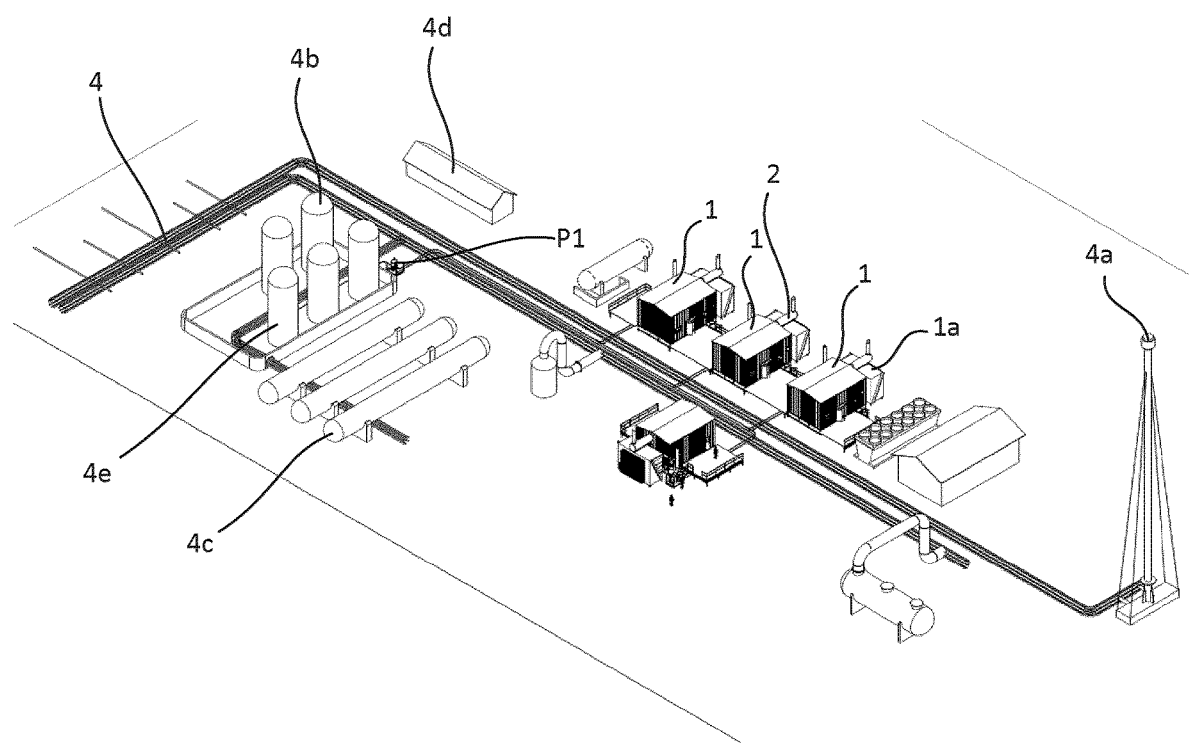
FIGS. 1C, 1D and 1E are perspective and plan views of a RWVS system configured to a gas production facility in accordance with various embodiments of the invention.
Figure 1D:
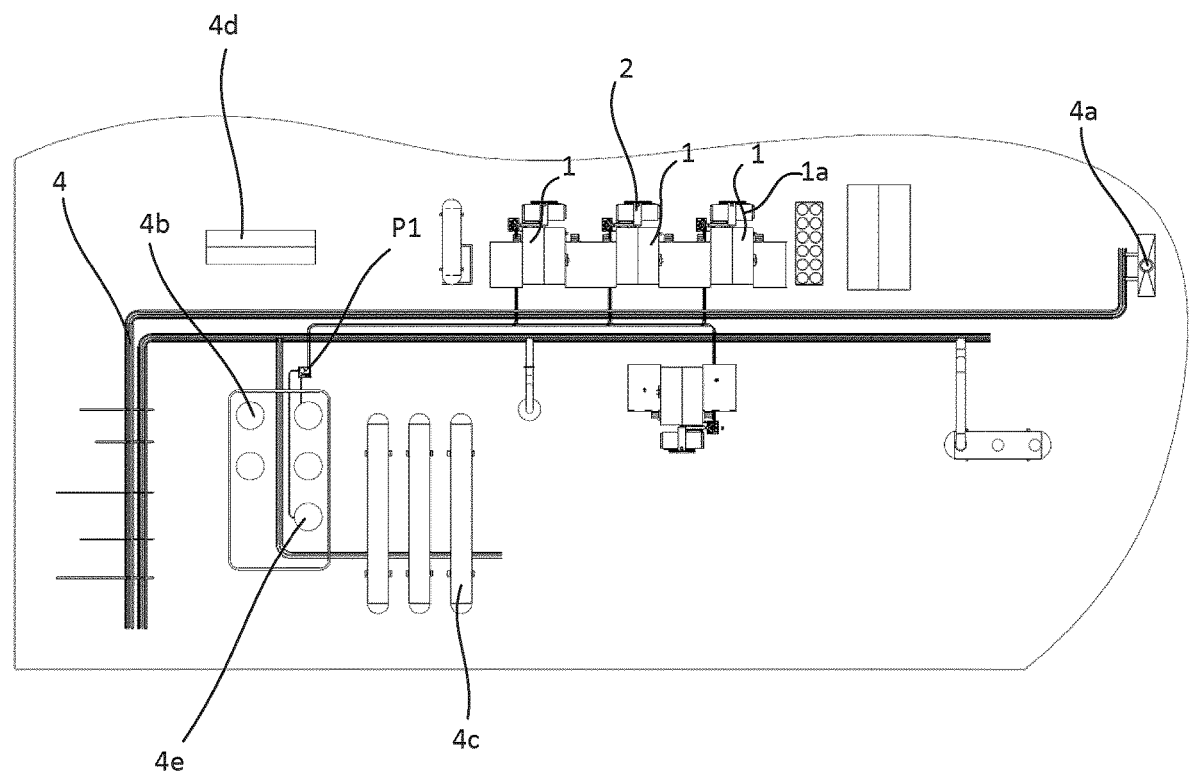
Figure 1E:
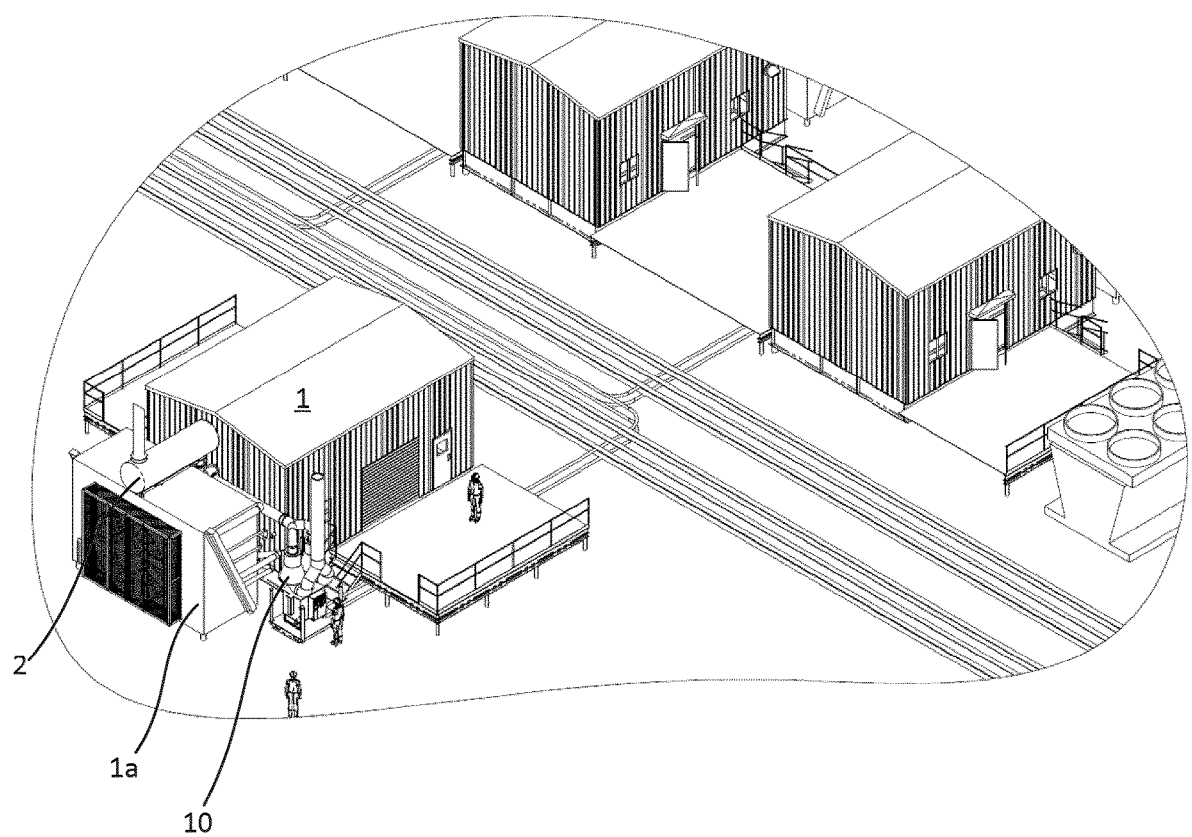
Figure 10:
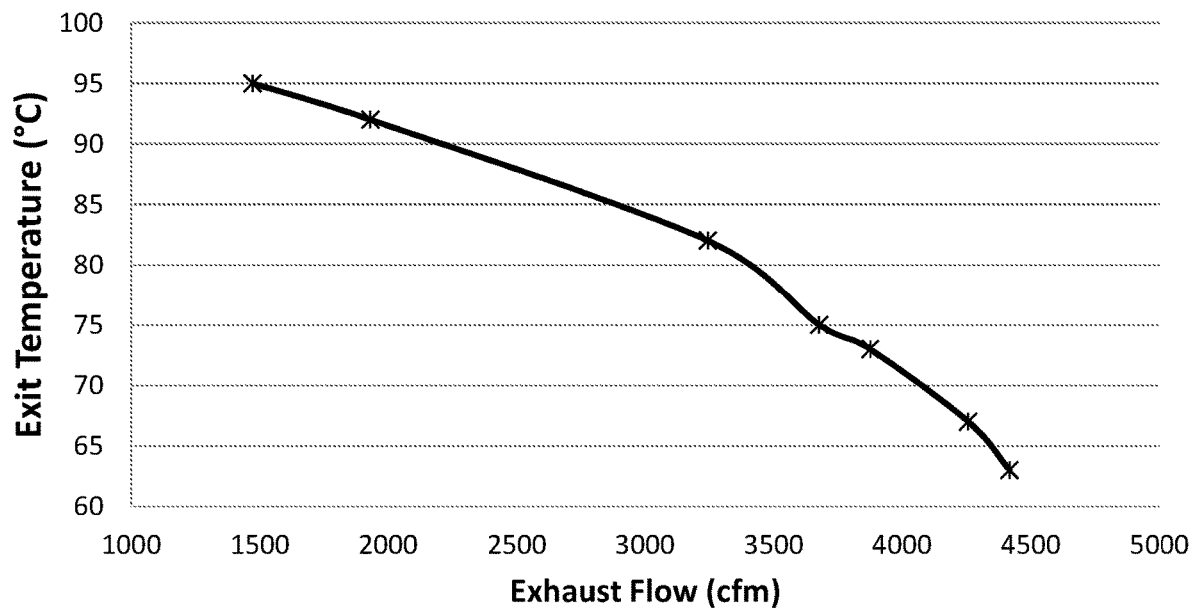
FIG. 10 is a graph showing atmospheric exit temperature as a function of exhaust flow rate in accordance with one embodiment of a RWVS.

FIGS. 10, 1D and 1E show further details of a typical gas production and compression facility that may be retrofitted to include the RWVS's as described herein. Typical equipment at such a facility may include gas lines 4, flare stack 4a, produced water tanks 4b where production water (raw water) is stored, production gas storage tanks 4c and facility control building 4d. In accordance with the invention, one or more RWVS's 10 (see FIG. 1E) are configured to engines 12 within compressor buildings 1 and one of the production water tanks 4e may be purposed to store concentrated brine as described herein.

Figure 1F:
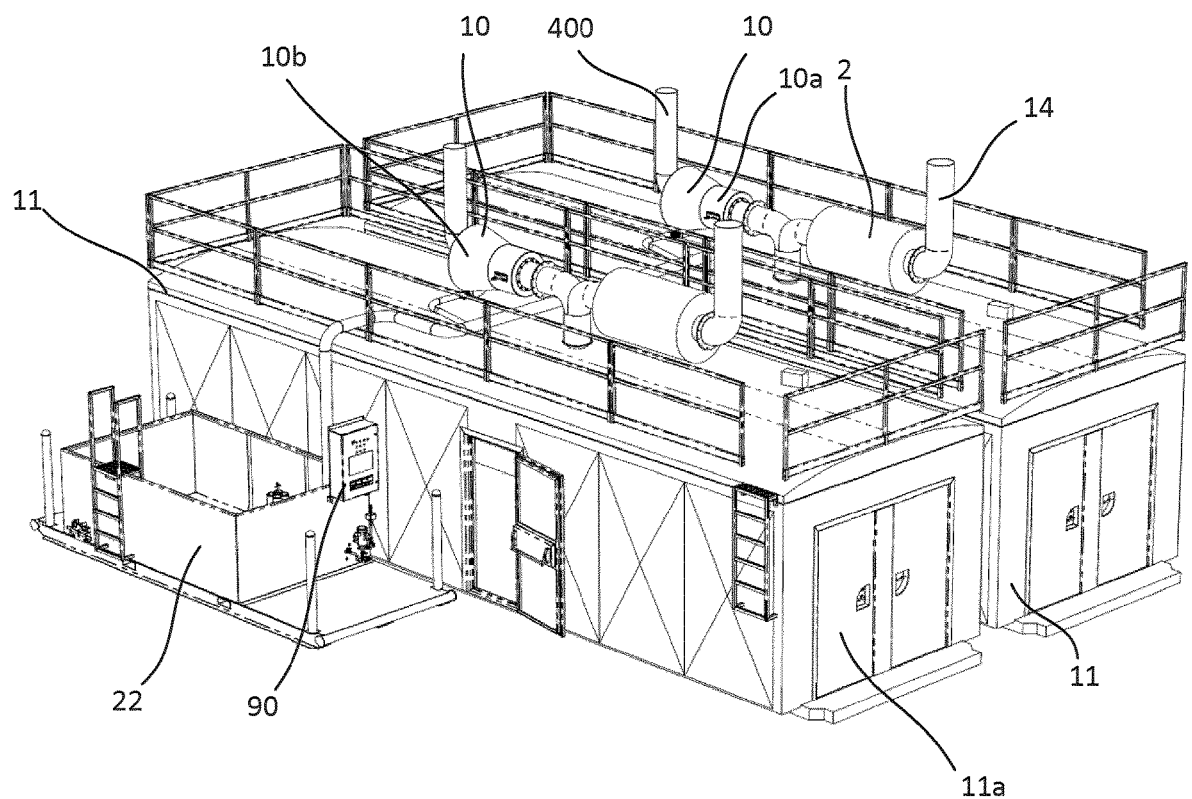
FIG. 1F is a perspective view of two generator shacks that may be configured with RWVS's at a drilling rig site in accordance with one embodiment of the invention.

FIG. 1F shows two typical generator shacks 11 that may be located at a drilling rig for the purposes of generating electricity for use at the drilling rig. As shown, in a typical deployment, the generator shacks may be positioned in a side-by-side arrangement. FIG. 1F also shows one embodiment of a RWVS 10, including a vaporization chamber 10a and demister 10b configured to both of the generator shacks and associated engine exhaust systems and to a single raw water tank 22. While FIG. 1F illustrates configuration to both shacks, it is understood that the RWVS may be configured to just one generator or to more than two as will be explained in greater detail below. It should also be understood that in various embodiments a RWVS may be configured to a waste water holding, concentration and/or circulation tank 22 or other vessel suitably configured to allow raw water to be delivered or circulated from a source to a RWVS. In FIG. 1F, the engine exhaust system may be operatively connected the RWVS as a means to deliver the exhaust heat and exhaust pressure to the RWVS.

Figure 1G:
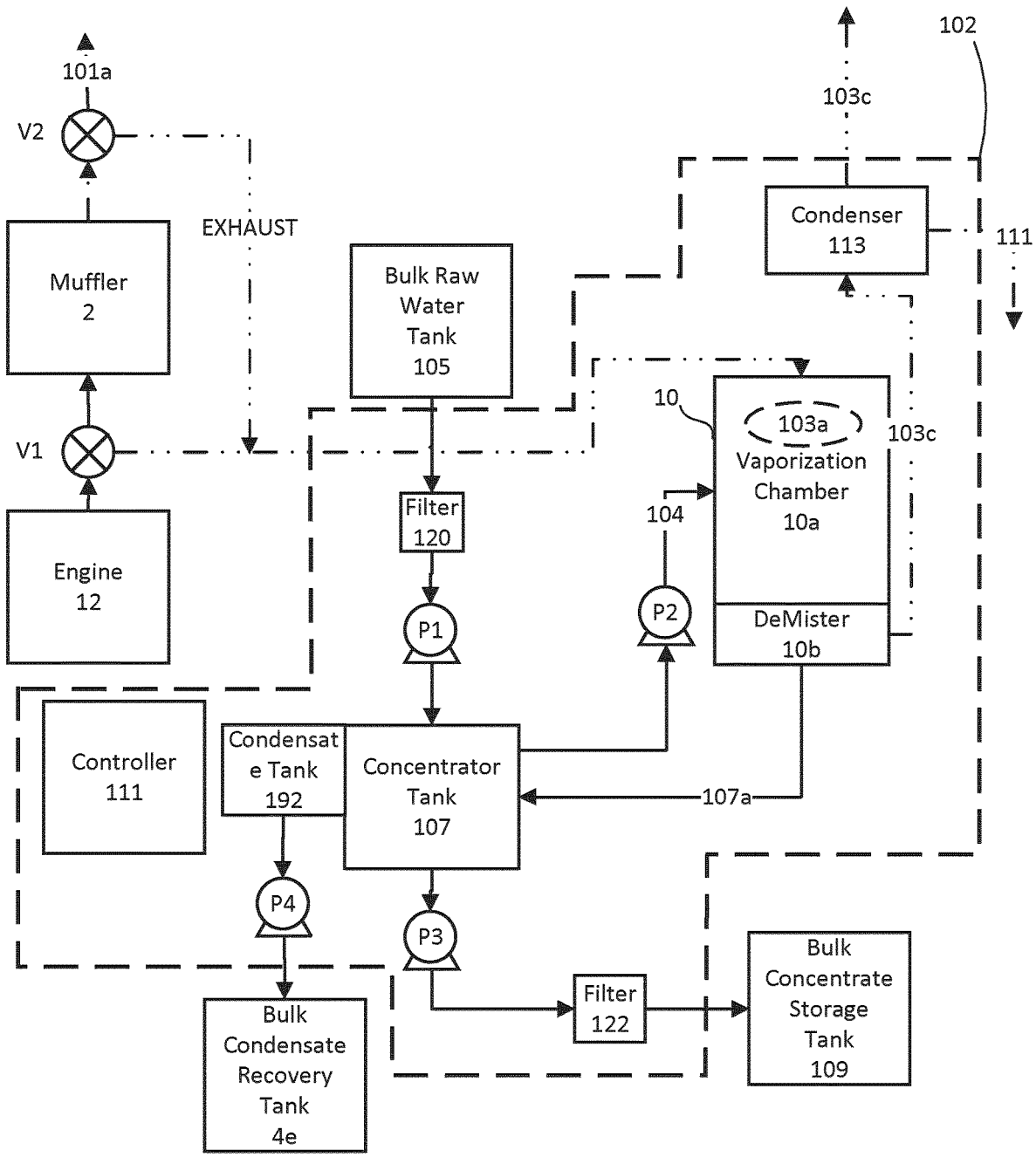
FIG. 1G is a schematic view of the sub-components of a RWVS in accordance with one embodiment of the invention.

FIG. 1G is a schematic overview of a RWVS 10 including the inter-related components that enable efficient water vaporization and muffling of engine noise in a system with reduced maintenance requirements in accordance with one embodiment of the invention. As shown, the RWVS is configured to an engine 12 associated with a muffler 2. In normal operation, the engine 12 produces power for various purposes, examples of which are provided above. The muffler 2 receives hot exhaust gases from the engine, muffles noise and vents exhaust gases to the atmosphere 101a. While FIG. 1G is shown as being configured to an engine 12 and muffler 2, it is understood that the engine 12 could be another combustion gas source such as a flare 4a, in which case, the muffler system may not be present. The combustion gas source may also be a gas turbine.

In accordance with one embodiment of the invention, a RWVS 10 is operatively connected to the engine exhaust either upstream or downstream of the muffler or both, so as to divert engine exhaust to vaporization chamber 10a. Heat and pressure of the engine exhaust is contacted with raw water within the vaporization chamber 10a at a flow rate that a) ensures complete washing of the vaporization chamber 10a b) muffles engine noise whilst c) providing effective shearing of raw water injected into the chamber 10a and d) vaporization of a portion of the raw water.

More specifically, in operation, raw water is pumped from a bulk raw water storage tank 105 to a concentrator tank 107. The bulk raw water storage tank may be a larger tank (See 4b, FIG. 10) designed to hold raw water that has been collected from one or more sources (e.g. multiple gas production lines). Bulk raw water storage tank 4c may hold volumes of water in the range of about 50 m$^3$ to 100 m$^3$. Pump P1 pumps raw water to the smaller concentrator tank 107 (typically 1-2 m$^3$) that is used to hold water being cycled through vaporization chamber 10a. In various other embodiments tanks 105 and 107 may be the same tank. An optional filter 120 may be included to screen larger particulates from entering the pump P2 and concentrator tank 107. Pump P2 pumps raw water in a continuous cycle from concentrate tank 107 to vaporization chamber 10a where the raw water undergoes vaporization and un-vaporized water is returned to the concentrator tank 107, preferably via gravity. In various embodiments tank 107 may be connected directly to or is integrated with vessel 10.

The vaporization cycle in a primary embodiment is completed as follows:

a) Pump P2 pumps raw water from the concentrator tank 107 into the vaporization chamber 10a.
b) The raw water is ejected through nozzles against an exhaust gas flow from the engine 12 within an impact zone 103a within the vaporization chamber 10a such that ejected raw water is firstly sheared by the water nozzle or water distribution system (more fully described below), then is secondly and/or simultaneously sheared by pressure from combustion gas flow. This results in at least a portion of the raw water being vaporized as a result of the exhaust gas/raw water impact.
c) Vaporized water entrained within cooled combustion gas flow is passed through a demister 10b generally inline with the exhaust gas flow to effect demisting of the gas/liquid water mixture.
d) Demisted vapor 103c is discharged to atmosphere.
e) Demisted vapor 103c may pass through an optional condenser 113 in the event that water recovery is desired.
f) Unevaporated raw water, that is raw water that is not evaporated within the impact zone 103a will flow through the vaporization chamber and demister, at a rate where substantially all of the interior of the vaporization chamber and demister are wetted to prevent the formation of dry spots, scaling and to also effect noise suppression. In other embodiments a portion of the un-vaporized raw water in chamber 10a may be collected and directed to concentrator tank 107 instead of firstly traveling though demister 10b prior to being directed to tank 107.
g) Unevaporated raw water is returned to the concentrator tank 107 via line 107a in a more concentrated state than when initially passed through the vaporization chamber by line 104. The concentrator tank 107 will typically operate in a semi-batch mode where P1 pumps raw water into the concentrate tank from bulk raw water tank 105 until a high level is reached in tank 107 and replenishes raw water within the concentrator tank 107 when a low level is reached.
h) When the concentrator tank has sufficient raw water, P2 will continuously pump raw water from the concentrator tank 107 through the vaporization chamber 10a until either the raw water level within the concentrate tank reaches a low level or the concentration of brine within the concentrator tank 107 reaches a density threshold level.
i) If the low level is reached and the brine concentration density is below the threshold level, P1 will turn on and pump raw water into the concentrator tank 107 until the high level is reached.
j) If the brine concentration reaches a density threshold level, P3 will activate to pump concentrated brine solution to bulk concentrate storage tank 109 that stores larger volumes of concentrated raw water prior to final disposal or reuse. Additional optional filter 122 may be present to assist in the removal of fine particulates, such as salt precipitates, from the concentrated solution. P1 may also turn on to pump new raw water into the concentrator tank 107.
k) Either way, when concentrator tank 107 is pumped out to a low level, P1 reactivates to pump raw water into concentrator tank 107 to ensure sufficient water is in the concentrator tank and to maintain adequate water volume through P2 to vaporization chamber 10a. This system enables the system to recycle heat leaving vessel 10 within concentrate water discharging 10 through line 107a back into chamber 10a via line 104 and pump P2.

Figure 20:
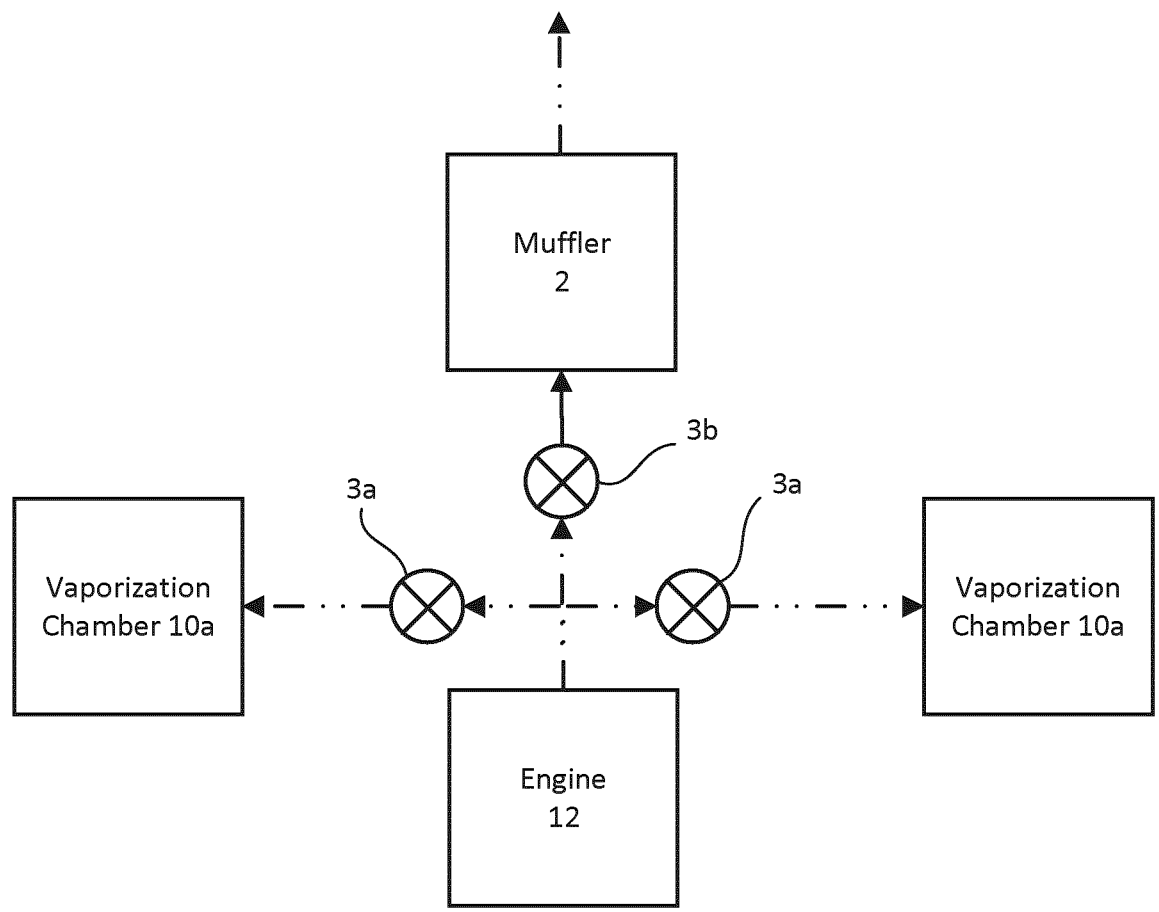
FIG. 20 is a schematic diagram showing release and exhaust valves that may be configured to a system where one engine delivers exhaust to two RWVSs.

As shown, engine exhaust is diverted to the vaporization chamber 10a by valve systems V1 and/or V2. In this embodiment V1 and V2 are comprised of 2 valves as shown in FIG. 20 namely a control valve 3a and release valve 3b for selectively directing gas to/from the muffler 2 and vaporization chamber 10a. V1 is shown configured upstream of muffler 2 and V2 is downstream of muffler. In the preferred embodiment, V1 valve system is used to divert exhaust gas as the primary diversion system. In this embodiment, V1 is activated such that a portion (0-100%) of exhaust gas is diverted to the vaporization chamber. Importantly, V1 is controlled to divert only a portion of exhaust gas that does not adversely affect backpressure on engine 12. That is, in the event that measured backpressure on the engine exceeds a threshold value, the V1 system will divert more exhaust through the muffler 2 until the backpressure is below the threshold.

Importantly, as exhaust is diverted through the vaporization chamber 10a, engine noise is muffled due to the flow of raw water through the vaporization chamber, the impact of engine sound waves with the turbulent water within the vaporization chamber and the cyclonic demister further suppresses sound waves. In addition, removal of heat from the gas to the liquid water may help cause the volume of the gas to decrease as it passes through the vaporization chamber. As such, the pressure, water and gas diversion within vessel 10 is effective to maintain noise levels from the engine at or below noise levels of exhaust being exhausted entirely through the muffler. To maintain noise suppression, it is preferable that the raw water flow through the vaporization chamber is sufficient to substantially and continuously cover the inner surfaces of the vaporization chamber 10a and otherwise prevent dry areas from forming.

In one embodiment, the system is provided with V2. However, as can be appreciated, as V2 is downstream of the muffler, the pressure, temperature of exhaust gas exiting the muffler is lower than at V1 and, hence, is less effective as a shearing, evaporating and demisting energy than exhaust gas diverted through V1 within a specific engines backpressure limits. In various embodiments as will be described herein, a fan or blower (illustrated in FIG. 18) may be configured to the inlet or outlet of chamber 10 to at least partially assist engine pressure. Of course the more pressure required by an assistive blower, the greater the consumption of new input energy. From an energy input cost perspective alone higher supplemental energy input is less desirable when there is waste ICE pressure that can be utilized.

The valve systems will preferably be provided with fail safe systems (explained in greater detail below) such that in the event of inadvertent or unexpected changes in pressure, V1 or V2 will automatically open or partially open to divert some or all exhaust gases to atmosphere through the muffler so as to maintain the desired performance of the engine and its associated equipment.

Further details and embodiments of the vaporization chamber and demister are described below.

Vaporization Chamber and Demisting Chamber in Series

Figure 2:
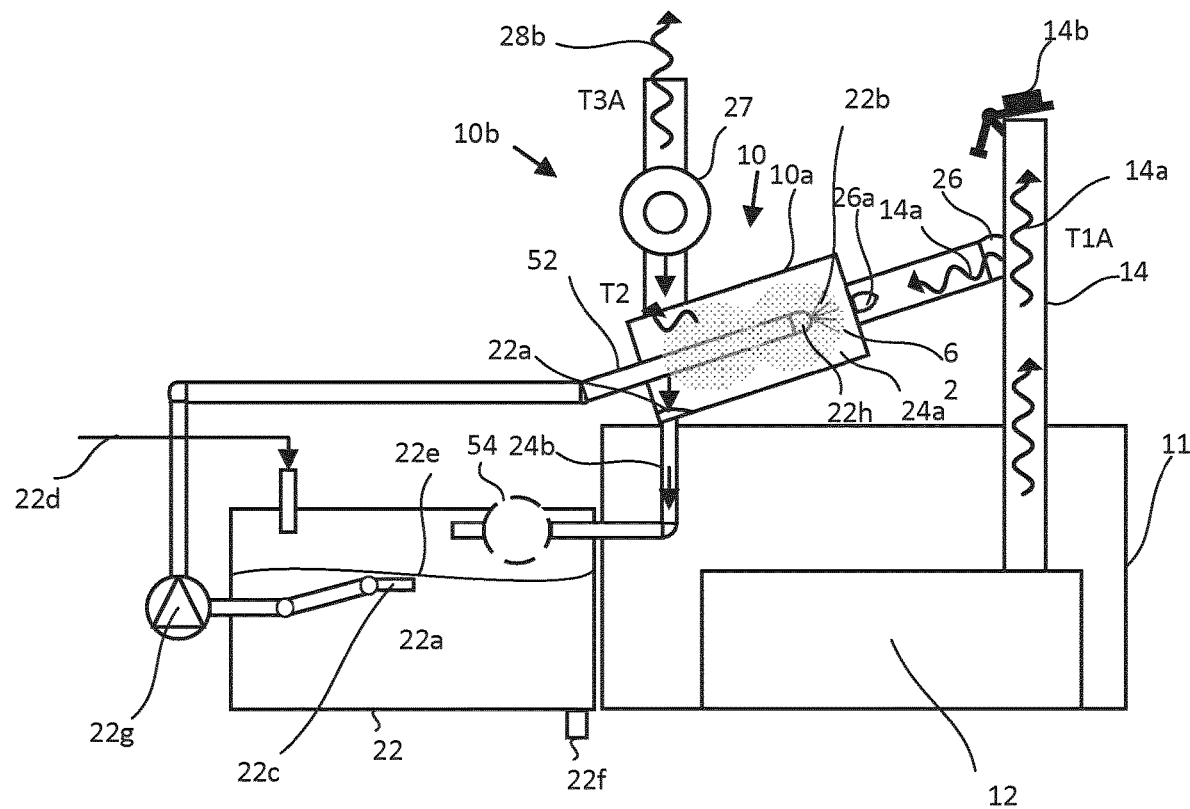
FIG. 2 is a schematic cross sectional view of a raw water vaporization system in accordance with one embodiment of the invention.

FIG. 2 is a schematic diagram that shows one embodiment of a RWVS, vaporization chamber 10a and demisting chamber 10b when operatively connected to an engine exhaust system.

With reference to FIGS. 1F and 2, as shown an engine 12 may be housed within a generator shack 11 that is transported to the rig site where it is configured to the drilling rig equipment (not shown). A typical shack 11 may have standard shipping container dimensions with appropriate access doors 11a to enable personnel to enter the shack for both operations and maintenance.

A typical generator shack will include a typical exhaust system 14 including engine exhaust piping and mufflers. The exhaust system 14 will typically project upwardly through the roof of the shack where engine exhaust 14a is discharged under push pressure to the atmosphere. In one embodiment of the present invention the exhaust system may include an exhaust diversion valve 14b to deliver engine exhaust 14a from an engine exhaust system 14 or engine 12 to the vaporization chamber 10a or a component thereof. In various embodiments, the exhaust diversion system may be comprised of one or more valves and/or valve actuation systems that work either together or separately as a means to divert or partially divert engine exhaust 14a from atmospheric discharge and deliver the engine exhaust gas 14a to a vaporization chamber 10a.

In accordance with the invention and as shown in FIGS. 1F and 2 (as two representative embodiments), a vaporization chamber 10a is shown configured to a generator shack 11 such that exhaust 14a from the engine 12 is used to effect raw water 22a reduction through vaporization of at least a portion of the raw water 22a. As noted above, the RWVS generally may include a raw water holding, concentrator tank 107 and/or circulation tank 22, an exhaust heat and pressure source 14a, a raw water fluid 22a and exhaust gas fluid 14a, vaporization chamber 10a (also referred to as a shearing chamber or dual fluid reactor) and an exhaust diversion or delivery system 26 and 14b operatively connected to the engine 12 and/or an engine exhaust system 14.

In operation, an engine/generator 12 (or other heat source) is operating to generate electrical power for use at a drilling rig site, by way of example. As noted above, the exhaust from the engine would typically be exhausted to the atmosphere through an exhaust system 14. As shown, the vaporization chamber 10a may be a cylindrical chamber 10a configured to an exhaust diversion or delivery system 26 to enable diversion of exhaust gas through the vaporization chamber 10a under the operation of at least one valve that may include valve 14b as shown by way of example. The valve 14b may be an exhaust valve at the outlet of the main exhaust system 14 that when closed allows the diversion of exhaust gas through the vaporization chamber 10a. The valve 14b may be actively or passively controlled as described in greater detail below. In another embodiment the vaporization chamber 10a is configured as an integrated component of the engine exhaust system in which engine exhaust 14a may flow through a vaporization chamber 10a to atmosphere, whether or not raw water 22a is being delivered to the vaporization chamber 10a. In the latter embodiment there is no need for an exhaust diversion system as the vaporization chamber 10a is part of the exhaust system (FIG. 2B).

However, in each case the vaporization chamber 10a will have a zone 24a where the contact of exhaust 14a and raw water 22a is enabled.

As shown, exhaust gas 14a enters zone 24a where it comes into contact with raw water 22a delivered by a raw water piping system 52 as a means to distribute the raw water, which in one embodiment may be sprayed into the exhaust gas 14a as it enters zone 24a. The contact of exhaust gas 14a and sprayed raw water 22b effects shearing and vaporization of the raw water. More specifically, at least part of the combined pressure of both the exhaust 14a and raw water within pipe 52 imparts both a separate and collective shearing force to break and/or shear raw water flow and raw water droplets into much smaller droplets. This interaction, utilizing at least a portion of the waste pressure within exhaust gas 14a, provides a range of incremental to significant increases to the surface area of each droplet of raw water in relation to the mass of each droplet as a means to create a range of increased interfacial surface area and as a means to facilitate rapid and immediate thermal transfer of the heat within exhaust 14a into the raw water 22b delivered by piping system 52 and mass transfer of the raw water from a liquid to gaseous phases. The range, effectiveness and/or efficiencies of the desired increase of interfacial surface area between the exhaust gas and raw water are therefore at least partially affected by the waste pressure within the exhaust gas 14a. In one embodiment, an air knife exhaust gas delivery system 26a can be configured as a means to deliver exhaust gas velocity, shape and/or pressure to a desirable area within the vaporization chamber 10a. Exhaust gas and at least a portion of vaporized raw water then travel to an exhaust system 28 operatively connected to zone 24a where the combination or mixture of cooled exhaust gas and at least a portion of vaporized raw water, collectively 28b, are released to the atmosphere. Raw water that is not vaporized, now being a raw water concentrate of the inlet raw water from pipe 52 mixed with contaminants from the exhaust gas 14a, is allowed to return to tank 22 through drain 24b that is positioned at a lower location of the zone 24a. In one embodiment, the raw water returning to the tank may at least partially pre-heat raw water in the tank 22 and/or raw water within delivery system 52 as it is being delivered to zone 24a. Raw water is pumped to zone 24a via an appropriate pump 22g and in this example is preferably drawn from raw water holding and/or circulation tank 22. In one embodiment, pump 22g is a centrifugal pump which allows raw water within piping system 52 to drain via gravity back into tank 22 when the system shuts off or loses electrical power. In one embodiment a floating suction system 22c is configured within tank 22 as a means to draw raw water from near the top of the raw water surface 22e where there may be at least partial stratification of raw water and its contaminants. More specifically, it is desirable to deliver at least partially clarified raw water within 22a to zone 24a while avoiding delivering phase separated hydrocarbons on surface 22e or settled suspended solids resting at or near the bottom of tank 22, if either is present in 22a. New raw water may enter tank 22 from a source 22d.

In an example embodiment, within the zone 24a, as noted above, raw water is sprayed within the gas 14a containing both pressure and heat delivered by an exhaust diversion system 26 where it undergoes a double shearing operation as a result of both the shearing forces of the pump pressure applied from pump 22g acting on raw water in piping system 52 on at least one nozzle 22h followed by immediate contact with the exhaust pressure, velocity, temperature and/or flow of exhaust gas 14a. The interaction of the raw water with the exhaust gas is explained in greater detail below.

At the downstream end of the zone 24a, the system may be configured to include a demisting system 10b for removal of raw water droplets that have become entrained in the now cooled gas flow mixture. In the example embodiment is a centrifugal demisting system (CDS) 27 that induces a centrifugal force on cooled exhaust gas and vaporized raw water mixture as they pass through the exhaust system 28 that removes at least a portion of entrained droplets and/or mist from the exhaust 28b prior to atmospheric discharge. Advantageously, a centrifugal demisting system 27 or 10b may be configured to take advantage of pressure within the exhaust system 14 as a means of removing entrained droplets for a cooled exhaust gas. The CDS is described in greater detail below.

As described above, in one embodiment a vaporization chamber 10a may be positioned on top of an engine/generator housing system or shack 11 configured to be a distance from the engine exhaust connection that is a preferably a short distance from the perspective of gas flow length. More specifically, to reduce both back pressure on the engine and to minimize thermal losses or pressure drop due to exhaust piping line losses, preferably, the vaporization chamber 10a is configured in close proximity to the engine exhaust manifold or connection. In another embodiment, a vaporization chamber 10a is placed at a farther distance from an engine/generator housing system or shack as described above, in which case the heat and pressure within exhaust gas 14a is delivered to the via a piping system and/or flexible pipe system, in some cases can be an insulated piping system. In the latter embodiment the vaporization chamber 10a may be configured to the tank 22 structure as a standalone system configured to accept engine exhaust heat and pressure.

Raw Water Delivery and Discharge System

In one embodiment the water is pumped from tank 22 to the vaporization chamber 10a using a centrifugal water pump 22g. Typical gross flow rates may range from 10 LPM (liters per minute) to 500 LPM or more (preferably 10-80 LPM and more preferably 20-60 LPM for a 500 kWe engine) as a function of the heat energy and pressure within engine exhaust gas 14a. That is, when configured to an engine/generator capable of producing 500 kW, a flow rate of 10-80 LPM of raw water may be preferable. Similarly, when configured to an engine/generator capable of producing 1,200 kW, a flow rate of 20-200 LPM of raw water may be preferable. It is to be understood that various configurations may require more or less flow rate in consideration of factors such as temperature and pressure of gas 14a, system flushing and cleaning issues, composition of raw water and its resulting concentrate, particulate deposits, scaling issues, noise suppression etc. In various embodiments, the flow rate may vary within engine sizes or within a similar engine size range due to any one of the above factors. In some embodiments, the flow rate of raw water through piping system 52 may be fixed. In other embodiments a variable frequency drive (VFD) may be employed as a means to throttle the water flow through piping system 52 based on various temperature and pressure inputs to a control system and/or operator as a means to respond to an engine load change. For clarity, when an engine/generator load is permitted to vary due to the operation it is performing on a site, both the temperature and pressure of exhaust gas 14a may also fluctuate. In this case, it may be desirable for the raw water flow to adjust along with generator load as communicated and/or determined by electronics, sensors, inputs, outputs, switches or the like operatively configured to the engine/generator or any of its components or attachments, such as its exhaust system or piping.

In one embodiment, and for example, a raw water flow rate of approximately 60 LPM may be chosen for pairing with a 500 kW engine/generator. In this example, based on the heat and pressure energy within exhaust gas 14a may vaporize approximately 5-30% or 8-12% of the raw water flow rate as raw water 22a passes through zone 24a and a concentrate thereof returns to tank 22 via piping system 24b. Accordingly, the remaining 70-95% or 88-92% of the flow rate is considered a raw water concentrate and permitted to discharge, drain or be drawn from the chamber 24. There may be a desire to balance the system wherein the higher the raw water flow rate in relation to the gas flow temperature and pressure, the more heat may be absorbed into the raw water concentrate. This condition of higher raw water flow is desirable from the perspective of washing and cleaning action of the raw water and/or raw water concentrate within the chamber and contributes significantly to reducing the amount of maintenance on individual units. Conversely, with lower raw water flow rates, less energy is absorbed into the raw water concentrate which may be desirable for higher vaporization percentage of raw water from a single pass through the chamber; however, there is less washing/cleaning action within the chamber that can lead to fouling, buildup, downtime and maintenance issues if any dry areas can form. Therefore it is desirable to flow the highest flow rate for internal rinsing and washing purposes (and muffling), without losing an undesirable amount of heat to the concentrate discharge. To mitigate heat loss through concentrate absorption, a second vaporization measure may be completed to further vaporize a portion of the concentrate by interacting it with ambient air between discharge from the vaporization chamber 10a and its return to a primary raw water storage or circulation tank or vessel 22, as described in more detail below.

In one embodiment, the raw water concentrate 22a discharging from chamber 10 flows back into a body of raw water 22a located in a tank or vessel 22, where the concentrate discharge is diluted within a body of raw water 22a within the tank 22 and from where the water pump 22g draws raw water for distribution to the vaporization chamber 10a. In this manner a water pump in used as a means to deliver, cycle and/or recycle a body of raw water, comprised of raw water and re-diluted raw water concentrate discharge, through a chamber 10a for re-occurring interaction within a chamber of exhaust gas 14a, as the total body of raw water is reduced by vaporization and concentration over time.

Typically the concentrate raw water discharge 22a, discharging from a vaporization chamber 10a, has a temperature between 30° C. and 100° C. (more typically 40-60° C. Depending on the rate water flow rate chosen for a particular system configuration, an undesirable amount of heat energy may be contained within the raw water concentrate. In one embodiment the raw water concentrate is passed through a secondary vaporization system 54, such as an air flow produced by a fan or blower in which ambient air is directly interacted with the concentrate as a means of reducing its temperature via further vaporization of a portion of the raw water discharge prior to the concentrate redistributing in a body of source raw water 22a. In one embodiment the fan or blower may be configured to act as a vaporization chamber in which ambient air pressure acts to shear the raw water concentrate into smaller droplets, the resulting interfacial surface area provides a means of rapid heat loss and therefore vaporization of at least a portion of the raw water concentrate. In other various embodiments, the interaction of raw water concentrate and ambient air may be accomplished by using any one or combination of structured packing, random packing, water nozzles, atomizing nozzles, plates, bubblers, sprayers or other surface area generating means of known art. In other various embodiments, other heat exchanger configurations of known art may be placed between vaporization chamber 10a and tank 22 as a means of transferring at least a portion of heat within the raw water concentrate discharge into raw water being delivered to zone 24a via piping system 52. FIG. 2B shows an embodiment where chamber 10a is configured directly to the engine.

The vaporization or shearing chamber may be oriented horizontally, vertically or at any angle with respect to the exhaust gas 14a flow and/or the cooled gas flow exiting either of a vaporization chamber or entrained droplet separation system. It is within the vaporization chamber flow zone 63 (FIG. 5) that raw water is sheared into droplets of various average droplet sizes. In one embodiment the interfacial interaction of the exhaust gas 14a and the raw water forms a dual fluid direct contact interaction cloud 62. It is generally this cloud area that raw water is at least partially sheared into smaller average droplet sizes by shearing forces of gravity, water pump pressure shearing raw water against a raw water distribution nozzle 22h as it discharges into the vaporization chamber, exhaust gas pressure and/or shearing forces of raw water against components or edges within the vaporization chamber flow zone 63. Within the vaporization chamber flow zone 63 a portion of the raw water feed is vaporized while a remaining portion, now a raw water concentrate, is permitted to wash chamber 10a and drain from either the vaporization chamber 10a or 10b, depending on the configuration.

Figure 2A:
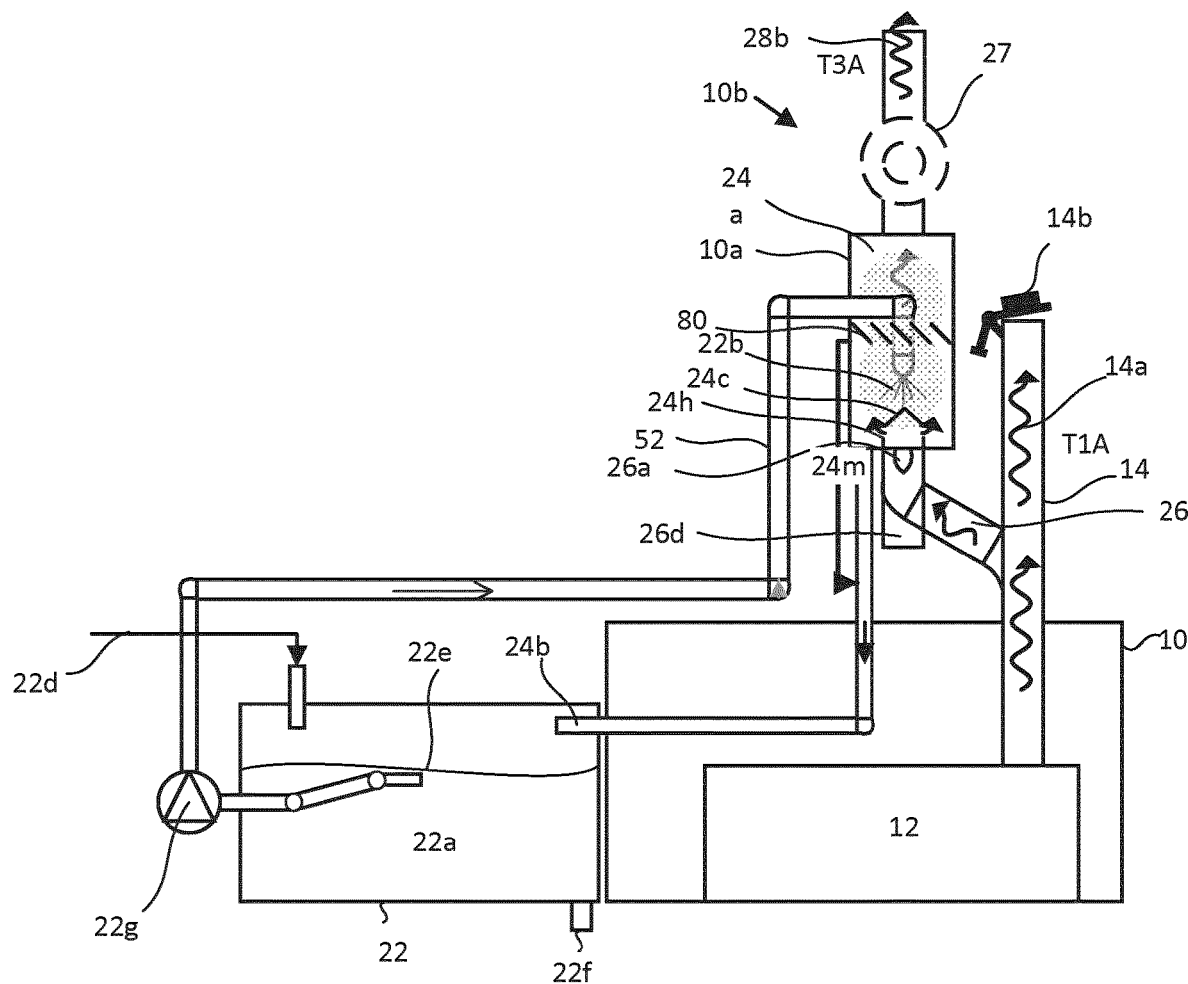
FIG. 2A is a schematic cross sectional view of a raw water vaporization system in accordance with one embodiment of the invention with a vertical vaporization chamber.
Figure 2B:
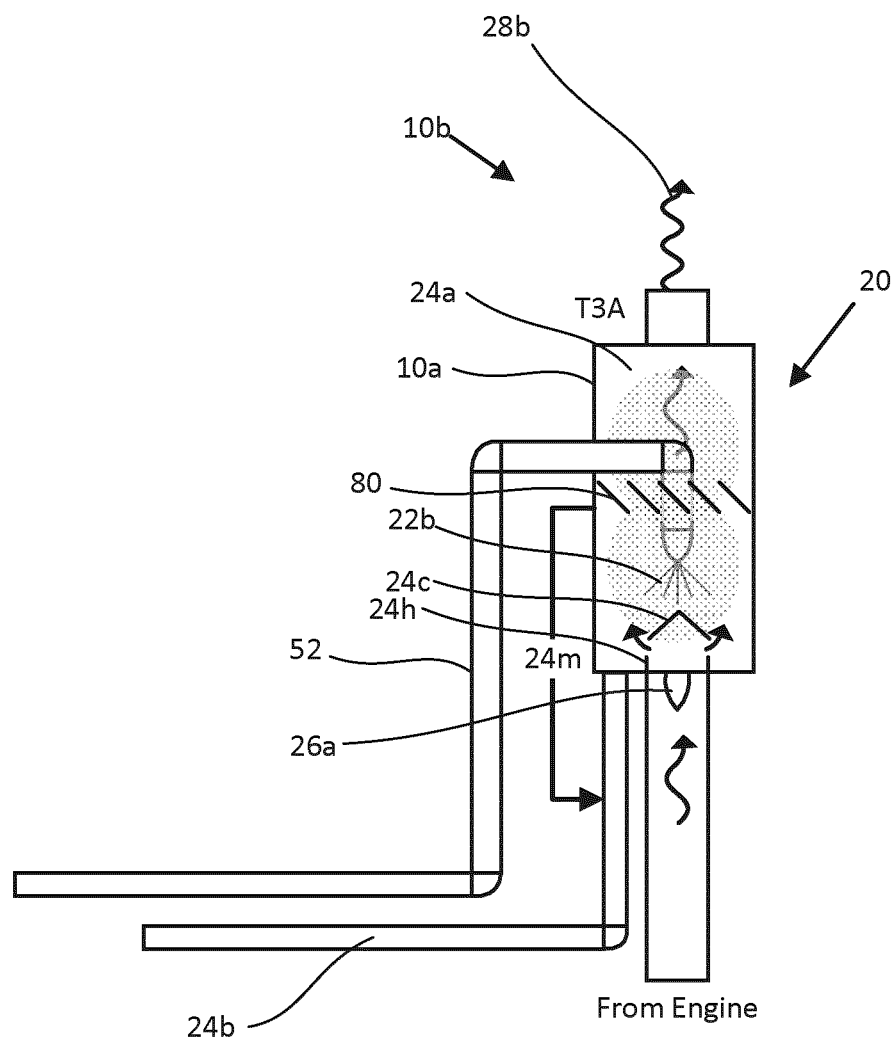
FIG. 2B is a schematic cross sectional view of a raw water vaporization system in accordance with one embodiment of the invention with a vertical vaporization chamber configured directly to an engine exhaust.

FIG. 2A shows an embodiment of the RWVS where the vaporization chamber 10a is configured to an engine exhaust in a vertical orientation. As shown, the chamber 10a with zone 24a is connected to an exhaust system 14 by a diversion system 26 enabling exhaust gases to be diverted upwardly and through the chamber. As shown in FIG. 2A, in one embodiment, the raw water 22b is sprayed into the zone 24a in a downward direction against upwardly flowing exhaust gases 14a. The diversion system 26 is preferably configured with one or more traps 26d to contain any raw water that may have made its way into the diversion system and so to prevent water from flowing towards the engine 12. Passive and/or active valves (not shown) may form part of the trap to enable any raw water to be drained therefrom. In addition, at the interface between diversion system 26 and chamber, the RWVS may preferably be configured with a raised lip 24h around the perimeter of the inlet to direct raw water away from the diversion system piping towards drain 24b. In another embodiment, the exhaust gas inlet may be provided with a cover 24c that fits over the raised lip and allow exhaust gases to be diverted around the underside of the cover whilst allowing raw water that is not immediately sheared to flow over the cover and towards drain 24b. Preferably, the cover has a shape that enables high shearing contact between the raw water and the exhaust gases as in other embodiments described above.

FIG. 2A shows two options for centrifugal demisting including a centrifugal demisting system (CDS) 27 and/or stator blades 80 configured within zone 24a, the function and operation of which is described below. Other demisting systems of known art may be employed in various embodiments.

In various embodiments, some or all of the exhaust gas flow may be directed through the chamber regardless of whether it is desired to evaporate raw water at a given time, including times at which raw water is not being distributed to the chamber.

FIG. 2B shows an embodiment similar to FIG. 2A but where the chamber is connected directly to an exhaust system 14 without a diversion system 26. In this embodiment, exhaust gases will always flow through the chamber when the engine is running. While this embodiment may provide some advantages including a simpler design and a possible reduction in back pressure, the implementation of this device must also consider the need to shut down the engine to conduct any maintenance/cleaning of the chamber and if in the upwards vertical orientation incorporating a trap to contain raw water that could potentially enter the exhaust system. In other embodiments similar to FIG. 2B, the engine exhaust gasses may enter the chamber from the top, side or any angle in-between and flow the exhaust gasses downwardly and/or horizontal and/or an angled orientation. In these described embodiments, the engine exhaust gas may flow through the chamber while the ending is running, regardless of whether or not raw water is being delivered to the chamber which may remove the need for an engine exhaust gas diversion system. Line 24m may be provided to assist water flow to the lower regions of the chamber 24.

Figure 2C:
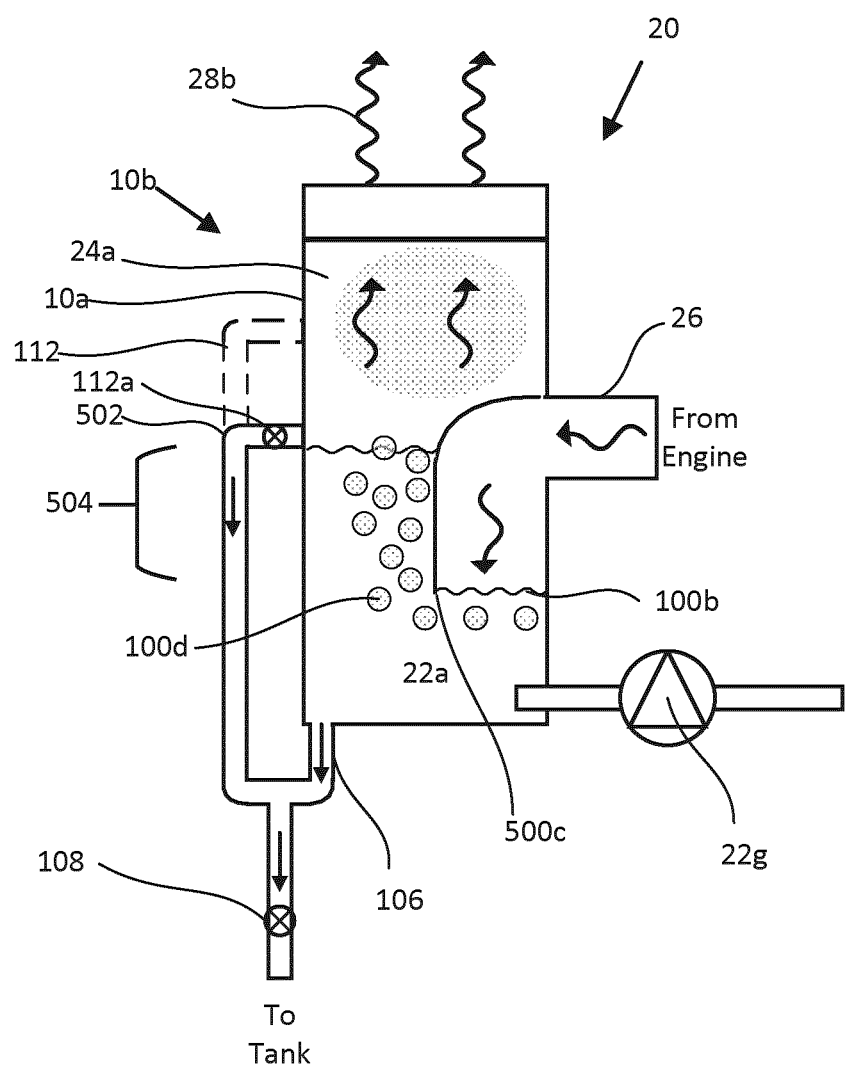
FIGS. 2C and 2D are schematic side views of two raw water vaporization systems in accordance with one embodiment of the invention with an engine exhaust source immersed within a shearing zone.
Figure 2D:
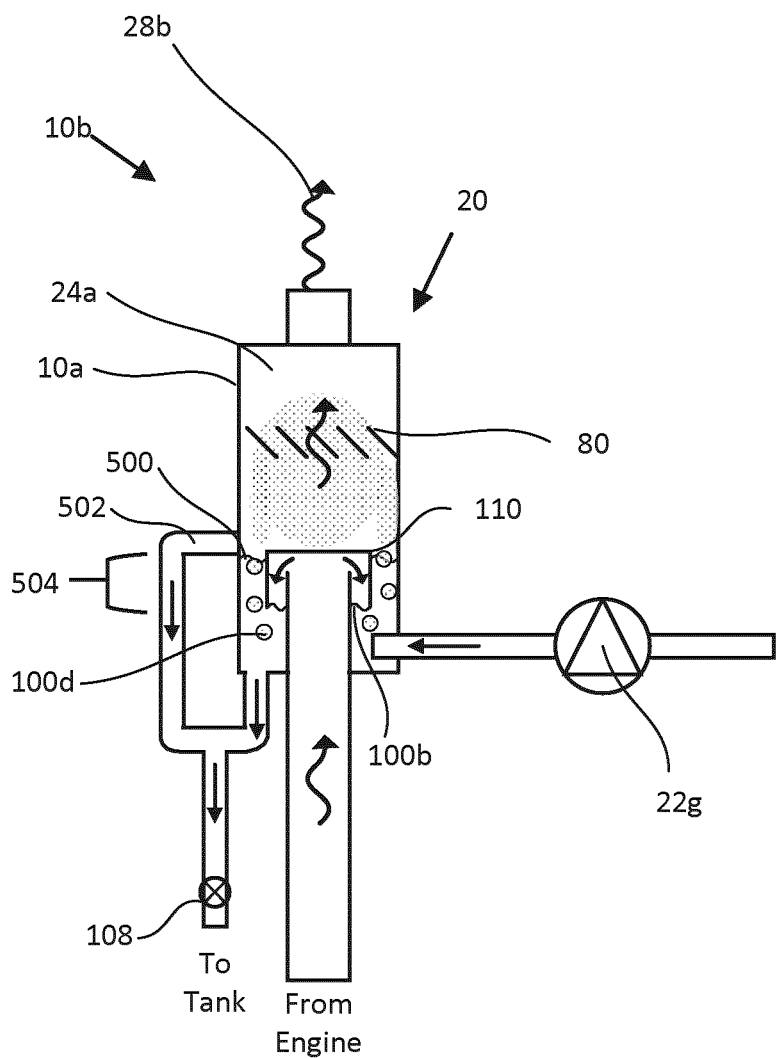

FIGS. 2C and 2D show further embodiments of a RWVS 10 system having a chamber 10a where an engine exhaust source is immersed within a raw water volume. In these embodiments, the RWVS is configured such that the exhaust gas enters below the surface of a volume of raw water and enables raw water shearing and evaporation without a spraying system.

As shown in FIG. 2C, exhaust gas 14a is diverted to within chamber 10a below a raw water surface 100. An interface 100b between inflowing exhaust gas and the raw water is created at a level generally determined by the edge 100c of the piping 26. As the exhaust gas is flowing into zone 24a under pressure, the exhaust gas impacts the raw water and causes the formation of bubbles 100d that rise within zone 24a whereupon they pass through interface 100. During transition from the interface 100b to interface 100, heat is transferred to the raw water to effect vaporization of the raw water that is then released to the atmosphere as combined exhaust and vaporized water 28b.

The upper level of raw water may be maintained by an overflow system 502 that causes raw water above a certain level to overflow out of zone 24a. Accordingly, this system maintains a substantially steady back pressure on the engine as determined by the difference in height 504 between upper interface 500 and lower interface 500c. That is, if the raw water level within zone 24a rises above 500, raw water will flow into the overflow system 502. In one embodiment, the overflow system is connected a tank as described above thereby allowing the recirculation of raw water through the RWVS. In addition, the zone 24a may be provided with a second drain 106 that can be activated to allow a full emptying of the zone 24a under the action of a valve 108. Such a valve may be a passive or active valve responsive to pressure or in the case of actively controlled valves, activated as a result of operator input and/or controller input. For example, as concentrates may collect at the bottom of zone 24a, it may be desirable to periodically flush the zone 24a to effect cleaning of the zone 24a.

In these embodiments, it is preferred, that like other embodiments, the surface area between exhaust gas bubbles 100d and raw water is increased so as to more effectively enable heat transfer from exhaust gas heat to the raw water and mass transfer of liquid raw water to evaporated raw water. Accordingly, diffusers (not shown) will preferably be utilized adjacent to or as part of the exhaust gas outlet so as to effect the formation of multiple small bubbles as the exhaust gas enters zone 24a.

FIG. 2D shows a different embodiment where the exhaust gas rises vertically into zone 24a and where the exhaust piping 14 has a cap 110 that diverts the exhaust gas downwardly into a volume of raw water.

In both embodiments, although just shown in FIG. 2D, stator blades 80 may be optionally incorporated as a demisting system.

In further embodiments, the overflow system may have multiple outlets 112 and corresponding valves 112a that may be configured to enable an operator to set different WC back pressure based on the height difference between the outlets and lower interface 100b. Similarly, control valve 108 may be activated or partially activated to allow the raw water level within zone 24a to rise or fall and thus control the back pressure.

Concentrator Tank

In another embodiment, FIGS. 2E and 2F show a concentrator tank 107 which is configured to hold water for delivery to the vaporization chamber 10a and to receive water from the vaporization chamber. The tank may be configured to receive and provide water to two or more vaporization units 103 (See FIGS. 1, 1F and 1E). The tank comprises a main chamber 191 for raw water 196 and an overflow chamber (condensate tank) 192 for floating components 197 (e.g. hydrocarbons). The level within the main chamber is controlled by a series of switches 193a, 193b, 194a, 194b activated based on the level of the water 196. In this case, there are two high-level switches 193a, 193b configured to restrict water flow into the tank when activated and two low-level switches 194a, 194b configured to allow water flow into the tank when activated. These switches are configured to controller 111 which activate P1 to control the flow of water into the tank.

Therefore, in operation, the level of raw water 196 in the main chamber 191 cycles between the levels of these switches. In one embodiment, within the main chamber is a baffle 195 which is positioned between the two sets of switches and substantially extends across the main chamber 191. The baffle 195 is configured to funnel any floating components 197 above the water line into a narrow vertical channel 198 as the water in the main chamber 191 rises. This has the effect of increasing the vertical height of the floating components 197 such that they overflow into the overflow or condensate chamber 192 when the water level in the main chamber 191 reaches its maximum height. This allows these floating components 197 to be removed from the raw water so that they are not recycled through the vaporization unit and to be stored as they may be a valuable byproduct of the process including recoverable hydrocarbons. The overflow chamber 192 may be configured with level switches 192a, 192b which activate a further pump P4 to control the level of fluids in the overflow tank.

In Line System

Figure 2G:
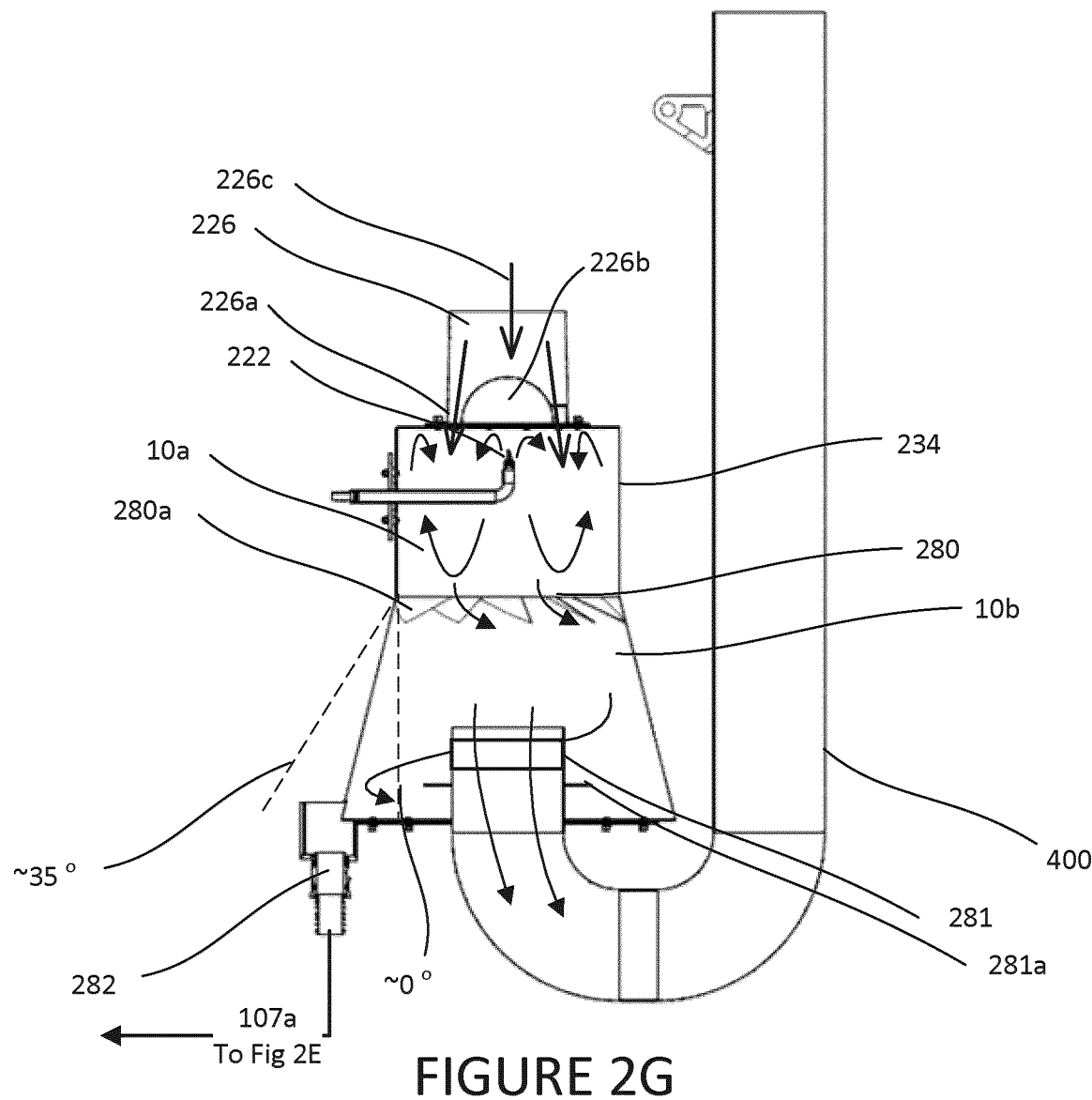
FIG. 2G is schematic cross-sectional view of a vaporization chamber and demister in accordance with one embodiment of the invention.

FIG. 2G shows a raw water vaporization system (RWVS) 10 comprising a shearing chamber 10a for vaporizing water having interior walls 234 and a deflector plate 280. In this case, the deflector plate 280 is configured to be at the bottom of the shearing chamber 10a when in use. The vaporization chamber 10a in this case further comprises a raw water nozzle 222 configured to introduce raw water into the chamber 10a. In this case, the raw water nozzle 222 is positioned centrally within, and towards the middle to top of the shearing chamber 10a and is configured to direct raw water upwards and outwards from this nozzle central location.

The vaporization chamber 10a in this case further comprises a combustion gas conduit 226 having a directed outflow orifice plug 226b configured to direct combustion gas 226c into the raw water ejected from the raw water nozzle 222 so as to vaporize a portion of the raw water and to drive the remaining raw water portion into the deflector plate 280. The outflow orifice 226a is arranged so that the combustion gas impinges on the raw water flow by the outflow orifice 226a being arranged centrally within, and towards the top of, the shearing chamber and whose flow is directed downwards and outwards from this outflow orifice central location. The gas flow in FIG. 2G is indicated by open-headed arrows, whereas the liquid flow is indicated by solid-headed arrows. It will be appreciated that the combustion gas source may be derived, for example, an engine or a flame or flare.

Having the combustion gas outflow orifice 226a at the top of the shearing chamber 10a may help prevent water flowing back through the hot gas conduit 226 towards the hot gas source (e.g. back into the engine). By impinging the hot gas directly into a flow of raw water, any vibrations within the hot gas flow may be suppressed through, for example, absorption by the water flow; damping of the vibrations by the water flow; and/or acoustic decoupling (as vibrations in the water flow are not transmitted directly to the chamber walls). In this way, the dual-fluid interaction enables the dual-fluid section act as a muffler for the exhaust gases.

To ensure that the water hits the deflector plate 280, the vaporization chamber 10a may be configured to control the flow rate of the hot gas and/or the flow rate of the raw water.

When the water hits the deflector plate 280 in this embodiment, the raw water may have a velocity with a lateral component which is away from the central axis of the shearing chamber 10a. This will encourage the water to be reflected up along the side interior walls 234 to the top of the shearing chamber. This will flush the interior walls of the shearing chamber to help ensure that dry portions do not occur thereby helping to prevent scaling issues. That is, the vaporization chamber 10a, raw water nozzle, and hot gas conduit may be configured such that, in use, substantially all of the interior walls of the vaporization chamber 10a are flushed by the remaining raw water portion. This helps wash away any build up of scale and prevents scale from forming. In various other embodiments the deflector plate 280 and 280a are the same and together act as a stator. In other embodiment the gas flow velocity and pressure entering chamber 10a is substantially neutralized by the raw water volume, pressure and flow angle such that the water passes through the gas flow directly onto the interior walls 234 causing cleaning and washing of chamber 10a. In this configuration plate 280/280a primarily functions as a stator and cyclone inducer.

By the chamber and directed outflow orifice of the hot gas conduit being substantially circularly symmetric about a central axis, there is no preferred direction about the central axis for the water to go. This helps ensure that all (azimuthal) angles of the shearing chamber 10a are equally well flushed. In order to maintain flushing and/or relatively low temperatures within the shearing chamber, the liquid flow may be controlled to ensure that only a portion of the raw water is vaporized. For example, the liquid flow may be controlled such that between 10-30% of the water is vaporized in a single pass through the vaporization chamber 10a.

In one case, the nozzle 222 is configured to eject the raw water in a spray of medium to very course droplets. The outflow orifice 226a in this case comprises an air knife configured to form an extended blade of moving gas. In this case, the air knife is formed from a hollow cone which has a total cross-sectional area less than that of the exhaust conduit. Reducing the cross-sectional area of the conduit in this way accelerates the exhaust gases such that, in this case, the exit velocity of the hot gases within the shearing chamber are between 30-100 m/s (e.g. between 40-80 m/s). The hollow cone means that, in this case, the blade of fast moving hot gas within the shearing chamber is curved. It will be appreciated that the constriction is preferably located next to the outlet orifice (e.g. within 6 inches or within 12 inches) rather than providing an extended constriction in the hot gas conduit because an extended constriction may unnecessarily increase back pressure on the hot gas source.

This blade of high-speed hot gas impinges on the water droplets ejected from the raw water nozzle causing shearing of the droplets. In this way, the size of the water droplet may be reduced (e.g. from medium to fine). Reducing the droplet size helps vaporization by reducing the surface area to water droplet mass ratio. That is, the heat from the gas can more effectively be transmitted to smaller droplets with larger surface area.

In this embodiment, the temperature of the hot gas is around 400° C. as it exits the outflow orifice 226a. In this case, the raw water flow is controlled in order that the heat transfer from the hot gas is such that the hot gas is cooled before reaching the interior wall of the shearing chamber. In this case, the gas is cooled to between 40° C. and 70° C. within 6 inches of the outflow orifice. This means that the temperature of the gas is relatively low (less than 100° C.) by the time it reaches the interior wall of the shearing chamber. This may allow the shearing chamber interior walls 234 and deflector plate 280/280a can be formed from, or coated with, materials which are less resistant to high temperatures (e.g. plastics, polytetrafluoroethylene-PTFE). Coatings such as PTFE may be used to mitigate scaling. In order to ensure that the hot gas does not reach the interior wall of the shearing chamber, the control system may be configured to ensure that the raw water is distributed within chamber 10a by nozzle 222 before the outflow orifice during start-up, and deactivated after the outflow orifice during shut down.

The shearing effect is dependent on the relative velocity of the water droplets and the hot gas. Therefore, a decrease in the velocity of the raw water may be offset by an increase in velocity of the hot gas (and vice versa). Likewise, an increase in the velocity of the hot gas (which may improve shearing) may allow a nozzle which emits larger-sized droplets to be used. In this case, the configuration of the hollow cone is fixed. In some embodiments, the cone channel width can be controlled by, for example, moving the inner cone axially with respect to the outer cone. This control may be passive (e.g. with the cones being spring loaded to automatically adjust for changes in gas pressure) or active (e.g. with the cones being positioned by actuators in response to sensed gas pressure and/or temperature). Moving the inner and outer cones together will narrow the cone channel thereby increasing the exit velocity of the hot gas (and increasing the resistance to flow).

Some embodiments may comprise a control system configured to adjust the outflow orifice based on measured engine parameters in order to increase vaporization and/or narrowed with respect to when the engine is running at higher rpm. It will be appreciated that any constriction in the outflow orifice must be matched to the engine. That is, some engines may be able to tolerate a relatively large back-pressure (e.g. 20-40 inches WC) whereas others may be able only to tolerate a modest back-pressure (e.g. 10-14 inches WC). For engines with larger back-pressure tolerances, the constriction in the outflow orifice may be more severe allowing a higher-velocity gas flow to be produced and more rapid vaporization to be effected.

Because raw water contains contaminants (e.g. small particulates or solids), it is important that the liquid system is robust and not sensitive to small blockages. Therefore, it is generally preferable to use nozzles configured to emit relatively large droplets. That is, a nozzle configured to emit larger droplets will generally need a larger particulate to block the nozzle than a nozzle configured to emit smaller droplets. The nozzle in this case is a spiral nozzle configured to produce a hollow cone spray. Spiral nozzles may be more resistant to particulate blockages. Other embodiments may use other nozzle types such as plain-orifice nozzles, pressure-swirl single-fluid spray nozzles, full cone or shaped-orifice nozzles. Nozzles may also be self-cleaning where periodically, for example, a jet of air is passed through the nozzle to remove and films/scales or other build-ups from the nozzle surfaces.

Particulate contaminants may also restrict which pumps are best to use in particular embodiments. For example, a positive displacement pump such as a piston pump requires an exact fit between the moving components of the pump to generate a high pressure. Particulates between these components may result in the pump being damaged. In contrast, lower pressure pumps such as centripetal pumps may not require a tight fit between moving surfaces of the pump and so these pumps may be less sensitive to particulates within the fluid flow. This means that, for embodiments where particulates may be present in the liquid flow, it may be preferable to use lower pressure pumps in conjunction with a larger water-droplet nozzle. It will be appreciated that other embodiments may use a pre-filter to screen particulates larger than a threshold size before the liquid is passed to the pump and nozzles.

In this case, the deflector plate 280 is connected to or comprised of a stator 280a configured to induce circular motion of the gas flow and the entrained droplets as the gas flow passed from the bottom of the shearing chamber into a demisting chamber. The stator, in this case, comprises a series of radially arranged vanes, each vane having a surface angled about the respective radius. In this way, the liquid flows in a helix towards the bottom of the demisting chamber. Thus a demisting cyclone is induced in one embodiment from the pressure within ICE exhaust gas. In this embodiment the pressure from the ICE exhaust was utilized firstly as a shearing for on raw water and secondly as force pressure for cyclonic demisting.

The demisting chamber, in this case, is a frustoconical section aligned co-axially or inline with the shearing chamber. The conical section is narrower at the junction with the shearing chamber and gets wider with increasing distance from the shearing chamber. This means that the radial dimension of the helical motion of the liquid droplets through the demisting chamber gets larger as the liquid moves away from the shearing chamber which causes water droplets (i.e mist droplets) that have impinged on the inside walls of the demisting chamber to slow down as they move away from the central axis and hence drop towards the bottom of the demisting chamber. Preferably, the vaporization chamber and demisting chamber are symmetrical about a central axis. The demisting chamber will typically have side walls having an angle with respect to the central axis of the system of between about 0-35 degrees (preferably about 20 degrees). The sloping side walls of the demisting chamber allow for a greater operating range of pressures between different installations and gas sources while providing effective demisting within a more compact design. That is, while non-sloping walls can be effectively used in various embodiments, demisting chambers having non-sloping walls may typically be less effective when installed on engines/gas sources that have a wider range of operating gas flows and pressures. The sloping side walls also assist in preventing re-entrainment of previously demisted water droplets. In some configurations the geometries of the shearing chamber and demisting vessel are minimized to limit inner surface area that may promote dry surfaces and result in unwanted scaling. As can be understood tight geometries within a cyclone can re-entrain water into the cyclone, so an outwardly sloping interior cyclone wall allows the tightest geometry while providing sufficient distance between the interior wall of the cyclone and the exterior wall of the exit pipe 281.

At the base of the demisting chamber there is a gas and concentrated raw water outlets. The gas outlet is arranged centrally and extends within the demisting chamber. This allows water to pool at the outer portions of the base of the demisting chamber where it is drained by the concentrated raw water outlet 282.

The gas outlet 281, in this case, comprises a flange 281a configured to prevent water impinging on the base of the demister section 10b from being reflected or crawling upwards towards the centre of the demisting section and down through the gas outlet. In this way flange 281a protrudes into the highest RPM region of the cyclone and assist in preventing water crawl due to cyclonic air movement as the lower region of the demister.

In other embodiments, the deflector may be connected to a rotor (actively or passively driven) to induce circular motion in the gas and/or liquid flow as it passes and/or drains from the bottom of the shearing chamber into the demisting chamber.

Figure 2H:
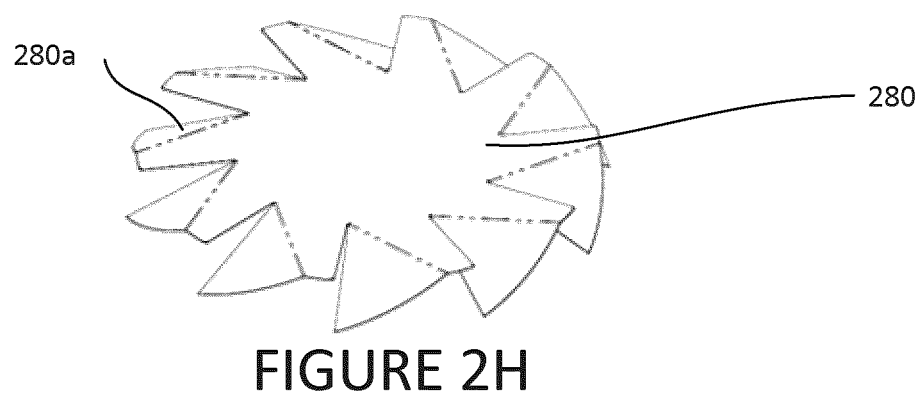
FIG. 2H is a perspective view of a stator in accordance with one embodiment of the invention.

FIG. 2H is a perspective view of one embodiment of a deflector plate 280 and stator 280a.

Multi-Vaporization Vessels/Chamber Embodiments

In various embodiments in which a cluster of vaporization chambers 10 is placed around the perimeter of a large exhaust stack 300 (for example on the exhaust stack of a 50 MW steam generator), a single large fan or blower can be enabled within the main stack to enable exhaust push pressure into the cluster or exhaust induction pressure through the cluster. In these configurations either positive or vacuum pressure through or from the cluster may deliver exhaust gas flow through each vessel via a single header 401 (FIG. 2k) around the blower or into each individual vessel directly. In other embodiments, each vessel within the cluster may have an individual fan or blower either upstream or downstream of the vaporization chamber and/or demisting system. In these embodiments it may be preferable to inject water at a higher pressure than designed into a system configured to an engine. The higher shear pressure of the water pressure on a spray nozzle results in smaller droplets and rapid thermal transfer of combustion gas heat into water, enabling rapid vaporization. Since the pressure from a blower or fan must consume a new energy input, it is preferable to allow the pressure from the blower to primarily act on demisting thereby minimizing the cost and requirement for supplemental energy input.

Certain embodiments may comprise more than one vaporization chambers 10a. For example, a portable retrofit embodiment may comprise a pair of RWVS 10. Each RWVS may have a separate intake for independently receiving hot gas from one or more hot gas sources. In other embodiments, the reactors may be connected to a manifold for distributing gas to multiple vaporization chambers from a central gas source.

Figure 2I:
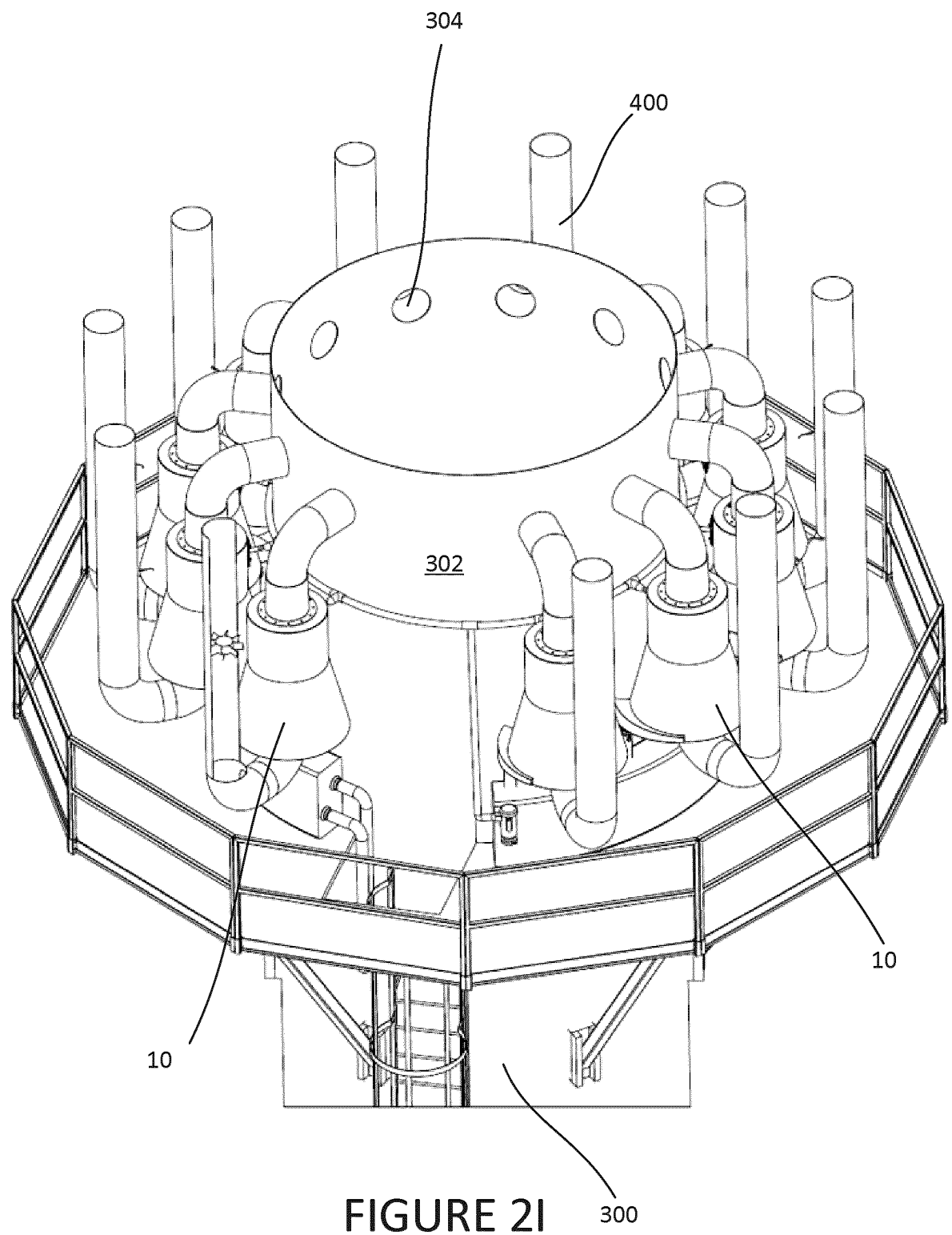

FIG. 2I shows a multi-vaporization chamber for use in conjunction with a chimney stack 300. In this case, the raw water vaporization system (RWVS) comprises a chimney extension portion 302 comprising a central channel configured to sit inline with the existing chimney. That is, this embodiment is configured to be retrofit to an existing chimney stack 300 by being attached to the top of the chimney stack.

Around the perimeter of the chimney extension portion there are a series of hot gas inlets 304 for receiving hot gas passing through the central channel. The hot gas from each inlet is directed down through a respective RWVS (e.g. similar to that shown in FIG. 2G) where water is mixed with the hot gas to vaporize the raw water and cool the hot gas.

Cooled gas, containing vaporized water, is released to atmosphere through exhaust 400 generally at a position above the corresponding inlet.

Figure 2J:
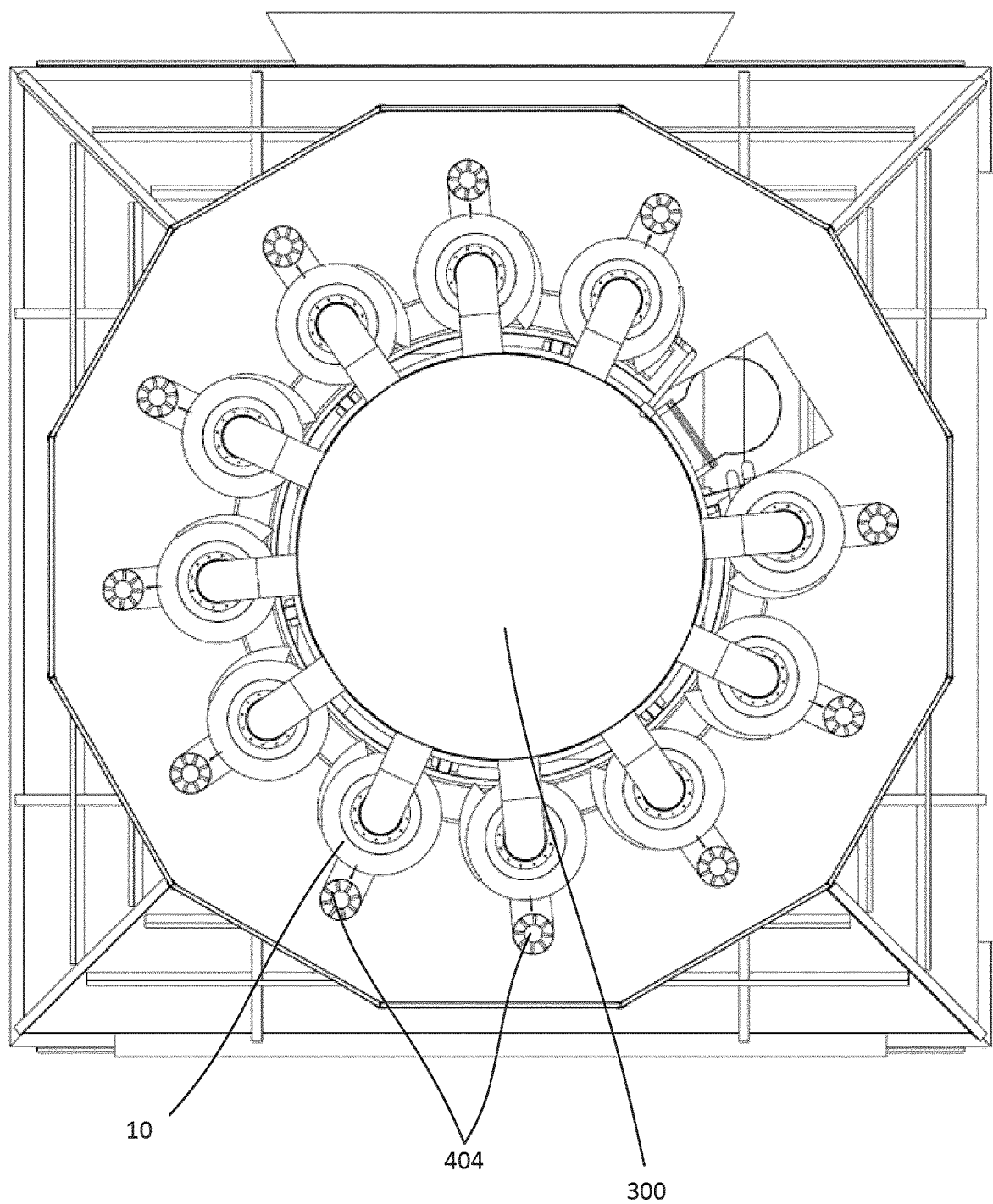

In various embodiments, the force necessary to impel the gas through the vaporization chambers 10a is provided by one or more fans 404. FIG. 2J shows an embodiment where fans are placed between each outlet and the respective RWVS, FIGS. 2K and 2L show an embodiment where a single large fan directs hot gas from the central channel to a plurality of vaporization chambers 10 and FIGS. 2M, 2N and 2O show an embodiment where fans are placed between each inlet and the respective RWVS's 10.

Figure 2K:
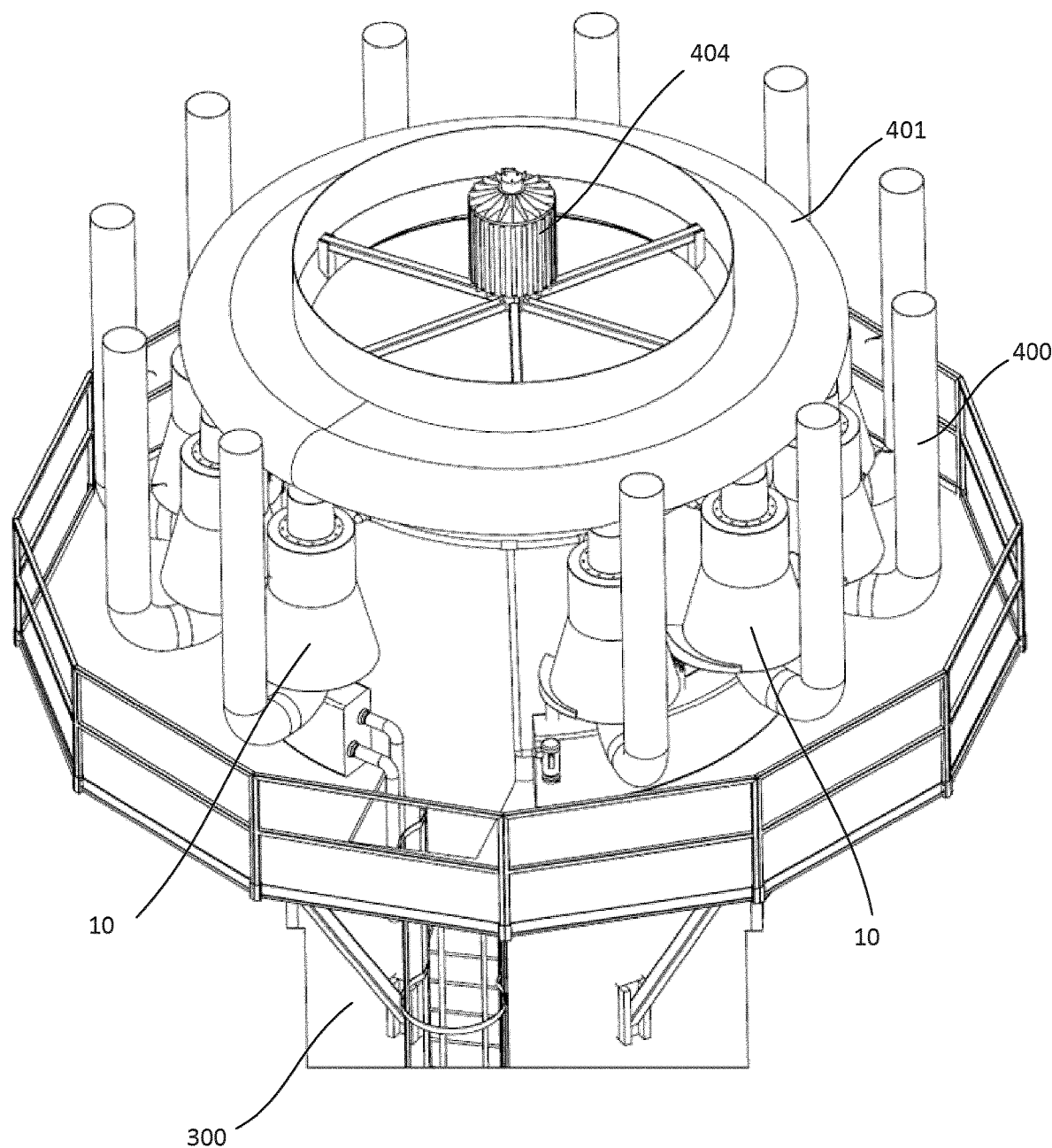
FIGS. 2K and 2L are a perspective and plan view showing multiple RWVS's configured to a steam generation stack with a central diverting fan in accordance with one embodiment of the invention.
Figure 2L:
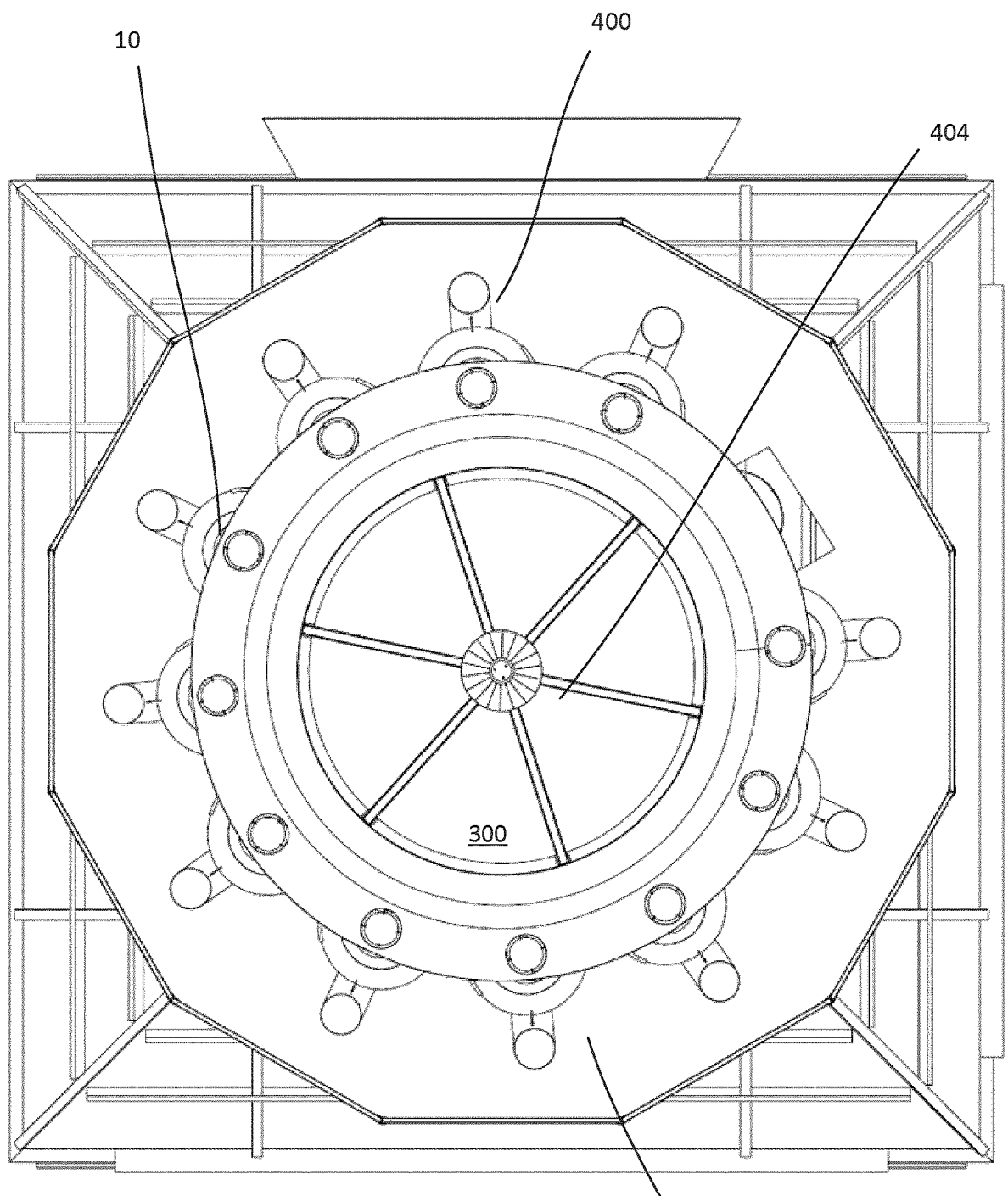
Figure 2M:
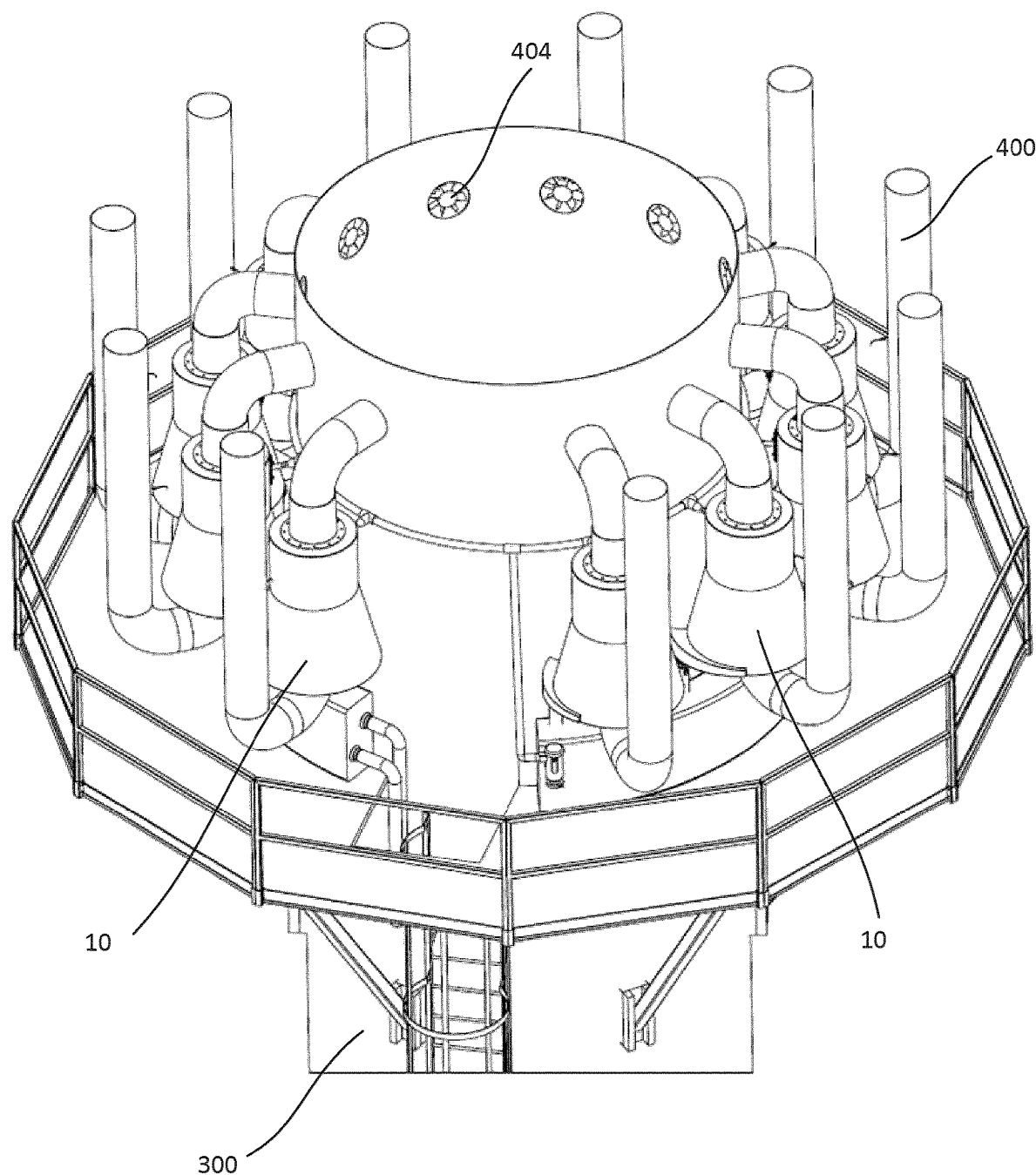
FIGS. 2M, 2N and 2O are a perspective, plan and cross-sectional view showing multiple RWVS's configured to a steam generation stack with multiple inlet diverting fans in accordance with one embodiment of the invention.
Figure 2N:
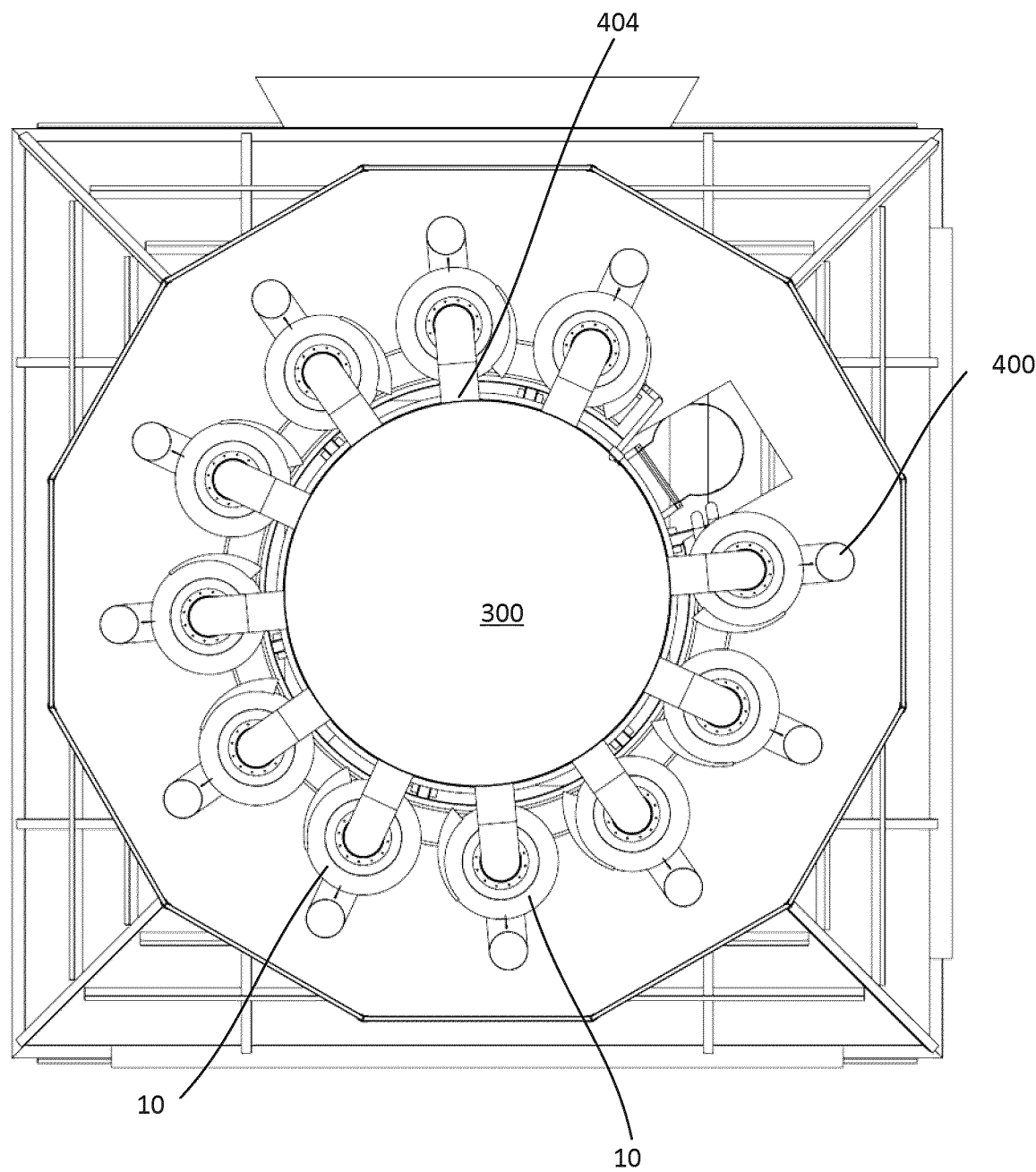
Figure 2O:
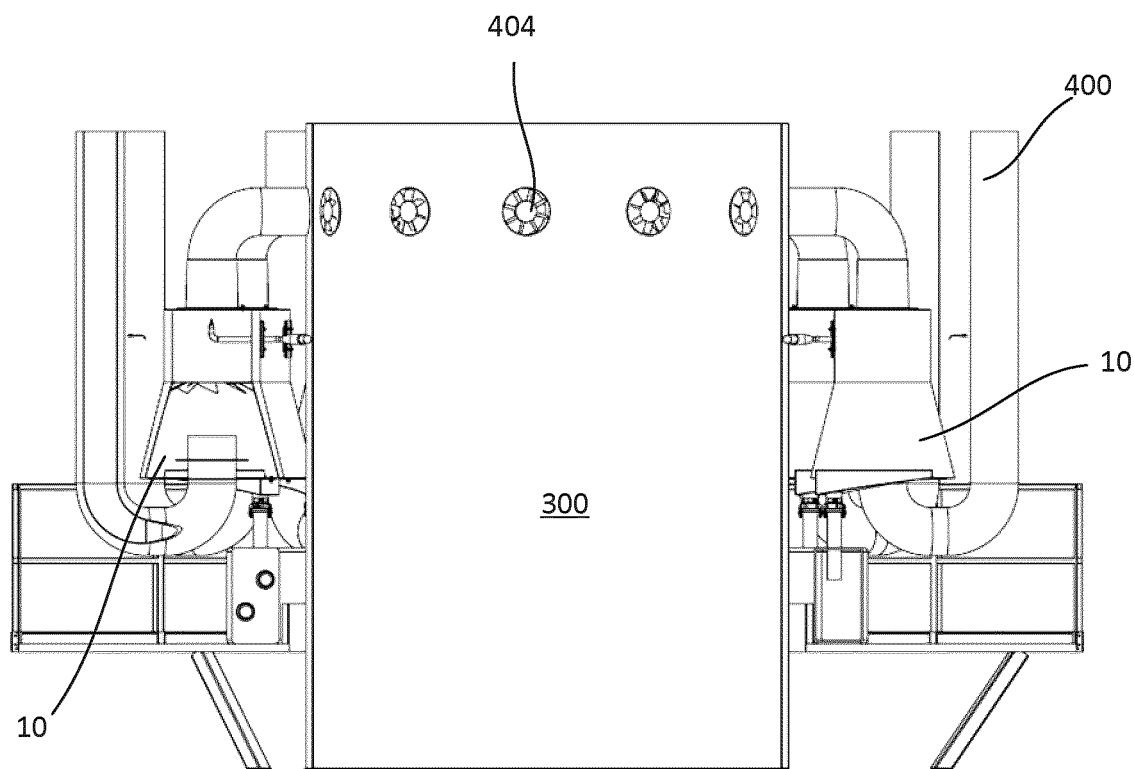
Figure 2P:
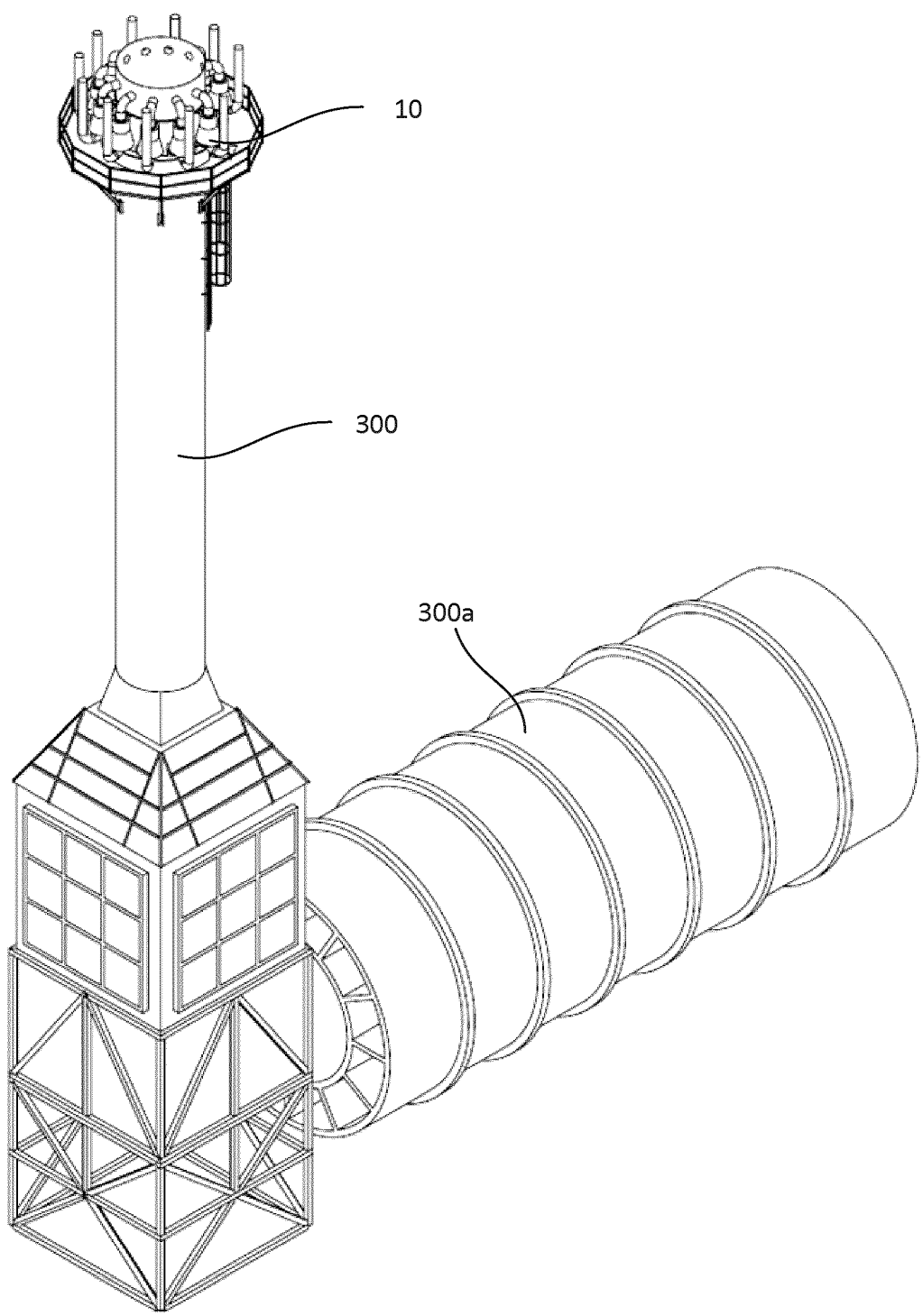
FIG. 2P is a perspective view of showing a steam generation stack and related steam generation equipment configured with multiple RWVS in accordance with one embodiment of the invention.

In this deployment, the RWVS's may be relatively inaccessible as they may be located high off the ground (FIG. 2P). As such, the self-washing of the interior of the vaporization chambers, non-stick coating to certain wet/dry areas and/or periodic air pulsing/cleaning of the water nozzle(s) helps reduce the need for regular cleaning. In order to prevent clogging of the nozzles (e.g. in embodiments where the nozzles are relatively inaccessible), the raw water may be pre-screened (e.g. at ground level in this case) to remove particulates of a size greater than the tolerance of the nozzles before being pumped to the nozzles. This may be performed by pumping the raw water through a mesh or screen.

In the embodiment shown in FIGS. 2K and 2L, the single fan configured to distribute gas from within the chimney stack into each of the RWVS's is a centrifugal fan powered by a motor arranged centrally within the central channel. The centrifugal fan redirects gas flow coming through a header 401 and laterally into pipes feeding the RWVS. It will be appreciated that using a single motor for multiple RWVS's may reduce maintenance and reduce weight and cost. RWVS's made with plastics, which as light weight compared to steel housings of prior art systems, made the present invention suitable for remote and satellite installations.

As shown in FIG. 2K, a concentrator tank 107 is located around the perimeter of the central channel below and adjacent to the vaporization chambers. In this case, all of the vaporization chambers use a common concentrator tank. This may allow only some of the vaporization chambers to be used in some configurations (e.g. reduced hot gas production or maintenance cycles). In other configurations concentrator tank 107 can be located at ground level to minimize weight.

Raw Water Shearing and Vaporization

Raw water shearing and vaporization may be at least partially achieved as a result of the push pressure of the exhaust gas in combination with the shearing forces imparted on the raw water from both exiting nozzles, or other water discharge device or system delivering raw water to zone 24a under any range of engine pressure from very little pressure to high pressure, and the subsequent impact and/or mixing with the exhaust gas stream.

In one embodiment, within the zone 24a, raw water is pumped through a nozzle or nozzle system 22h, or other water discharge device or system (herein sometimes referred to as a nozzle or nozzles) that will create an initial amount of raw water surface area and/or initially atomize at least a portion of the water into droplets at the moment of exit through the nozzles or discharge device. In this embodiment, as a result of the positioning of the nozzles relative to the exhaust stream, the water droplets are immediately impacted by high temperature and/or rapidly flowing exhaust gases which will further impart shearing forces on the water droplets. Depending on the particular parameters of the system at a given time including raw water flow rate, nozzle design, exhaust gas temperature, exhaust gas pressure and flow rate, and position of the nozzles, a desirable rate of vaporization of raw water will occur resulting in the creation of water vapor and concentrated raw water contaminants. Generally, the water vapor will be conveyed to the exhaust system 28 whereas concentrated raw water will be returned to the tank 22.

Nozzle and Air Knife Systems

Figure 3:
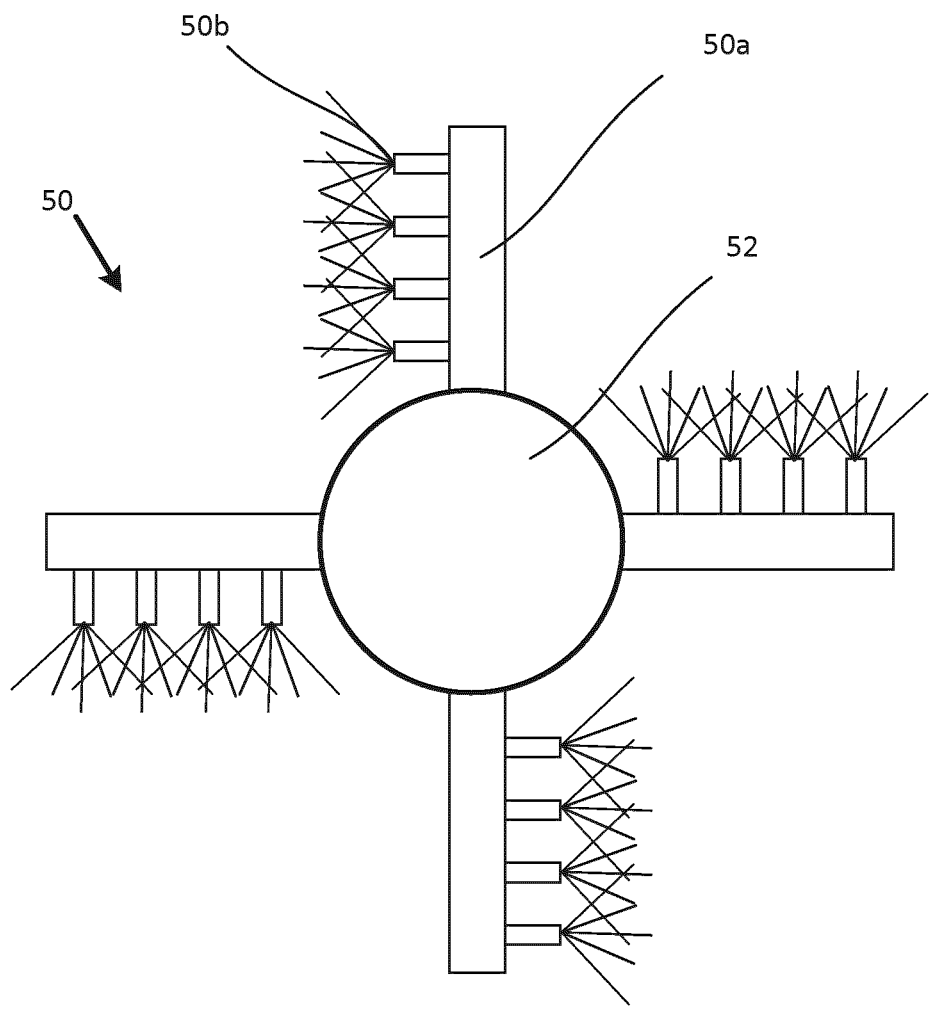
FIG. 3 is a schematic plan view of a plurality of nozzles and nozzle arms in accordance with one embodiment of the invention.

FIG. 3 shows an embodiment of a four-armed nozzle system 50 connected to pipe 52 and having nozzle arms 50a and nozzles 50b to effectively distribute raw water within the exhaust stream. The nozzle arms 50a may be longitudinally distributed along the central pipe 52 in various embodiments.

As shown in FIGS. 4A-4F, the interaction of raw water with the exhaust can occur in a number of ways to impart shearing forces and/or turbulence as a means of interfacial surface area generation and therefore desirable thermal and mass transfer. Further, these Figures also illustrate various separate and combined examples of optional exhaust delivery devices or systems herein sometimes referred to as air knives, the air knives configured directly to DFR 10a and deliver exhaust gas 14a from an exhaust system 14 or delivery system 26 to DFR zone 24a. Various optional air knives may be configured and utilized as a means to manipulate the exhaust gas pressure, velocity, delivery orientation and/or speed prior to the delivery of the exhaust gas 14a into zone 24a.

Figure 4A:
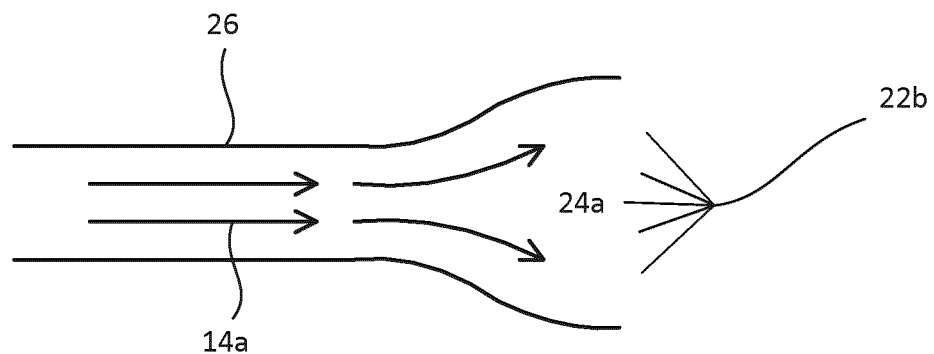
FIGS. 4A-4F are schematic diagrams of various exhaust gas delivery systems and various exhaust/water contact configurations in accordance with various embodiments of the invention.

For example, in FIG. 4A, exhaust piping 26 or 14 (as in FIG. 2A) conveys exhaust gases 14a to zone 24a where raw water 22b is sprayed countercurrent to the exhaust gas flow. The entry point of exhaust piping 26 to zone 24a may be tapered to expand the transition zone which may be used to create areas of lower pressure.

Figure 4B:
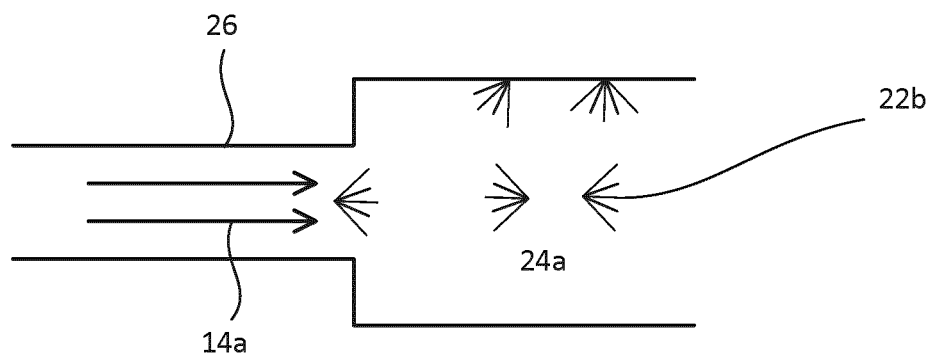

FIG. 4B shows a straight piping embodiment together with potential positions and angles of the raw water spray 22b, including concurrent flow, countercurrent flow, angled flow and right-angled flow that may occur within piping 26 and/or zone 24a.

Figure 4C:
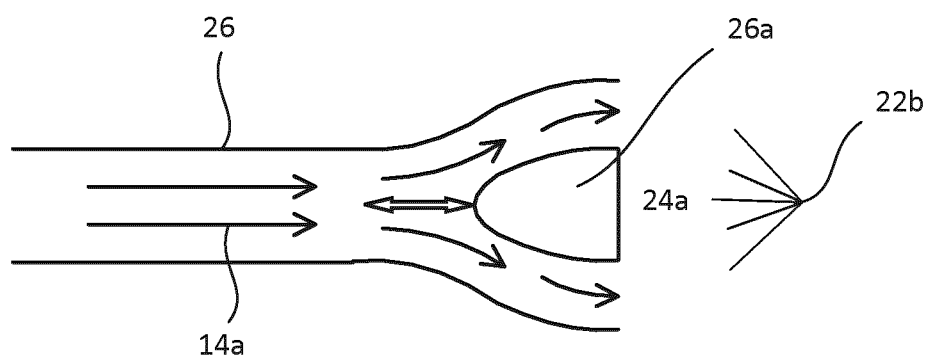

FIG. 4C shows an embodiment with an exhaust diverter 26a that may be used as a means to create a radial flow pattern with a low pressure or void space in the center while maintaining the exhaust pressure at a level as it enters zone 24a by maintaining the cross sectional area of the piping at a given value at the point of entry. In another embodiment 26a enables compression and diversion of exhaust gasses to increase gas flow speed as it enters zone 24a when compared to gas flow speed prior to diverter 26a. A system may be employed to adjust the position of the diverter 26a to maintain a consistent gas velocity as shown by the double-headed arrow.

Figure 4D:
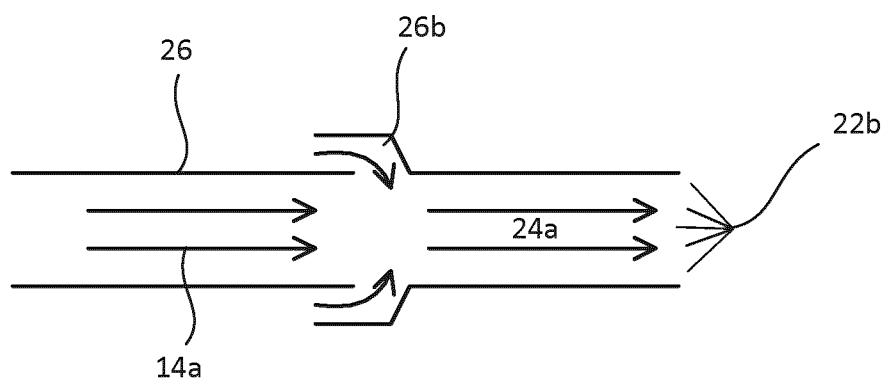
Figure 4E:
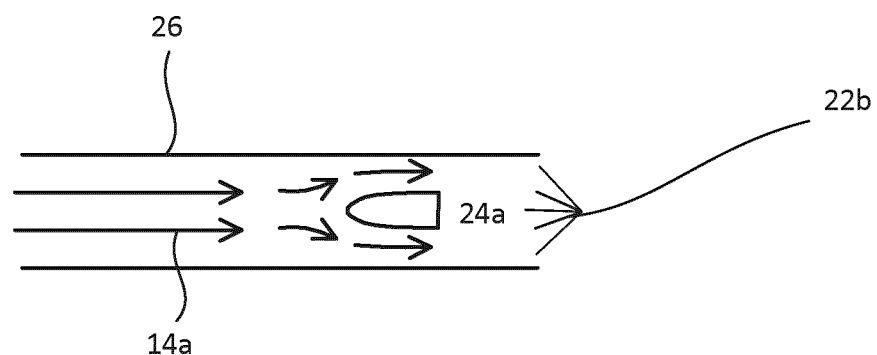

FIG. 4D shows a decoupled exhaust delivery system as an embodiment where ambient air 26b may be introduced to a first gas stream 14a to decrease exhaust gas temperature prior to entering zone 24a. This embodiment may also or alternatively allow any water/moisture within the gas or from zone 24a or water distribution system to drain through the decoupled or partially decoupled area. The decoupled area may be configured as a means to drain raw water and/or raw water concentrate from a vaporization chamber or an air knife, depending on the configuration. FIG. 4E shows an embodiment with an exhaust diverter/compressor 26a where the compressor constricts or reduces the cross-sectional area of the piping 26 to increase the pressure and therefore speed of the exhaust gas 14a as it enters zone 24a. As illustrated in 4E the exhaust diverter/compressor is placed in the center of a pipe as a means to divert and/or compress exhaust gas flow, however it should be understood that in various other configurations the cross sectional area may be reduced by overall pipe diameter reduction or any other means of compressing or diverting a gas flow to create a desired gas entry pressure and speed as the gas enters zone 24a.

Figure 4F:
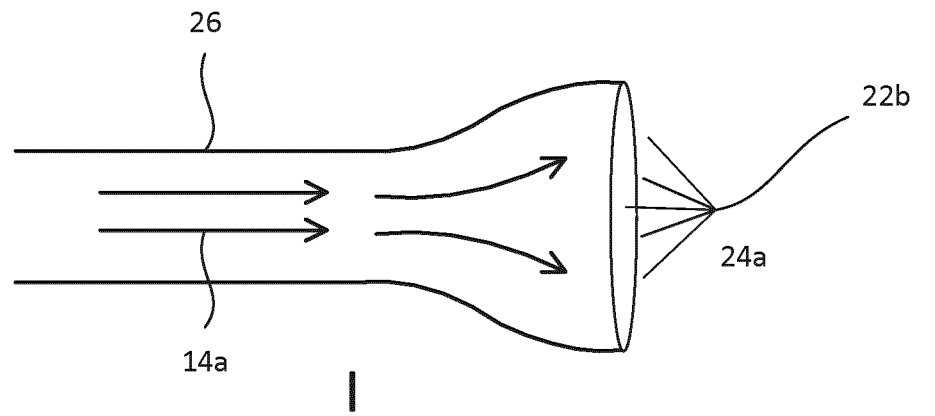
Figure 4F:
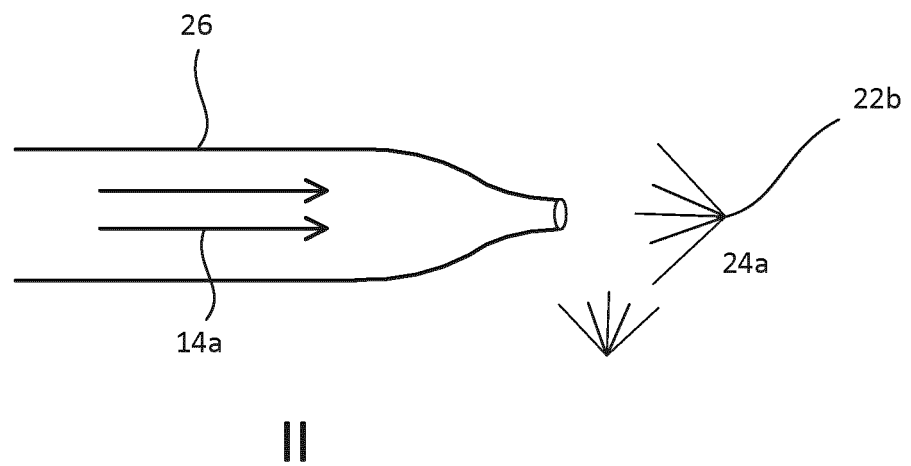
Figure 4F:
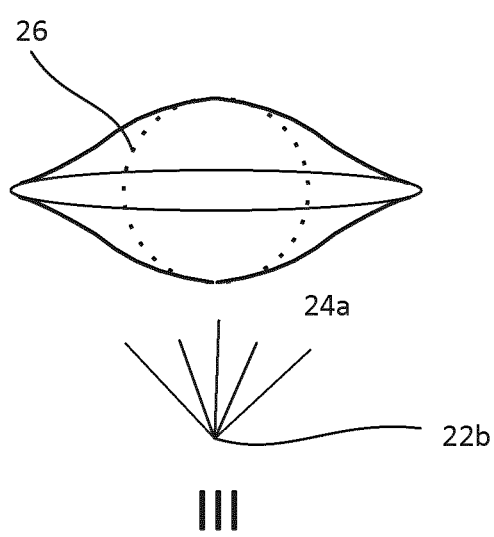

FIG. 4F shows a plan (I), side (II) and front (III) view of a "duck-bill" exhaust nozzle as an example of a means of constricting or expanding the cross-sectional area of the piping 26 to increase or decrease exhaust gas pressure and therefore speed as it enters zone 24a. In this example, the nozzles may be placed at 90 degrees to the flow of the exhaust gas as one example of the possible positioning. In another embodiment the nozzle may be a flat fan nozzle to enable the delivery of raw water across the gas delivery shape as it enters zone 24a In various embodiments, any configuration illustrated in FIGS. 4A-4F or described herein may be configured with louvers as a means of further controlling, managing or manipulating gas flow characteristics as the gas flow 14a enters zone 24a. More specifically, the latter may be configured to allow a throttling of gas pressure as a means to control gas flow speed or pressure as a means for enabling a consistent exhaust gas 14a speed and/or speed range as its being delivered to and entering zone 24a. This configuration may be desirable to maintain a consistent range of interaction of raw water and delivered exhaust gasses at times when the engine load various in a manner that creates fluctuations of engine exhaust gas flow, pressure, speed and/or temperature. By way of example if FIG. 4B is configured with louvers, not shown, they may remain fully open when the engine is under 80% load. However if the engine load were to decrease to, for example 50%, and thus decrease the total exhaust gas 14a flow rate and/or temperature, the louvers would choke the cross sectional area in which the exhaust gas enters zone 24a. This choking or reduction of cross sectional surface area under reduced gas flow conditions thereby enables a consistent range of gas flow speed range as it enters zone 24a.

As another means of providing a consistent range of desirable exhaust gas speed to zone 24a, in various embodiments, the exhaust diversion device 14b may be weighed such that upward fluctuations of gas pressure from increased engine load would be vented to atmosphere. In the latter example, 14b may be configured to divert all of the exhaust gas 14a to zone 24a when the pressure between an air knife illustrated in 4A-4F and engine 12 is less than 10"WC or other desired threshold, however if this pressure increases above the 10"WC due to increased exhaust gas flow form increased engine load exceeded the excess exhaust flow would be permitted to vent to atmosphere.

Nozzles or other means of distributing raw water within exhaust gas 14a may include full cone nozzles, flat fan nozzles, hollow cone nozzles, atomizing nozzles, open piping, gravity waterfall system or other known systems. The pressure of raw water distribution may vary from gravity distribution to high pressure. When choosing a water pressure droplet size and raw water distribution characteristic and how they interact with the pressure and temperature of exhaust gas must be considered. For example the higher the pump pressure at a nozzle head of a hollow cone nozzle, the smaller the average droplet size and droplet mass of raw water droplets exiting the nozzle and therefore the greater the surface area of the average droplet related to its mass. Since interfacial surface area is desirable as a means of thermal transfer of heat energy into the water and mass transfer from a liquid to gaseous state, the smaller the average droplet size the faster the thermal transfer takes place. Continuing, the average droplet size of the raw water exiting the water nozzle create the starting average droplet size for which the pressure within the exhaust gas flow must act against as shearing force. Combined, the pressure of the pump and the pressure of the exhaust gas act on the raw water to shear it as a means of rapid thermal transfer. Further, a suitable water pump can be chosen to accommodate the scale of system based on system specific needs, but generally based on engine exhaust specifications. In one embodiment, a pump pressure of 10-100 PSI is suitable. Pump type is preferably a centrifugal pump due to their ability to pump waste water and slurries plus desired draining characteristics, however other pumps such as positive displacement, diaphragm, screw or other known pump types may be chosen.

Wet/Dry Zones

For certain wet/dry zones within the vessel, specifically the zones where the dry incoming gas meets the water and at the exit where wet gas dries of entrainment, a non-stick coating is applied. In various embodiments Teflon PTFE, FEP, PFA and ETFE may be applicable. Each of the preceding will preferably have temperature ratings of 150 C to 260° C. If using a pressurized exhaust gas and/or with high temperature, e.g. 500° C., it is important to ensure the exhaust diversion valves do not allow heat into the vessel when not in use or being washed and cooled by water circulation.

Back Pressure and Engine Parameters

Depending on the engine, the back pressure on the engine is controlled to ensure compliance with the engine specifications. For example, a typical drilling rig engine/generator such as a Caterpillar™ 400 ekW 500 kVA gen set may require that the back pressure is below 40 inches WC. In various embodiments the RWVS can be operated with about 5-20 in WC, typically 8-12 in WC back pressure. Importantly, in one embodiment, a pressure sensor or switch monitoring system backpressure at or near the base of on engine exhaust system near the engine block itself may be employed and configured with a control system and an engine exhaust diversion system to allow the exhaust 14a to flow to atmosphere in the event the total system backpressure exceeds a minimum threshold. In one embodiment, this threshold may be 5-40 in WC, or in other embodiments may be 5-20 in WC. When configured to a combustion gas source with no available "free" pressure, pressure within the system may be 0-20 in WC or below 5 in WC. In some embodiments configured with a blower or fan, certain flow zones within a system may be under slightly negative pressure.

Exhaust temperatures for operating 250-1500 kW engine/generators will typically be in the range of 350–500° C. but may range from 200–700° C. Exhaust gas flow rates for these example sizes may be in the range of 3400-8500 cfm and heat content rejection to exhaust gas may typically be in the range of 25,000-60,000 Btu/min. As a result, the total amount of heat available for vaporization can be determined based on known engine parameters and operation which can be used for effective control of the RWVS as will be explained in greater detail below.

Generally, the energy transformation chain within the system is as follows:
 i. The engine/generator transforms the chemical energy of the engine fuel to mechanical energy and heat.
 ii. A portion of the heat and pressure losses from the engine/generator are in the form of exhaust gas and are diverted to the RWVS and/or a vaporization chamber 10a.

iii. The kinetic energy of the exhaust may be increased between the engine and zone 24*a* by compressing, controlling or manipulating the gas against the engine pistons pushing the combusted exhaust gas from the engine block into an exhaust system and/or adding kinetic energy through multiple gas streams.

iv. The kinetic energy of the exhaust gas contributes to the atomization and/or surface area generation of raw water coming into contact with the exhaust gas through shearing forces which increases the interfacial surface area of water and gas as a means for increasing thermal and mass transfer between the exhaust and raw water droplets.

v. The heat of the exhaust gas effects at least partial vaporization of raw water droplets.

Figure 5:
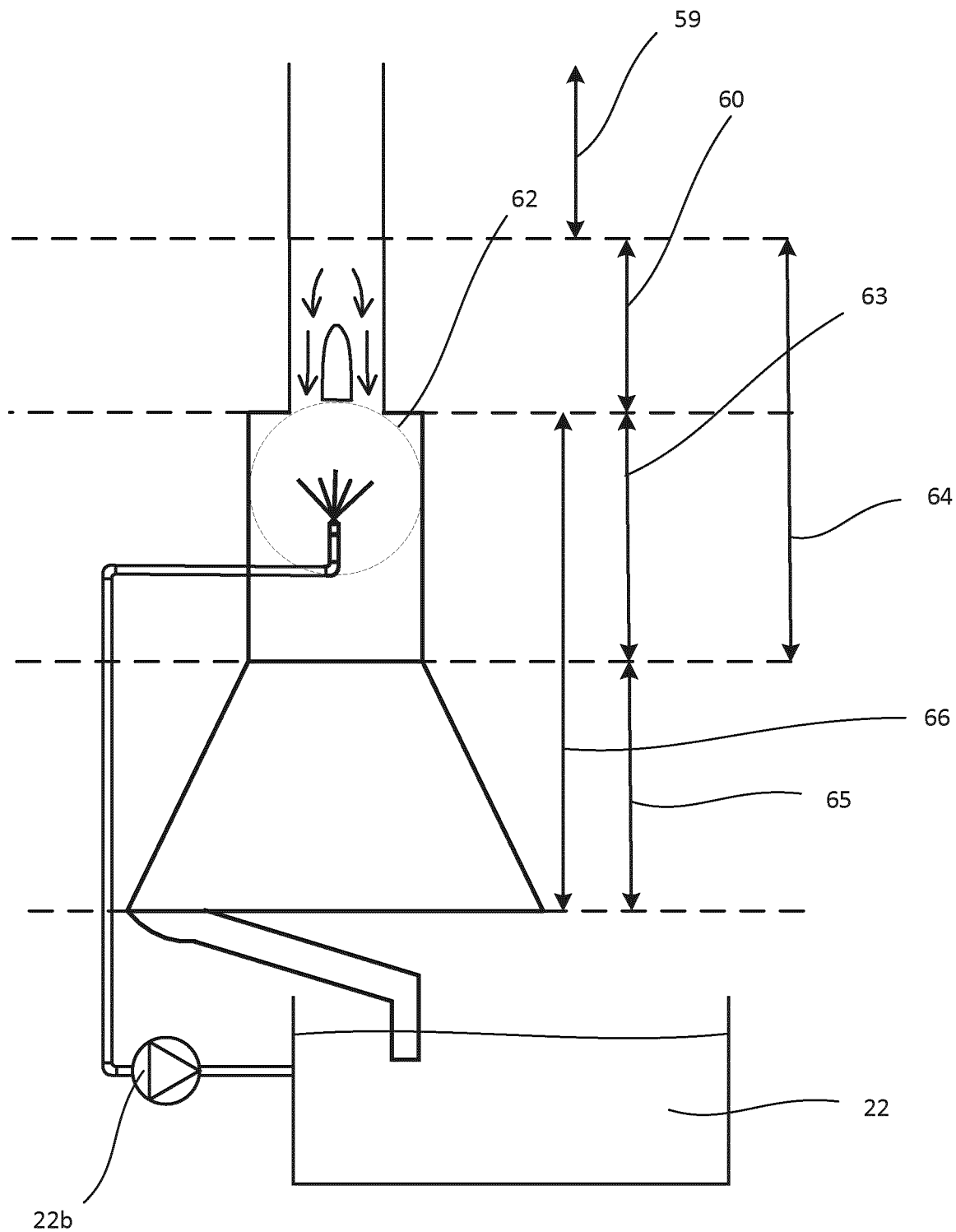
FIG. 5 is a schematic diagram showing different modular or flow zones of an RWVS that enable flexibility in the deployment of various embodiments and configuration options of various RWVS.

Another schematic representation of an example embodiment of an RWVS is shown in FIG. 5. FIG. 5 shows different flow zones, or modular apparatus acting individually or in various combinations, of an example RWVS. They include a gas delivery zone 59, an air knife adaptor zone 60, a dual fluid mixing zone 63 (containing a shearing zone 62), a demisting flow zone 65 and a gas exit zone (not shown). Importantly, each of these functional zones may be configured to an engine as modular units allowing for different configurations of components and thereby increasing the flexibility to operators for deployment. For example, the air knife adaptor zone 60 may be configured utilizing components/designs as described in FIGS. 4A-4F independently of the nozzle system within the high shear zone 62 or these systems may be packaged together (air knife and shear zone as per 64 or shear zone and demisting zone as per 66). Independently, zone 63 may be comprised of one or more nozzles in various configurations and under various raw water distribution pressures, as a means facilitating thermal transfer of heat from exhaust gas into raw water, at least partially vaporizing a portion of water within a raw water feed, the vaporized water for delivery to atmosphere. Similarly, the demisting zone 65 may be configured with a demisting system, including a centrifugal demisting system, or an alternative form such as an impingement based demisting system.

Condenser

In some embodiments, it may be desirable to condense the water vapor generated by the vaporization system within a condenser 113 to provide clean water 111 (FIG. 1G).

The condenser 113 may comprise a condensing chamber through which the water vapor passes, wherein the chamber comprises a heat exchange elements for cooling the water vapor. The heat exchange elements may be cooled by flowing raw water through channels within the heat exchange elements. This has the advantage that as the water vapor is cooled and condensed the raw water within the heat exchange elements is heated. This means that when the heated raw water is introduced into the vaporization chamber 10*a*, vaporization may be more effective.

Geographically Distributed System for Raw Water Vaporization

In another aspect, the invention provides systems and methods for raw water vaporization (e.g. boiling, partial boiling or vaporization) over a geographically distributed area that improves the overall efficiency of managing raw water and its processing.

Figure 6:
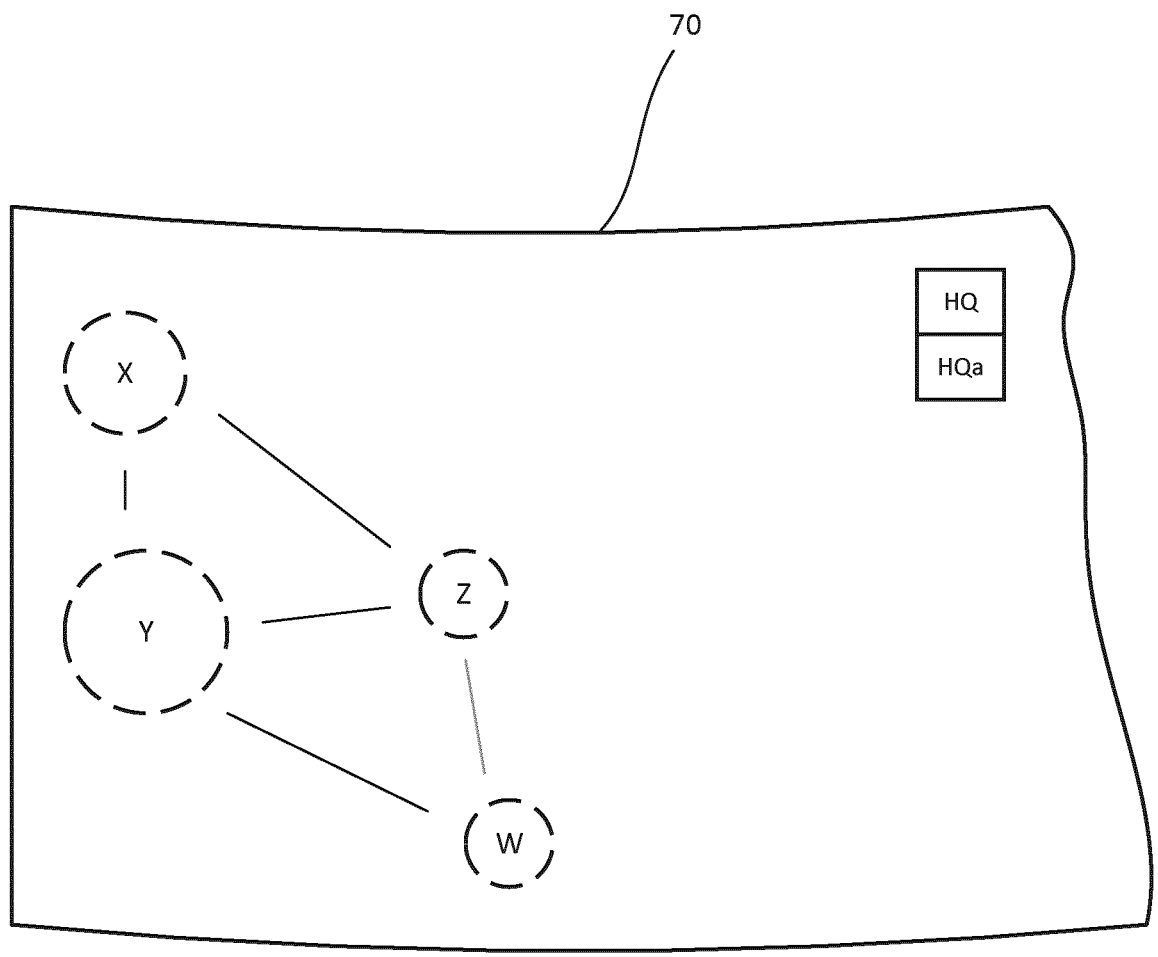
FIG. 6 is a schematic diagram showing geographical separation of a number of drilling/production/fraccing operations and an operational headquarters within a geographical area.

As shown in FIGS. 6, 7A and 7B, several drilling operations or other oilfield related operations such as compressor site or gas plants W, X, Y and Z may be being conducted in a geographically distributed area 70. Each operator (e.g. drilling, fracing, gas production) will be conducting its operations according to its own parameters with regards to the generation of raw water and raw exhaust heat and pressure (referred to generically as exhaust heat or combustion gas). That is, each company, at a given moment in time may be generating either excessive raw exhaust heat relative to its capacity/equipment to vaporize raw water or excessive raw water relative to its capacity/equipment to vaporize raw water. In either case, either an effective exhaust heat source is not being fully utilized or raw water is not being vaporized leading to a build-up of raw water at a particular location.

In order to more efficiently utilize resources, in one embodiment, the RWVS and/or generator are configured with sensors to monitor and report the ongoing operational parameters of the RWVS and generator at each location. The data collected from the sensors is reported back to a central location HQ that utilizes the data to determine if it would be efficient to effect movement of raw water, salt, brine liquids or condensed water vapor from one location to another in order to optimize and fully utilize the exhaust heat resource or the water related products or resources. The collection and delivery of data from the distributed sites back to HQ may be conducted utilizing known means including wireless and/or wired means utilizing both local and wide area networks including any combination of wifi, Bluetooth, Ethernet, internet, cellular, and satellite networks as known to those skilled in the art.

As shown in FIG. 6, drilling operations X and Y are closer together than drilling operations X and W. Accordingly, to the extent that X is over-producing raw water, it may be efficient to transport X's raw water to Y to utilize the excess heat capacity of Y. Alternatively, if X or Y are gas plants and have an abundance of condensed water vapor accumulating it may be beneficial to transport the resource to fracing site Z or drilling site W.

In order to effectively determine if such transportation would be efficient, as noted each of the combustion gas sources and RWVS at each location are configured with sensors (not shown) to measure, calculate and report various parameters back to HQ. Such parameters in addition to GPS geographical information may include generator watts output, engine or stack exhaust temperature, exhaust pressure as well as hourly, daily, and weekly trends in such data. Similarly, each RWVS may monitor/calculate input RWVS, input exhaust temperature and pressure, RWVS output exhaust temperature and pressure, raw water flow rates through pumps, raw water vaporization rates and volumes, condensed water volume, salt accumulation, brine concentrate chemistry and/or density, as well as hourly, daily and weekly trends in such data.

Upon receiving data from a plurality of locations, based on information of those locations relative to one another as well as knowledge of the location of transportation resources such as trucks and the associated transportation equipment and personnel, HQ will determine, via a computer control system HQa, operatively connected via the above described networks and sensors, if each site is working with a surplus or deficit with respect to its heat resource, other resource and raw water or other liquid volumes. From this data, HQa calculates the cost/benefit of moving raw water from one site to another to utilize an underutilized heat resource or other liquid resource at any one site.

In the event that based on the location of transportation equipment and the amount of underutilized heat, HQ will determine if the raw water should be moved.

By way of example, it may be determined that X is at capacity with regards to its ability to vaporize raw water. Y may have an underutilized heat resource by virtue of its current operations. X is generating 10 m³ of raw water per day but can only process 5 m³ and is thus accumulating raw water at the rate of 5 m³ per day. X presently has 40 m³ of raw water on site. Y currently has a capacity to process 25 m³ per day and is only 40 km from X. HQ determines that transportation equipment is 50 km away and will have to drive a total of 140 km to arrive at X, drive to Y and return to a hub location. The time to effect this transfer will be 1 hour to arrive at X, 30 minutes to load 40 m³ of raw water onto the truck, 30 minutes to drive to Y and 30 minutes to unload 40 m³ of raw water at Y and 1 hour to return to the hub location for a total time of 3.5 hours. At a cost of $200/hour, the total cost of moving 40 m³ of raw water will be $750. However, there is no additional cost to otherwise effect vaporization of this 40 m³ of raw water in that no additional fuel is being used to vaporize it. By way of comparison, a fueled evaporator may consume $200 per day in fuel and have a capacity of 5 m³ of raw water per day, the cost to effect vaporization of 40 m³ of raw water using a fueled evaporator would be $1600 based on 8 days at $200/day of fuel. Moreover, this does not consider rental costs of a fuel based evaporator. Accordingly, when optimized, the efficiency of raw water movement for vaporization is significantly improved.

It should be noted that the above can be utilized to effect transportation of raw water from sites to a central location within a relatively small geographical area where a number of drilling sites/wells in one area have no capacity to evaporate raw water. For example, in the drilling industry, a driller may have an ongoing drilling program within a small geographical area where 10 rigs are operating and each rig is drilling 1 well per month. Thus, the number of wells within the area will be growing at approximately 10 wells per month or 120 wells per year. Each of these wells will be progressing through the usual phases of a well including drilling, completions and production operations, each of which will produce different volumes of raw water. That is, drilling operations will produce a first average volume of raw water, completions will generate another average volume and production will produce a further average volume. Thus, as each well evolves and the number of wells coming online increases, the requirements of each well will change for raw water vaporization. Accordingly, processing such volumes at a central location or a number of distributed central locations will be highly efficient and when compared to existing methods of utilizing either fueled evaporators or transporting raw water to a disposal site away from drilling operations will incur significantly lower costs.

Thus, the control and management of available resources to effect a decision regarding the movement of water is conducted as shown in FIG. 7B, including receiving generator/RWVS operating data from each site, determining the surplus/deficit of raw water and exhaust heat for each site, comparing the surplus/deficit data from each site, calculating the distance/cost of moving raw water from one site to another based on available transportation resources and mobilizing the transportation resources to effect transport. Although not shown, "raw water" illustrated in 7B can also include other resources such as dry salt, brine fluids, condensed water vapor, and the like. Similarly, "transportation" as illustrated in 7B may be managed between various combinations of drilling sites, productions sites, disposal sites, within a single user network or between various user networks, sites or locations. The delivery of instructions to personnel to initiate a mobilization step may include the delivery of digital instructions to a mobile computing device by means of known communications methods including email, SMS, imessage, and/or other audio or visual signals utilizing the networks as described above.

Modes of Operation

Generally, the vaporization process will vaporize the water (e.g. by evaporation, boiling or partial boiling) within the raw water but will not evaporate contaminants within the raw water if the temperature within exhaust/water contact system is maintained below the evaporative temperatures of any contaminants.

Accordingly, raw water returning to the tank 22 will generally be enriched with contaminants relative to raw water entering zone 24a. As contaminants within raw water returning to the tank will generally be heavier than water, they will have a tendency to settle towards the bottom of the tank and/or create stratification of contaminants within the tank. To enable stratification to occur, raw water being transferred to the exhaust/water contact system will generally be drawn from upper regions of the tank 22 but a distance below the surface, the underbody of water, through a floating suction system 22c below water level 22e (FIG. 2).

In addition, concentrated raw water returning to the tank 22 may be introduced in a manner that minimizes or reduces the turbulence within the tank so to promote stratification.

The system may be operated to vaporize raw water continuously, semi-continuously or in batch depending on particular configurations and operation.

In a continuous or semi-continuous mode of operation, raw water 22d may be continuously or periodically added to tank 22 such that the water level within the tank remains at a particular level. In this case, as contaminants are concentrated and returned to the tank, periodically, the concentrated raw water that has settled towards the bottom of the tank may be removed through a drain system 22f. As noted, stratification of raw water within the tank is desirable to ensure a minimal amount of water is removed and delivered to zone 24a with concentrated contaminants.

In a batch mode of operation, a single volume of raw water may be added to the tank and the system is operated until a desired concentration/volume of concentrated raw water is achieved within the tank whereupon the tank may be emptied before starting a new batch.

Additional details of the design and operation of the system in accordance with various embodiments are now provided.

Deployment and System Control

Figure 8:
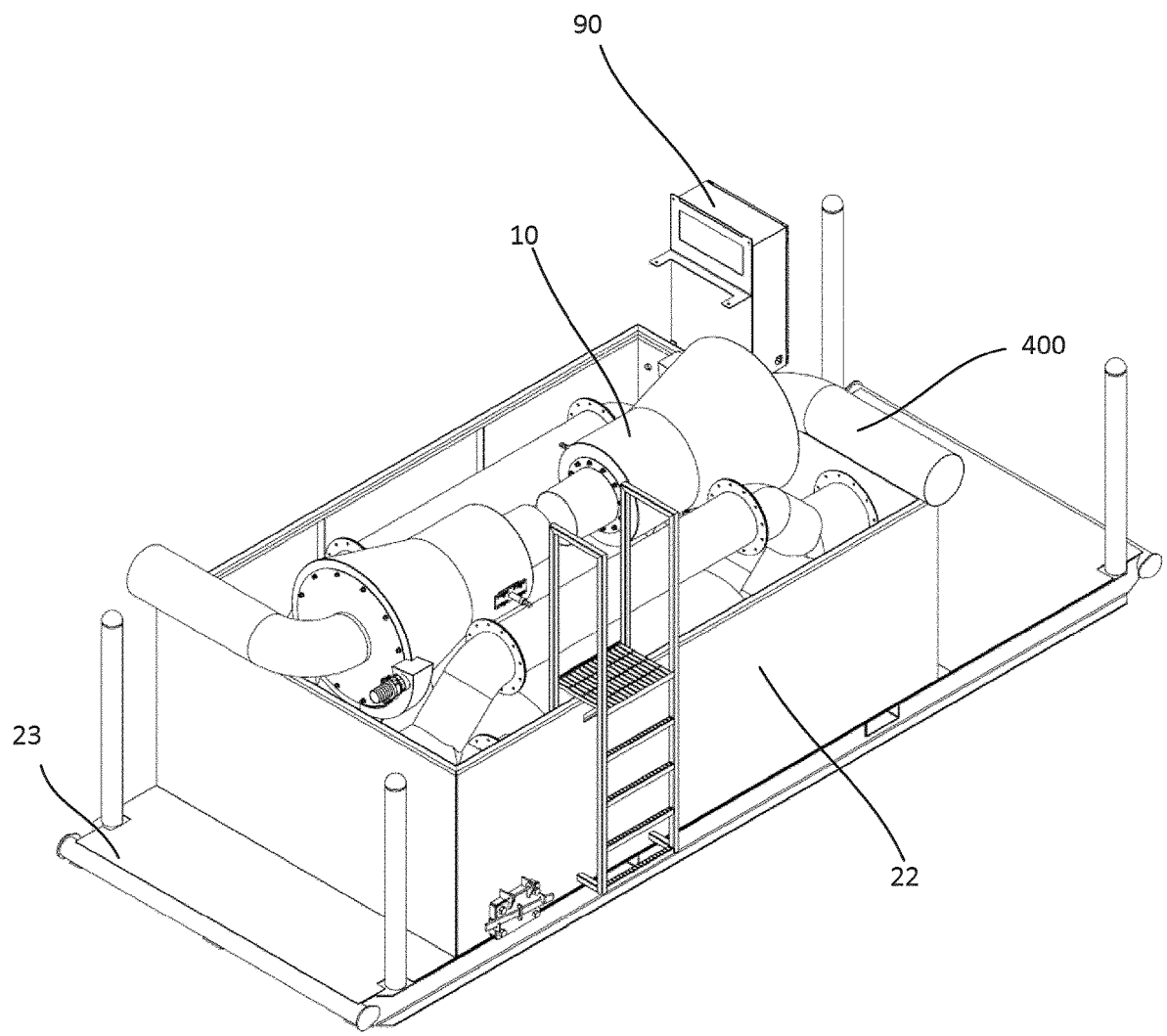
FIG. 8 is an isometric drawing showing how a tank and modular RWVS may be mounted on a skid for transportation in accordance with one embodiment of the invention.

In one type of deployment, the system is operated as noted above, adjacent a generator or compressor engine. For plumbing, pressure preservation, back pressure reduction, heat preservation and/or space reasons, the vaporization chamber system may be elevated above the engine and/or maximum water surface elevation 22e. Preferably, the exhaust/water contact system is placed on the roof of a generator/engine shack and the tank is placed at ground level below the exhaust/water contact system. In another embodiment the vaporization chamber system may be permanently fixed to a raw water holding or tank or vessel. In this embodiment the exhaust gas may be delivered to the vaporization chamber via an extended exhaust piping system that may be comprised of insulated piping and/or flexible piping. The tank may be skid mounted to enable ready transport and handling by existing equipment and will have dimensions to enable transportation by standard trucks and/or trailers. The system may be retrofit to existing generator shacks or form an integral part of a generator shack. As shown in FIG. 8, a tank 22 is mounted on a skid 23 and modular RWVS placed within the tank for transportation to a site.

Importantly, as described, the RWVS is preferably modular in design to enable effective and flexible configuration to a combustion gas source.

System Control

Control System 1

Control of the system is effected by a user control interface unit 90 (FIG. 1F) typically forming a component of the tank and/or skid. Preferably, the control system is simple for an operator to operate to minimize the risk of damage to components and to ensure effective operation.

In operation, after connection, the generator will typically already be operating prior to turning on the RWVS. If so, exhaust gas from the generator will be vented to the atmosphere through the existing exhaust system 14.

After an appropriate quantity of raw water to be vaporized has been delivered to at least one primary tank for example tank 107 or 4b, the flow of water to zone 24a or 63 (FIG. 5) would be initiated prior to diverting exhaust into zone 24a to ensure that raw water is properly flowing and to maintain relatively lower temperatures within the chambers and to wet the chamber prior to entrance of exhaust gas 14a. An example of exhaust management is exhaust diversion system 3 in FIG. 1B/FIG. 20. In another embodiment the vaporization chamber 10a is configured to an engine exhaust pipe system 14 in a manner in which the exhaust gas 14a is always permitted to flow through the vaporization zone 24a, whether or not raw water is being delivered to the vaporization zone 24a. In the latter embodiment, the system may have no need for an exhaust diversion system wherein the vaporization chamber 10a is always heated and ready to accept raw water (See FIG. 2A) or with low grade heat sources the combustion gas source may not be hot enough to be of concern for system damage, even to plastic vessels (FIG. 2I-2P). In a further embodiment, there is provided an exhaust diversion system for allowing the delivery of exhaust gas 14a to atmosphere when raw water is not being delivered to the vaporization chamber, wherein when the vaporization chamber is not active at least a portion of the exhaust gas 14a is permitted to flow though the vaporization chamber. The latter may be desirable in cold winter conditions in which allowing a vaporization chamber or other connected components of an overall vaporization system may not be desirable. In all above cases, raw water is pumped to zone 24a via pump 22g and piping 52 and flow would be started by a "water flow ON" switch controlled by an operator or alternatively a PLC may be programmed to auto-start and stop based on parameters such as level of raw water in tank 22. In one embodiment, after the operator or control system programing verifies that water is being delivered to the vaporization chamber, flow is established and/or raw water flow is returning to the tank, the operator, automated control logic and/or control system can activate exhaust gas diversion to zone 24a via a "gas flow ON" switch or a programing sequence within a programmable logic controller that controls the opening and closing of valve 14b. Upon activation of this switch, exhaust gas will enter zone 24a and the vaporization process will begin.

Preferably, the temperature of system points will be monitored via one or more thermocouples (e.g. T1A, T2A, T3A) that may be located in one or more positions within the RWVS. Generally, the temperature at the point of entry to a diversion system T1A, within the vaporization chamber T2A and the atmosphere exit T3A may be monitored. Generally, the system will be operated in to maintain the temperature at T2A in the range of 40-100° C. (preferably 40-80° C.) and the temperature at T3A will be maintained between 65° C. and 150° C. (preferably 70-120° C.) to ensure an effective vaporization process. A temperature at T2A or T3A rising too high can indicate system efficiency reduction in that excessive heat from the exhaust gas is being released to the atmosphere. Similarly, if the temperature at T2A or T3A is too low, the vaporization process may no longer be efficient. If the T2A or T3A temperature is too high, water flow rate may be increased and/or the proportion of exhaust gas diverted through the valve system may be reduced. If the T2A or T3A temperature is too low, water flow rate may be reduced and/or the proportion of exhaust gas diverted through the valve system may be increased.

Under normal operation, approximately 5-30% of the flow of water into zone 24a or chamber 103a will be vaporized in a given pass of raw water through the vaporization chamber if the temperature at T2A or T3A is within the preferred range. It should be understood that the system can be controlled in a manner allowing 30-100% of the raw water flow rate to be vaporized in a situation where buildup of dissolved solid residual and/or suspended solid material contained within the raw water is acceptable. In the latter, the pump connected to the primary raw water storage/circulation tank would deliver the raw water into the vaporization chamber, and there would be little to no concentrate discharge returning to the primary tank. In a more preferred embodiment wherein precipitated salts and zero liquid discharge is desirable, P2 will continue circulating fluid from concentrate tank 107 until the salt saturation point has been exceeded, which in the case of NaCl is approximately 24% wt. As this occurs the salts can be collected from tank 107 by various means for further drying. This method would allow water to travel one-way from bulk tank 105 to atmosphere without the need for brine storage tank 109.

As noted above, in order to accommodate variations in engine load and hence, exhaust heat and pressure, active and/or passive valves may be configured to the system to maintain a desired flow rate and pressure through the air knife. That is, in the event that an engine is throttled back due to a decreased load and the exhaust flow drops, the controller may activate an appropriate louver to constrict flow through piping to maintain exhaust gas flow rate and pressure at a desired level at entry to the chamber.

Control System 2

Figure 9:
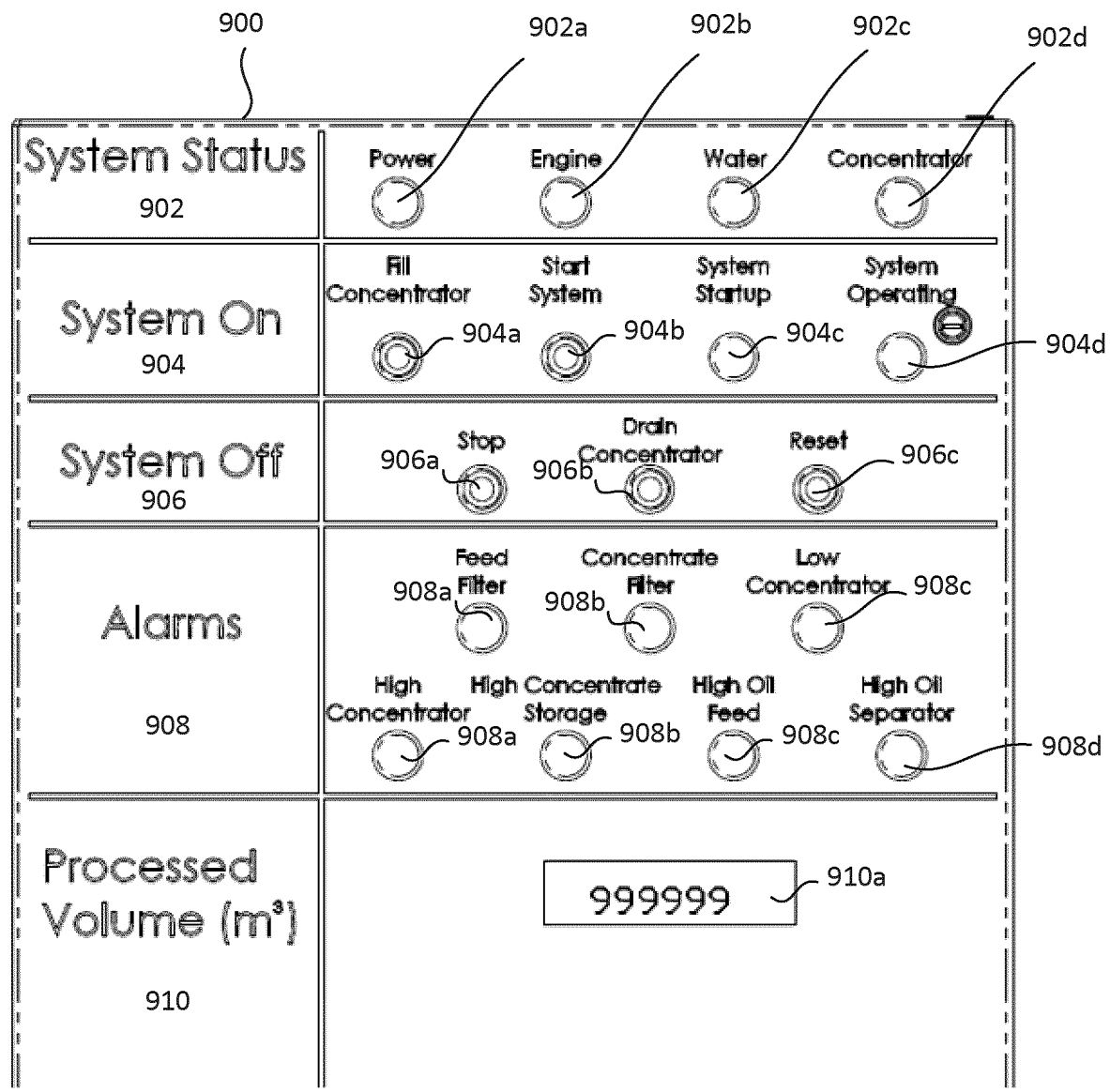
FIG. 9 is a schematic view of a control panel configured to a RWVS in accordance with one embodiment of the invention.
Figure 9A:
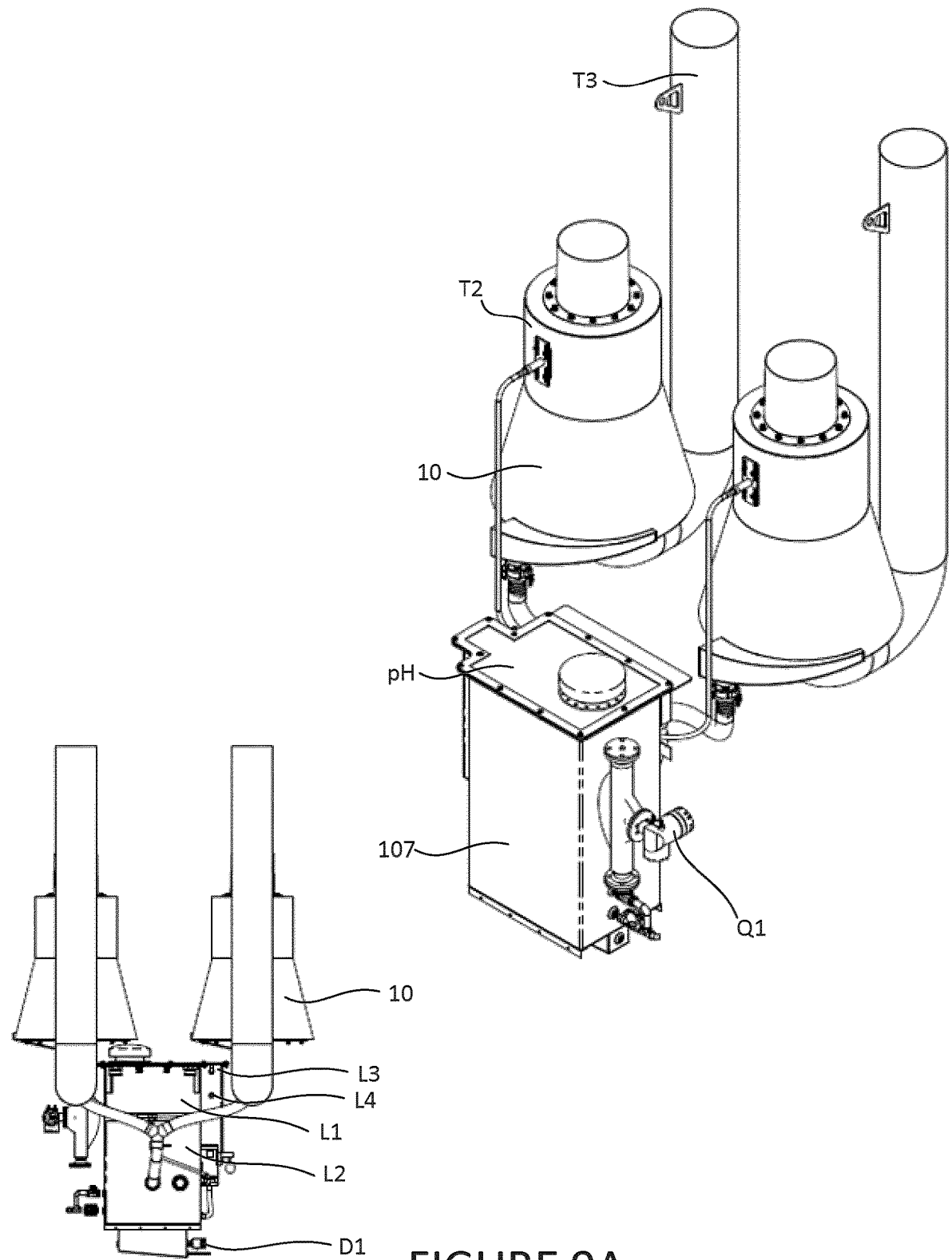
FIG. 9A shows various views of the position of various sensors configured to a RWVS in accordance with various embodiments of the invention.
Figure 9B:
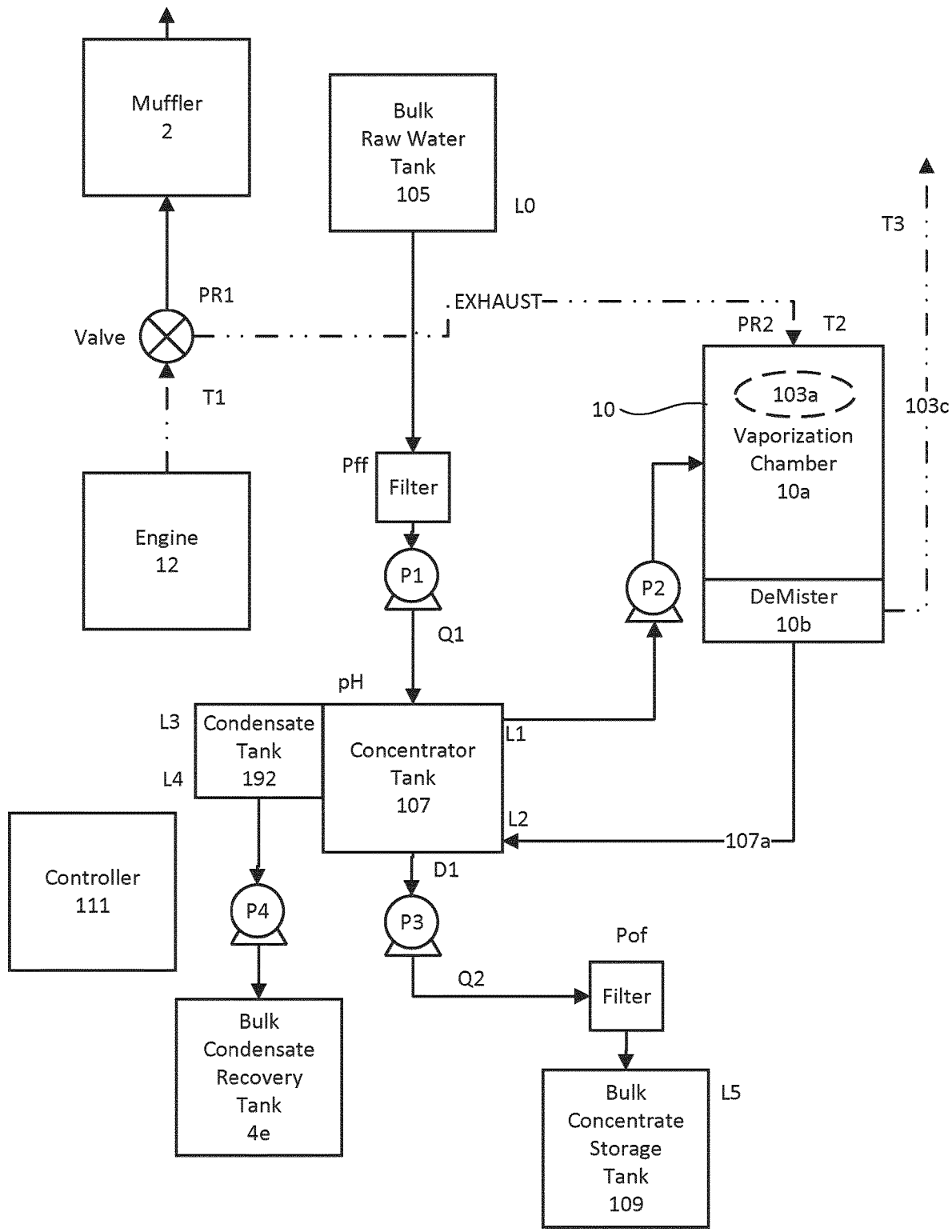
FIG. 9B is a schematic view of a RWVS in accordance with one embodiment of the invention showing the position of various sensors used for controlling the RWVS.

As shown in FIGS. 9, 9A and 9B, in accordance with one embodiment (see FIG. 1G), a control system is described that enables the evaporator system to be retrofit to existing equipment and that does not interfere with the operation of that equipment. That is, it is important that the primary function of the engine equipment is not interfered with by the addition of the subject vaporization and concentrating equipment.

FIG. 9 shows the layout of a control panel 900, FIGS. 9A and 9B show the location of various control sensors.

FIG. 9 shows a control panel that provides a number of advantages to operators by requiring minimal operator input to start, monitor and stop the RWVS during operation. As shown, the control panel includes 5 types of input and output controls including system status 902, system on 904, system off 906, alarms 908 and processed volume 910. One control panel 900 may be operatively connected to a central display such as computer or LCD screen (not shown). Various systems 10 may be distributed on a single gas plant (FIG. 1A-1C) wherein each has an operator/user interface and where in one embodiment they are all on communication with a central control hub located in 4d (FIG. 1C).

System status 902 includes output indicators electric power at control panel 902a, engine exhaust available 902b (configured to T1), water available 902c (configured to a level transmitter in tank 105) and concentrator available 900*d* (configured to a 193*a* and 194*a* in tank 107). Generally, these indicators provide simple output (e.g. a green light) to indicate that each of the system power, associated engine (e.g. a connected ICE), water flow and concentrator tank respectively are returning an active and operational status. For example power 902*a* indicates that power to the RWVS is available and on, 902*b* indicates the associated engine is operating by T1 being above a threshold, 902*c* indicates that raw water is available in the bulk raw water tank 105 (sensor LO) and 902*d* indicates there is sufficient water in the concentrator tank (sensor L2). Generally, if an operator observes 4 out of 4 positive status signals, the RWVS can operate. If one signal is not illuminated green, the system cannot be turned on.

System On 904 switches/indicators allows the operator to start the system and confirms its operation. If all of the system status indicators 902 are positive, the operator can turn the RWVS on. However, if the concentrator light 902*d* is off, the operator initially turns on the fill concentrator switch 904*a* which turns on pump P1 to flow raw water into the concentrator tank 107, if required. When the low high level switch is reached, L2 reports sufficient water within the concentrator which in will change the status of concentrator status indicator 902*d* to positive.

The operator can then press the start system switch 904*b* which initiates water flow through the vaporization chamber via pump P2. In one embodiment, initially no exhaust is diverted to the vaporization chamber. The system startup indicator 904*c* will show an active signal (e.g. orange light), while the system verifies that water is actually flowing through the vaporization chamber. After the system has confirmed water flow through the vaporization chamber, the system will divert exhaust to the vaporization chamber and after the system verifies PRI, T1 and water flow via Q1, the system operating indicator will turn positive (e.g. Green).

The system off 906 input and output indicators include a stop 906*a*, drain concentrator 906*b* and reset button 906*c*. Pressing the stop button 906*a* will initially stop diversion of exhaust gas to the vaporization chamber, then stop water flow through the chamber after a period of time. When water flow to the vaporization chamber has stopped, the operator can activate drain concentrator switch 906*b* which activates P3 to pump water from the concentrator 107 to the bulk concentrated water tank storage tank 109. A reset button 906*c* will reset the system after an alarm signal has been received.

Various alarms can be incorporated into the system to monitor conditions and provide output to the operator utilizing various sensors configured to the system. Example alarms include a feed filter alarm 908*a*, concentrate filter 908*b*, low concentrator water 908*c*, high concentrator water 908*d*, high concentrate storage 908*e*, high oil feed 908*f* and high oil separator 908*g*. Other various alarms (not shown) can include exhaust temperature and pressure too high or too low or water flow rate or line pressure not within a proper range.

In addition, for the purposes of monitoring the total volume of raw water that has been processed for the system, the controller will preferably be configured to display this value which may be calculated based on total flow of raw water through pump P1 less the total flow of concentrate through pump P3.

As shown in Figured 9A and 9B, the system may be configured with various sensors to monitor conditions within the system. Table 2 describes the location and function of various sensors that may be configured to the system.

TABLE 2

Control Sensors

| Sensor Type | Abbreviation | Location | Function |
|---|---|---|---|
| Pressure | PR1 | ICE Engine Exhaust | reports engine exhaust backpressure to enable controller to adjust diversion valve. |
|  | PR2 | Chamber Input | reports chamber input pressure |
|  | Pff | Feed Filter | Reports feed filter performance |
|  | Pof | Outflow Filter | Reports outflow filter performance |
| Temperature | T1 | ICE Engine Exhaust | reports engine exhaust temperature for controller to ensure T1 is above a threshold temperature |
|  | T2 | Chamber Temperature | reports vaporization chamber temperature to ensure T2 is within a threshold temperature range |
|  | T3 | Atmosphere Exhaust | Reports temperature of exhaust gas and vaporized water leaving system for controller to determine if the atmosphere exhaust is within temperature limits. |
| Flow | Q1 | Pump 1 | Reports raw water flow rate, accumulation and density of water between tank 105 and 107 for purposes of calculating processed volume of raw water by RWVS system and alarm 908c if condensate is flowing into tank 107 |
|  | Q2 | Pump 3 | Reports brine concentrate flow rate and accumulation to storage tanks 109 for purposes of calculating processed volume of raw water by RWVS system |
| Density | D1 | Concentrate Tank | Reports density of raw water in concentrate tank for controller to determine if concentration of brine within concentrate tank is above a threshold and to activate P3. |
| Level | L0 | Bulk RW Tank | Reports low level fluid within bulk raw water tank |

TABLE 2-continued

Control Sensors

| Sensor Type | Abbreviation | Location | Function |
| --- | --- | --- | --- |
| | L1 | Concentrate Tank 107 | Reports high level fluid within concentrate tank to controller to turn off P1 |
| | L2 | Concentrate Tank 107 | Reports low level fluid within concentrate tank to controller to turn on P1 |
| | L3 | Condensate Tank | Reports high level fluid within condensate tank to controller to turn off P4 |
| | L4 | Condensate Tank | Reports low level fluid within condensate tank to controller to turn on P4 |
| | L5 | Bulk Concentrate Storage Tank 4e | Reports high level fluid within bulk concentrate storage tank |
| pH | pH | Concentrate Tank | Reports pH of concentrate within concentrate tank 107 to controller to determine if pH concentrate is within limits. |

Other sensors may be configured to the system as may be appropriate to enable effective control of the system.

In installations where multiple systems may be deployed, one or more display screens may be configured to display system data of individual or a number of systems and/or allow a controller to display set points of various sensors. For example, a single touch screen may be configured to one, two or more individual systems connected to multiple ICE's or other combustion gas sources. The status and performance of each system can be displayed on the display screen such that an operator can review the status of each system and make appropriate adjustments as needed to one or more systems.

Monitoring engine exhaust backpressure enables the system to ensure that the operation of an associated ICE is not affected.

Fluids and Contaminants

The system is highly effective in handling a variety of waste fluids that may be collected at drill rig site or other stranded well site, such as a producing well, including viscous drilling fluids that may contain a variety of viscosifying agents. Generally, it has been observed that the effect of passing viscous fluids like polymer water through the vaporization zone 24a causes at least partial a breakdown of the hydrocarbon chains of the viscosifying agents which then effectively reduces the viscosity of the raw water due to heat and/or shearing effects within the system as previously described herein.

As is commonly known raw water produced in conjunction with oil or gas production wells contains volatiles and other organics such as BTEX and F1-F2 chain hydrocarbons (C6-C16). It has been observed that the vaporization chamber system as described herein provides a means of allowing the absorption of engine exhaust gas combustion chemicals from into the raw water concentrate. It has been observed that a majority of BTEX (80%+) and a portion F1-F2 hydrocarbons contained within produced water evaporate to atmosphere within 1-5 days, typically within 2 days, when the produced water has been drawn from below surface and permitted access to standard atmospheric conditions, including atmospheric pressure. When considering a method of produced water vaporization, it is desirable to limit overall atmospheric discharge or volatile and toxic chemicals. The present invention synergistically removing at least a portion of these at least a portion of these chemicals from exhaust gas 14a that would otherwise be discharged to atmosphere. When considering the entire mass balance of these chemicals in produced water, typical water transport and injection methods that discharge exhaust gasses and waste exhaust gasses from engine sources used for vaporization and how they are added and subtracted from an environmental discharge perspective, it becomes apparent that utilization of engine exhaust gasses in as described herein as a means to reduce total volumes of produced water become an attractive environmentally subtractive alternative to current management of both produced water and exhaust gasses.

Brine water, whether produced water or created as a drilling fluid, is another water that is costly to dispose of and harsh on processing and handling equipment due to it high saline content. Due to the system keeping relatively low temperatures, typically under 100° C., on all wetted surfaces the current invention becomes an attractive and cost effective means of management when compared to alternatives.

Valve Diversion System

As described above, the valve system may include a counter weighted valve allowing for passive venting through an exhaust system to prevent over-pressuring the gas source, for example an ICE. In various embodiments, the system may include a release valve that can be open to varying degrees in response to a pressure signal from backpressure sensors within in the exhaust circuit. The activation of the valves may be derived from various means including a direct air line from anywhere in the exhaust circuit, a pressure signaling the controller to activate an electric, pneumatic, hydraulic, or other means.

Moreover, to ensure fail safe operation, the system may incorporate multiple lines of defense against backpressure as shown in FIG. 20. For example, a counterweighted vent may be utilized as a first line of defense. A second line of defense may be a release valve 3b (e.g. a valve to the atmosphere or standard muffler system) opening while a control valve 3a (e.g. a valve to the vaporization chamber) also stays open. A third line of defense may be the actuation of both the release valve and control valves to move them to fail safe positions to ensure no gas is diverted to the vaporization chambers. That is, and for example, if a loss of power occurred to the release valve and control valves, they would move into their fully open position in the case of the release valve and fully closed positions in the case of the control valve.

In addition to ensuring operation of the gas source (e.g. an ICE) without affecting its primary purpose, this configuration can also maximize the use of the gas source (e.g. exhaust pressure and heat) by diverting as little as possible away from the vaporization chamber.

In one embodiment, the weighted valve can have weights associated with a balanced internal valve designed to only vent a minimal amount of over pressure gas. That is, and preferably, the release and control valves are incrementally and progressively opened or closed based on measured pressured and valve settings based on allowed and predesignated pressures within the exhaust circuit in order to maintain a pressure within the exhaust circuit below a maximum value. For example if the engine is a 2500 bhp engine with a maximum allowable engine back pressure of 14"WC, then a signal from the controller can incrementally set release and control valves to allow staged and controlled venting.

The features of the valve diversion system will preferably include:
a. low friction valve rods or other rotatable fixture;
b. ability to withstand high heat, rapid heating and cooling without warping from thermal shock, combustion gas particulate matter;
c. enable the placement of the valve within an exhaust pipe;
d. enable a bearing rod or similar fixture to allow a counter weight to open it with pressure; and,
e. adjustable counter weight for configuration to different engines with different manufacture specifications.

In various embodiments, the valve diversion systems may be configured to actively or passively adjust the gas pressure and/or velocity into the vaporization chamber 10a by measuring gas velocity flow and adjusting the valve system in response to the measured gas flow. In other embodiments, the valve diversion system may be configured to allow any of or a combination of a fixed gas volume through an air knife (by venting excess away from the air knife), a fixed pressure within the exhaust system (resulting in variable gas flow through the air knife) or modulated actively or passively to enable other desired combinations.

The valve diversion systems may also be configured to a single engine that is connected to more than one RWVS as shown in FIGS. 1A and 1B. Similarly, depending on the performance characteristics of a specific RWVS vaporization and chamber, two or more engines may be configured to a single RWVS. Further still, two or more RWVS may be configured to two or more engines (heat sources) with appropriate piping, valve and control systems. Importantly, in each of these embodiments, the valve diversion systems can be controlled to individually assess backpressure on individual engines and/or balance the use of heat from multiple engines to multiple RWVS.

Operational Data

Figure 10A:
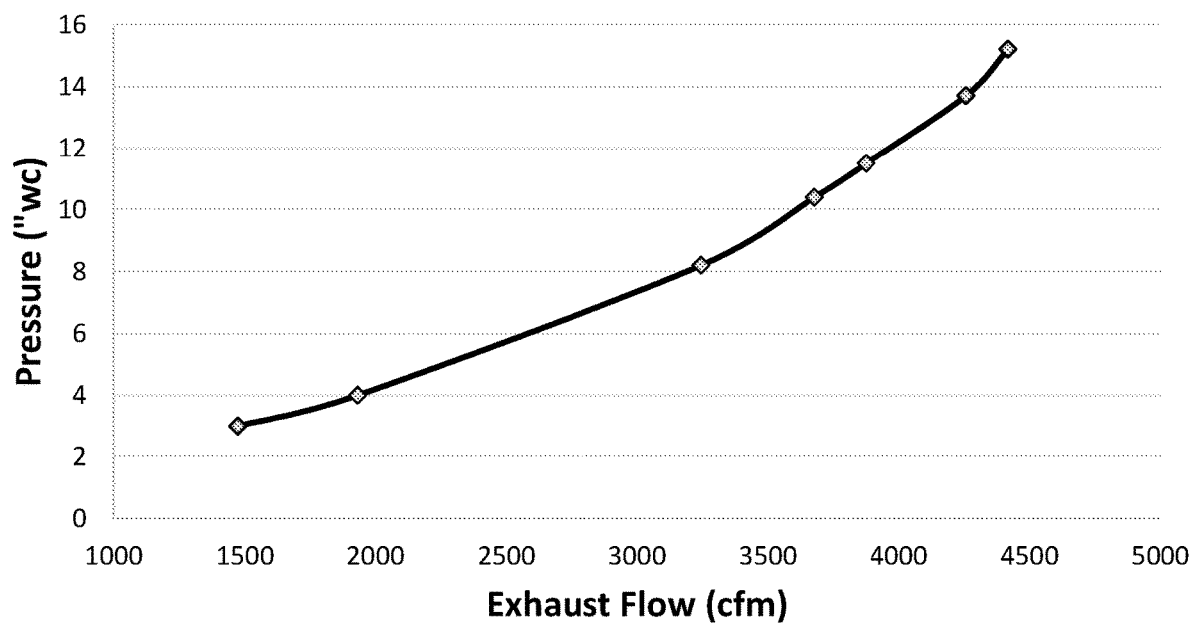
FIG. 10A is a graph showing engine or blower backpressure as a function of exhaust flow rate in accordance with one embodiment of a RWVS.
Figure 10B:
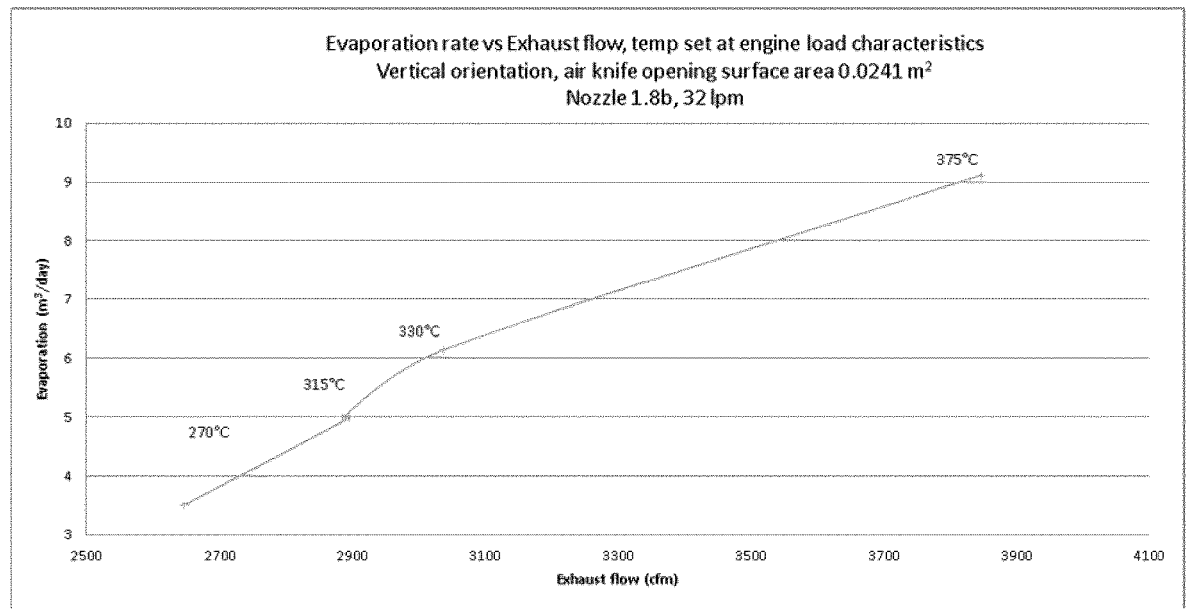
FIG. 10B is a graph showing evaporation rate as a function of exhaust flow rate in accordance with one embodiment of a RWVS.

FIGS. 10, 10A, 10B and 10B show performance characteristics of a RWVS in accordance with one embodiment of the invention.

FIG. 10 shows shearing efficiency of an air knife system as a function of exhaust flow (cfm) and atmosphere exhaust temperature. In this embodiment, the chamber was vertically oriented, had an air knife opening surface area of 0.02 m², the water nozzles were 1.8b and water was flowed into the chamber at 32 liters/minute. As shown, for a fixed flow rate of water, as exhaust flow rate increases (increasing the velocity across the air knife), the exit temperature of water vapor to atmosphere decreases. This indicates that with increasing exhaust gas flow rate, the shearing efficiency of the air knife increases as a decreased atmosphere gas temperature is indicative of a greater amount of water vapor in the atmosphere exhaust.

FIG. 10A shows the backpressure on an exhaust system as a function of exhaust gas flow rate. This graph shows that engine backpressure increases with increased exhaust gas flow rate. Importantly, this graph shows that for a given cross-section of an air knife opening, in this case 0.02 m², that the backpressure on the engine remains within acceptable limits according to normal ICE specifications. That is, with a high exhaust gas flow rate of 4000-4500 cfm at 320° C., total engine backpressure is less than 16" WC.

FIG. 10B shows the evaporation rate of a raw water sample as function of exhaust gas flow rate. This graph shows that with increasing exhaust gas flow rate, the evaporation rate of the raw water increased. In addition, this graph shows that the measured inlet temperature to the chamber was higher with increased gas flow rate, which is typical as the ICE load increase.

Figure 10C:
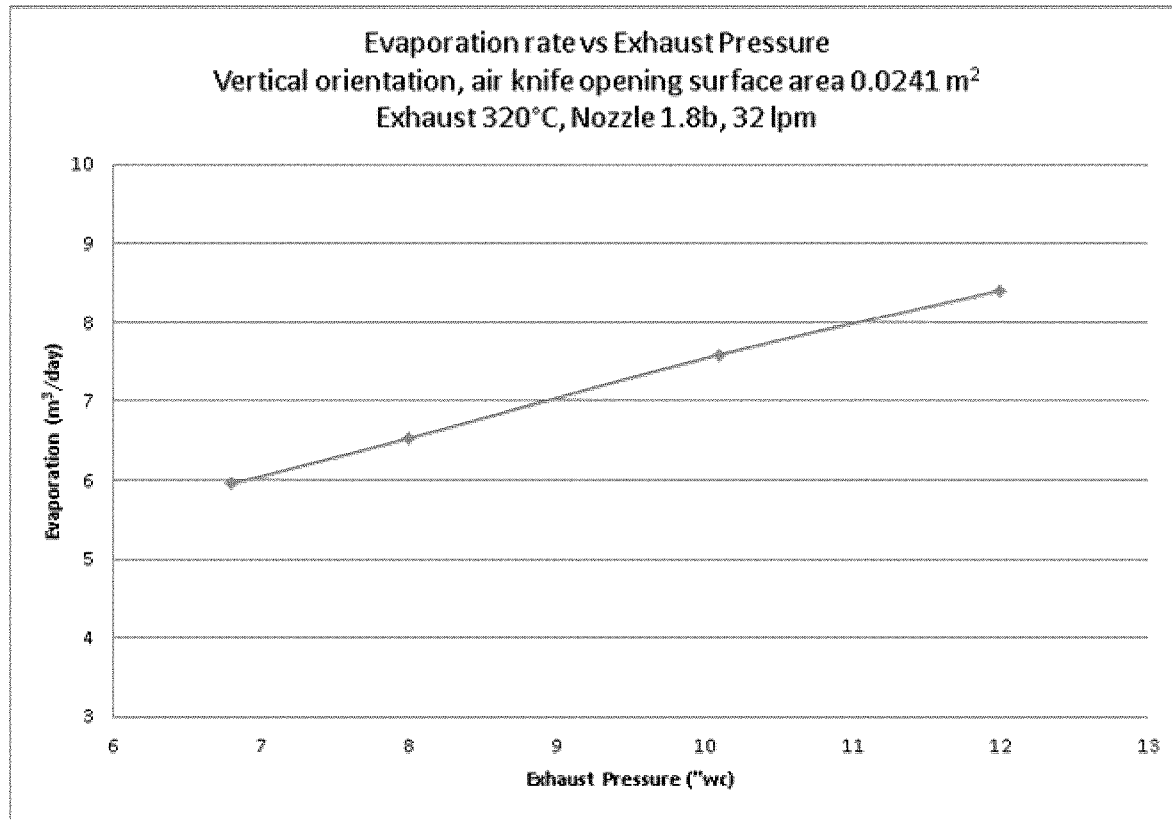
FIG. 10C is a graph showing evaporation rate as a function of exhaust pressure in accordance with one embodiment of a RWVS.

FIG. 10C is a graph showing the effect of exhaust gas pressure on the evaporation rate efficiency through shearing acting on raw water. This graph shows that high rates of raw water evaporation can be achieved while maintaining backpressure on the engine within acceptable limits. That is, in this case raw water evaporation rate of over 8 m³/day can be achieved with a backpressure of about 12" WC for the given fixed parameters of temperature and cross-section of the air knife.

TABLE 3

Backpressures and Velocities for Variable Gas Density, Flow (e.g. Engine load) and Air Knife Cross Sections (500 kW Engine)

| Gas Density (kg/m³) | Flow 80% (cfm) | OD (in) | ID (in) | Cross Section (m²) | Velocity (m/s) | Pressure ("WC) |
|---|---|---|---|---|---|---|
| 0.43 | 3180 | 0.301 | 0.254 | 0.0205 | 73.3 | 4.5 |
| 0.43 | 3180 | 0.301 | 0.258 | 0.0189 | 79.5 | 5.3 |
| 0.43 | 3180 | 0.297 | 0.258 | 0.0170 | 88.3 | 6.6 |
| 0.43 | 3180 | 0.297 | 0.262 | 0.0154 | 97.7 | 8.1 |
| 0.43 | 3180 | 0.293 | 0.262 | 0.0135 | 111.1 | 10.4 |
| | Flow 60% | | | | | |
| 0.48 | 2450 | 0.301 | 0.254 | 0.0205 | 56.4 | 3.0 |
| 0.48 | 2450 | 0.301 | 0.258 | 0.0189 | 61.2 | 3.5 |
| 0.48 | 2450 | 0.297 | 0.258 | 0.0170 | 68.0 | 4.4 |
| 0.48 | 2450 | 0.297 | 0.262 | 0.0154 | 75.2 | 5.3 |
| 0.48 | 2450 | 0.293 | 0.262 | 0.0135 | 85.6 | 6.9 |
| | Flow 40% | | | | | |
| 0.54 | 1750 | 0.301 | 0.254 | 0.0205 | 40.3 | 1.7 |
| 0.54 | 1750 | 0.301 | 0.258 | 0.0189 | 43.7 | 2.0 |
| 0.54 | 1750 | 0.297 | 0.258 | 0.0170 | 48.6 | 2.5 |
| 0.54 | 1750 | 0.297 | 0.262 | 0.0154 | 53.7 | 3.1 |
| 0.54 | 1750 | 0.293 | 0.262 | 0.0135 | 61.1 | 4.0 |

TABLE 4

Evaporation Rates for Variable Loads and Exhaust Gas Temperatures 1200 KW Engine Maximum From Engine

| Load | Flow (cfm) | Temperature (C.) | Evaporation (m3/day) |
|---|---|---|---|
| 30% | 3487 | 275 | 6.2 |
| 35% | 3596 | 307 | 7.1 |
| 40% | 3705 | 340 | 8.0 |
| 45% | 3984 | 352 | 8.8 |
| 50% | 4262 | 365 | 9.7 |
| 55% | 4748 | 375 | 11.0 |
| 60% | 5233 | 385 | 12.3 |

Table 3 shows that for a wide range of engine operating conditions or desired gas velocities at an air knife, backpressure can be maintained within acceptable ranges. Table 4 shows the evaporation rate within a 1200 kW engine as a function of engine load. As shown, as engine load increases from 30% to 60%, each of the gas flow rate, temperature and evaporation rate increased, demonstrating that the system is highly effective and efficient in evaporating waste water.

Other Options

It will be appreciated that there are a large number of factors which affect the operation of the vaporisation chamber and demister. For example, changing the shapes of the outflow orifice (or air knife), the nozzle shape, the shape of the vaporization chamber and demister all affect how the water and gas components will move around and interact with each other. In addition, adding active or passive elements such as fans, stators and rotors can change how well the device performs in terms of vaporisation efficiency, separation of liquid and gas components, or maintenance reduction (by reducing scaling, potential blockages).

Figure 11A:
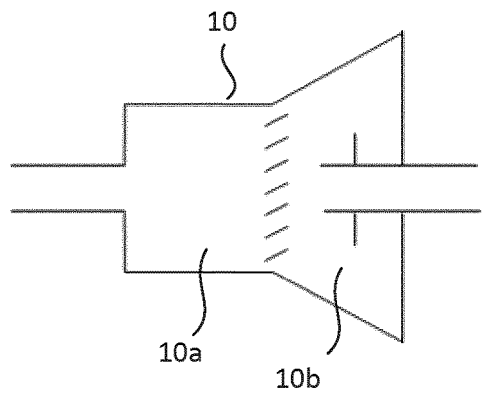
FIGS. 11A-E are schematic diagrams showing various gas inlet, shearing, and demisting configurations in accordance with various embodiments of the invention.

FIG. 11A shows the vaporisation chamber and demister components similar to that of the embodiment of FIG. 2G. In this embodiment, as described above, the shearing chamber 10a is in the form of a cylinder which is positioned on top or upstream of a frustroconical demister section 10b. However, in this case, the exhaust gas is directly introduced into the shearing chamber without being compressed or expanded. This helps reduce the additional backpressure being applied to the combustion gas source by virtue of the vaporization chamber. Therefore, this embodiment may be particularly applicable to combustion gas sources which are sensitive to additional backpressure loads (e.g. flare gas, boiler exhaust stack sources or certain types of engines).

Figure 11B:
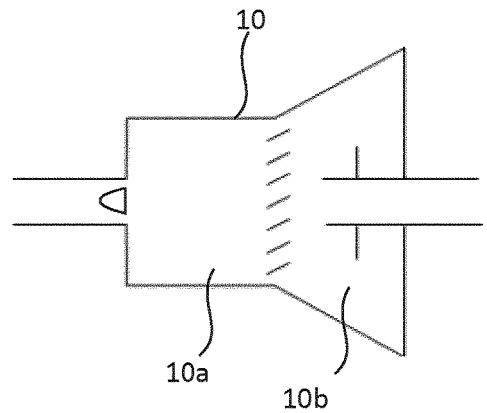

FIG. 11B shows the vaporization chamber and demister components which is the same as that of the embodiment of FIG. 2G in that the gas is directed through a hollow cone air knife outflow orifice. This constriction in the area of the exhaust causes the hot gas to accelerate so that the impact velocity between the gas and the water flow is increased. This increase in velocity can be used to shear the water flow from the nozzle (which may be in droplets or a continuous flow) into smaller droplets. This will increase the surface area of the water to allow the heat energy from the gas to be transmitted to the raw water to effect vaporization (through evaporation, partial boiling and boiling).

In this case, the vaporization chamber can be configured to operate on its side in a horizontal configuration or in a vertical configuration shown in FIG. 2G. It will be appreciated that in the horizontal configuration, gravity will apply a force downwards on the water. However, if the water and exhaust flows are sufficiently high, this configuration can still deflect water along all surfaces of the vaporization chamber to flush dry spots and reduce scaling.

Figure 11C:
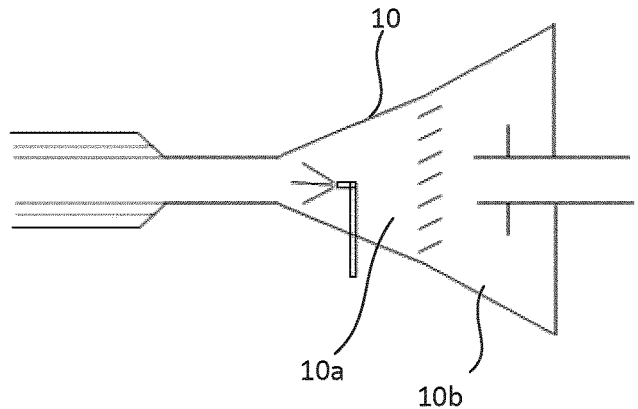

FIG. 11C shows an alternative arrangement in which the vaporization chamber is in the form of a cone. In this case, the cone angle is less than that of the demister section. This shape may help maintain liquid flow across all of the interior surfaces of the vaporization chamber because the interaction region between the liquid and the gas is close to the apex of the cone. In addition, it may help maintain gas velocity by not causing a large drop in cross-sectional area as soon as the gas exits the outflow orifice. Here a full cone or hollow cone water nozzle may be preferable, depending on the orientation of the vessel.

In addition, the outflow orifice shows the constriction in the exhaust may be used to increase the velocity of the hot gas.

Figure 11D:
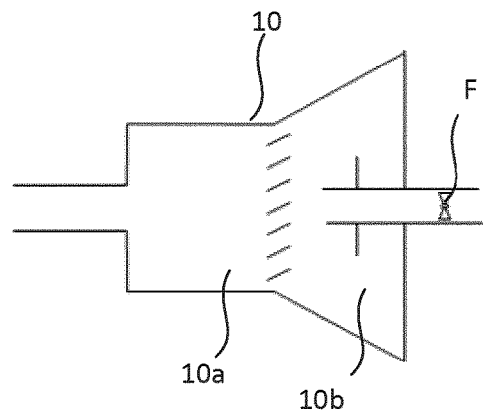
Figure 11E:
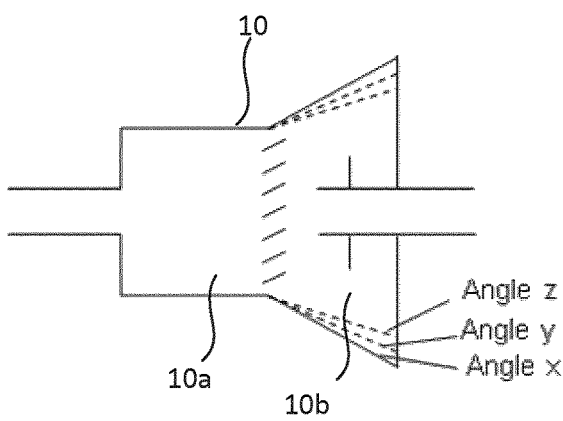

FIGS. 11D and 11E illustrate some parameters in the demister which can affect the performance of the demister. In FIG. 11D, the vaporization chamber and demister is substantially similar to that shown in FIG. 11A in that it comprises a cylindrical vaporization chamber in which hot gas is directed into a flow of raw water to cause vaporization. The vaporization chamber is located coaxially (in-line) with a frustroconical demister section. The vaporization chamber is separated from the demister section by a stator which induces a rotational flow in the exhaust gas and water passing from the vaporization chamber. That is, the water and gas passing from the vaporization chamber spirals downwards (in the vertical orientation) due to the rotational motion induced by the stator causing it to substantially follow the surface of the demister.

Some smaller droplets of water may inadvertently enter the central gas outlet due to becoming re-entrained in the cyclone because the wall of the exit pipe is too close to the interior wall of the cyclone. To counteract this effect, the embodiment of FIG. 11D has a smaller central gas outlet. This reduces the likelihood that water will enter the gas outlet and so improve liquid-gas separation efficiency. In this case, to aid gas flow, the gas outlet may house a blower of fan F to promote gas flow within the outlet (e.g. an axial fan). However, this fan is optional. If used, the blower/fan F can be utilized at a minimum to partially assist with system 10 pressure there by minimizing energy input required to operate the blower. Alternatively, blower F can be utilized at a maximum to provide 100% of the pressure required within vessel 10, thereby consuming greater energy and cost. In various installations one or the other may be more desirable.

Such a fan providing may be used to provide a negative pressure within the demister. By controlling the fan, a negative pressure may also be applied to the vaporization chamber. This may aid evaporation and reduce backpressure on the hot gas source (e.g. flare or engine).

FIG. 11E shows that the angle of the frustroconical demister may be changed. A larger angle (angle x) may provide better separation of the liquid and gas as the liquid will be carried further away from the central gas outlet. However, a narrower angle (angle z) may help ensure that the separated liquid maintains contact with the surface of the frustroconical demister as it travels towards the base of the demister. This may help prevent dry-spots within the demister which may cause scaling issues. It will be appreciated therefore, that there may be an optimum angle which is used which takes advantage of both these effects (e.g. angle y).

In other embodiments the demister can be a cylinder, provided the distance from the interior wall to the exit pipe (or central gas outlet) is sufficient to prevent re-entrainment of water droplets and ensure separated raw water is prevented from crawling up the exterior surface of the exit pipe that would lead to this water crawling over the interior of the exit pipe and out of the system. In a preferred embodiment when connected with a smaller diameter, substantially wetted vaporization chamber, the mist separation vessel increases in diameter towards the back end of the separator to allow the cyclone space to expand. From the entry point of gas into the separator the walls may continue on at 0 degrees (e.g., plain cylinder shape) or up to 45 degrees. In some embodiments, the angle may be 15-20 degrees.

Figure 12A:
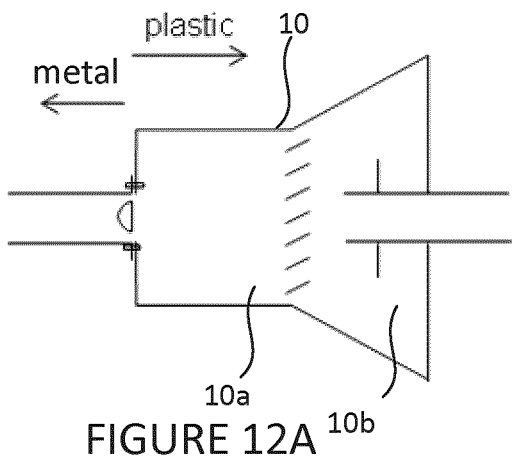
FIG. 12A is a schematic diagram showing an interface between metal and plastic components of a RWVS in accordance with one embodiment of the invention.
Figure 12B:
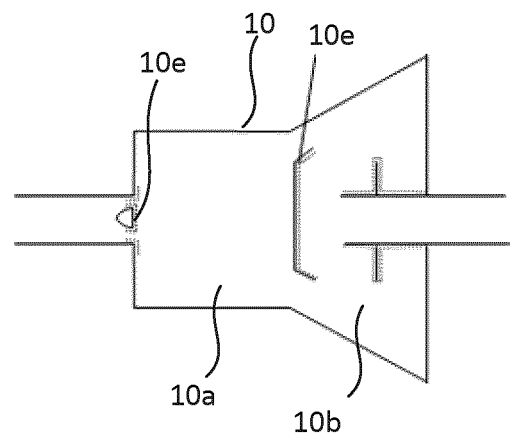
FIG. 12B is a schematic diagram showing representative surfaces of a RWVS that may be coated with hydrophobic, anti-fouling, non-stick surfaces in accordance with one embodiment of the invention.

FIGS. 12A and 12B relate to the materials which may be used to construct or coat the vaporization chamber and demister.

As noted above, because in some embodiments, the combustion gas is directed into the vaporization chamber in such a way to impinge directly into the water flow (rather than first impinging on the chamber interior walls), the vaporization causes the gas to lose heat and temperature very rapidly. This means that when the gas interacts with the interior walls of the vaporization it may be much cooler than the initial hot gas temperature (e.g. less than 100° C.). This allows the vaporization chamber and subsequent components such as the demister to be made or coated in materials which are more sensitive to heat.

FIG. 12A shows an embodiment in which the vaporization chamber and demister are formed from plastic. This may allow the components to be more easily manufactured. It may also allow plastics which are inherently more resistant to scaling problems to be used. In some embodiments, the vaporization chamber or demister may be partially formed from a transparent or translucent material to facilitate inspection (e.g. during operation and without having to open the device). The gas conduit in this embodiment is formed from metal (which may be coated) as the temperature within the gas conduit of certain applications such as engine exhaust may be high (e.g. between 300-500° C.) whereas in other applications such as steam generator exhaust stacks the temperatures may be lower (e.g. between 100-200° C.).

FIG. 12B shows another embodiment which uses polytetrafluoroethylene (PTFE—Teflon®). In this case, PTFE is used to provide non-stick coatings (shown as dotted lines) on elements which may not be as constantly flushed as other surfaces during operation of the device. In this case, these oscillating wet/dry areas may include the area around the outflow orifice, the area under the stator and the area around the central gas outlet. The non-stick property of the PTFE helps prevent the build up of scale within the vaporisation chamber and demister.

Figure 13:
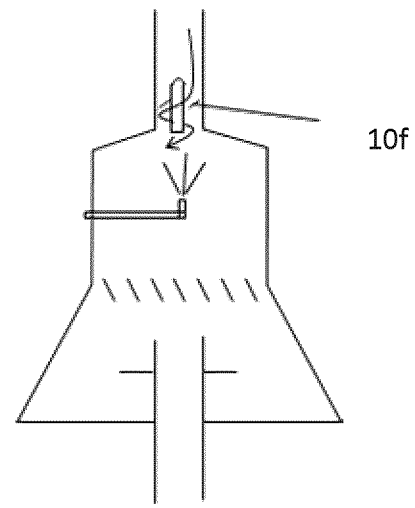
FIG. 13 is a schematic diagram showing an inlet stator of a RWVS in accordance with one embodiment of the invention.

FIG. 13 shows an alternative way of causing the hot gas to interact with the water flow. This embodiment is similar to the embodiment of FIG. 11B in which the gas outflow orifice has an air blade formed by a hollow cone.

In this case, the central obstruction is elongated along a portion of the hot gas conduit forming a slightly elongated channel. Within this channel, in this case, is a stator 10f configured to induce rotational motion in the gas exiting the outflow orifice. It will be appreciated that in other embodiments, the stator may be replaced with a passively driven rotor or fan which may help reduce the backpressure applied to the hot gas source.

Figure 14A:
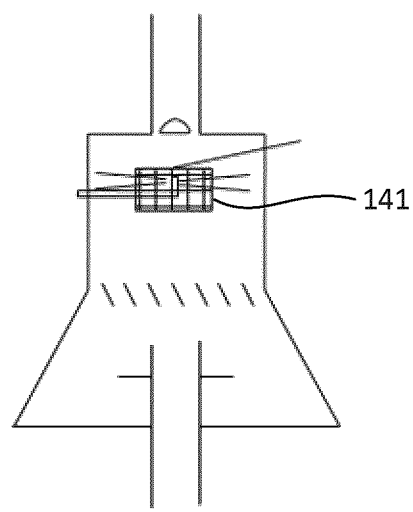
FIG. 14A-C are schematic diagrams showing a RWVS having a mechanical water shearing system in accordance with one embodiment of the invention.
Figures 14B, 14C:
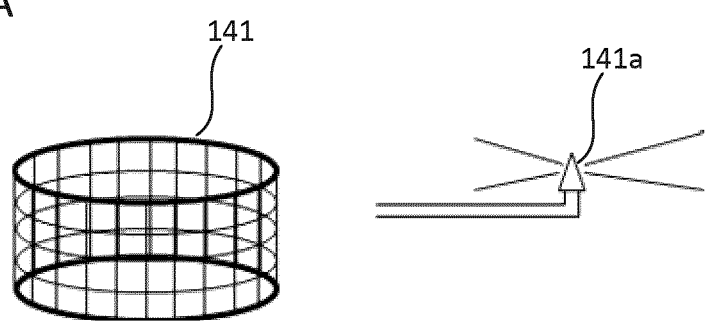

FIGS. 14A-C show an alternative embodiment which uses a mesh 141 located around the water nozzle to cause mechanical shearing of the water as it flows through the mesh. By mechanically shearing the water, the velocity of the gas flow may be reduced as the need for air shearing may be reduced.

In this case, the nozzle 141 is a radial nozzle (detail shown in FIG. 14C) configured to eject water in all directions within a plane (horizontal plane in this case). The mesh (detail shown in FIG. 14B) in this case is an open cylinder which fits over the nozzle such that the water flows through the mesh which breaks up the flow into smaller droplets. It will be appreciated that other nozzle types (e.g. hollow cone, conical) may be used in conjunction with other meshes to cause mechanical shearing.

Figure 15A:
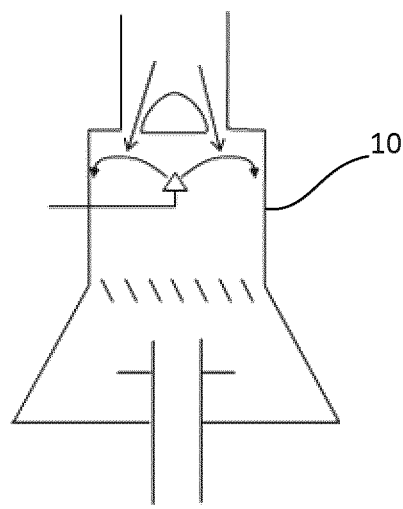
FIGS. 15A-C show additional inlet/shearing embodiments of a RWVS in accordance with various embodiments of the invention.
Figure 15B:
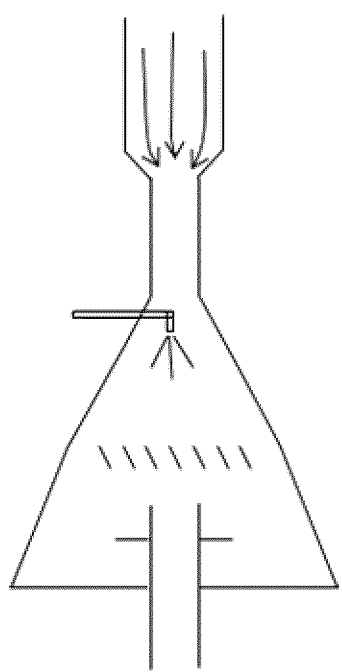

FIGS. 15A and 15B show other ways of causing the raw water to interact with the hot gas.

As described in relation to FIG. 2G, in some embodiments, the gas is configured to cause the water to hit a deflector plate which redirects the un-vaporized portion of the raw water to reflect back up along the interior walls to flush the interior walls and help prevent scaling. In the embodiment of FIG. 15A, another configuration is used. In this case, the flow rate of the water is sufficient so that the water continues and impinges on the interior wall of the vaporization chamber at a position close to the gas outflow orifice. Then through the action of the gas, or by gravity, the water then runs along the walls of the vaporization chamber from the gas outflow orifice towards the demister thereby flushing the interior walls of the vaporization chamber. Because the liquid water flow is already towards the outside of the vaporisation chamber, it continues on the outside of the coaxial (in-line) demisting chamber to also flush the walls of the demister. To prevent the flow from continuing along the base of the demister and up and into the central gas outlet, it is particularly important for this arrangement to have a flange around the gas outlet.

FIG. 15B shows an alternative way of ensuring flushing of the interior walls. In this case, the flow of water and the flow of gas are in the same direction. To ensure flushing of the interior walls, the shape of the vaporization chamber is a cone with the apex positioned at the outflow orifice of the gas conduit. In this case, the air knife is provided by constricting the diameter of the exhaust conduit which results in a central accelerated gas flow.

Figure 15C:
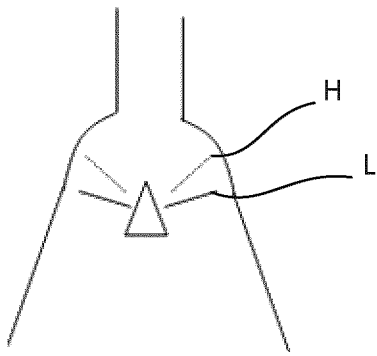

FIG. 15C shows an embodiment in which the relative impact velocity of the water and gas is automatically controlled. Like the embodiment of FIG. 15B, this embodiment has a vaporization chamber which expands away from the gas outlet orifice. This means that the gas velocity decreases in a controlled manner as you move away from the outflow orifice.

In this case, the raw water nozzle is configured to eject water towards the gas outflow orifice. When the gas flow is low, the raw water flow H can continue further towards the outflow orifice where it interacts with the gas before the gas velocity has significantly diminished. In contrast if the gas flow is high, the gas flow forces the water flow L is forced downwards away from the outflow orifice. At this lower level, the velocity of the gas is diminished which means that the interaction speed of the gas and raw water is similar. That is, the shape of the vaporization chamber allows a variation in the absolute velocity of the gas to be compensated for by automatically adjusting the position, or cross-sectional surface area, at which the liquid interacts with the gas. The velocity of the gas as a function of axial distance away from the outflow orifice is controlled by the angle of the interior wall (and cross-section) of the vaporization chamber.

Figure 16:
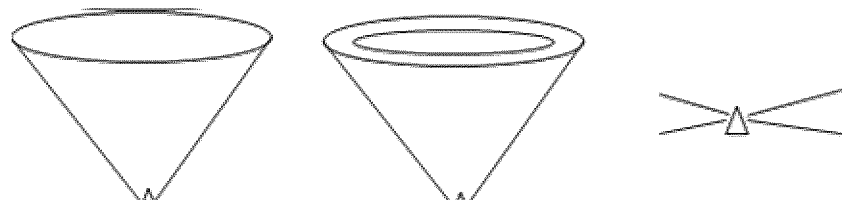
FIG. 16 are schematic diagrams of inlet nozzles with cone and hollow-cone configurations.

FIG. 16 shows a variety of nozzle types including a solid cone, a hollow cone and a radial nozzle (which can be though of as a hollow cone with a cone angle of 180°).

Figure 17A:
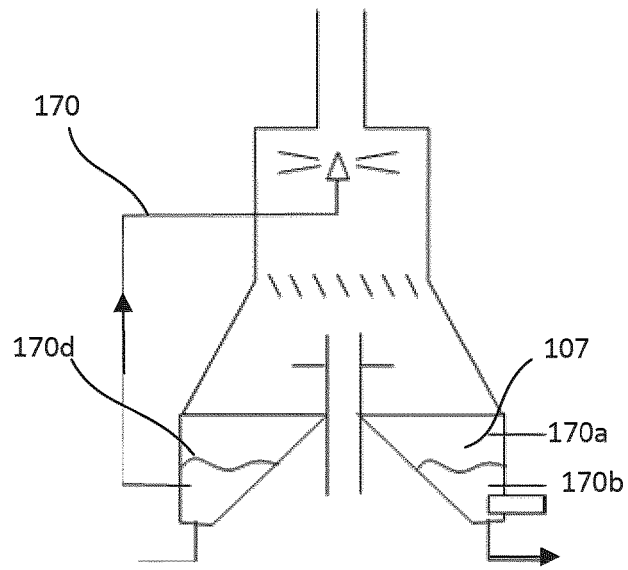
FIGS. 17A and B are schematic diagrams of alternate designs of a RWVS in accordance with alternate embodiments of the invention.
Figure 17B:
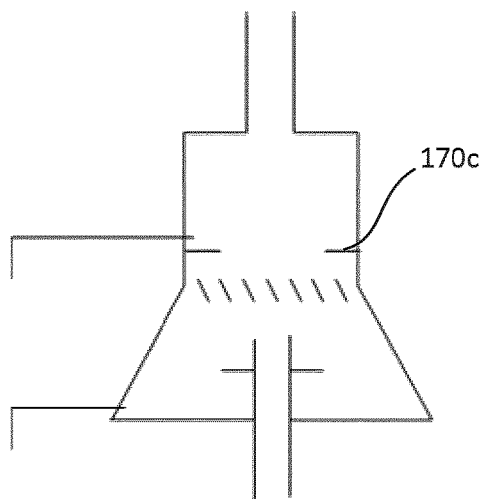

FIGS. 17A and 17B relate to water management within the vaporization chamber and demister.

In previously discussed embodiments, the concentrator tank forms an independent component of the system. However, in FIG. 17A, the concentrator tank 107 is an integral component of the RWVS unit located below the demister. This allows for a more compact design.

As shown in FIG. 17A, there is a raw water conduit 170 driven by pump (e.g. P2) from the concentrator tank which carries the raw water to the nozzle within the vaporization chamber 10a. In this case there is no separate conduit for carrying concentrated raw water from the demister to the concentrator tank because the demister can communicate directly with the concentrator tank.

As before, the concentrator tank includes at least one high-level switch 170a and at least one low-level switch 170b. When the level of the water 170d activates the high-level switch (when the water is above the high level), the pump causes water to be pumped to the nozzle within the vaporization chamber to effect vaporization. When the low-level switch is activated (i.e. the level is below the low level), the pump is activated to introduce new raw water into the concentrator tank. In this case, there is a total dissolved solids (TDS) sensor located within the concentrator tank. When the concentration of the total dissolved solids reaches a predetermined threshold, a controller is configured to drain or pump our brine liquid via P3 (not shown) from the concentrator tank (e.g. to a bulk concentrate tank for disposal or transport off-site).

FIG. 17B shows an alternative way of managing water within the system. In this case, there is a flange 170c extending around the perimeter of the vaporization chamber. This entraps a portion of un-vaporized liquid within the vaporization chamber and removes it from the system to the concentrator. This reduces the quantity of liquid entering the demister which may improve liquid-gas separation efficiency. A separate conduit is configured to remove liquid from the demister. This configuration is particularity effective when vessel 10 is in a horizontal orientation.

Figure 18:
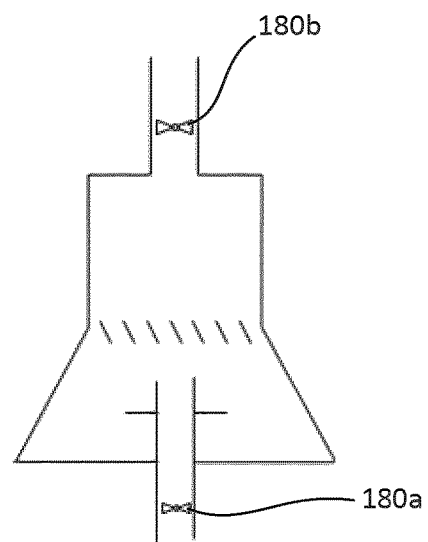
FIG. 18 is a schematic diagram showing both inlet and outlet fans of a RWVS in accordance with various embodiments of the invention.

FIG. 18 shows how pressure may be controlled within the demister and vaporization chamber using fans or blowers. As shown in FIG. 18, fans 180a, 180b can be located in the gas conduit or in the gas outlet or both. A fan in the gas conduit will have the effect of pushing gas into the vaporization chamber thereby increasing the pressure within the vaporization chamber and demister (i.e. a 'push' pressure). In contrast, a fan in the gas outlet will have the effect of removing gas from the vaporization chamber thereby reducing the pressure within the vaporization chamber and demister (i.e. a pull pressure). In either case, the effect of the one or more fans is to reduce the backpressure on the gas source (e.g. flare, boiler exhaust or engine).

Figure 19:
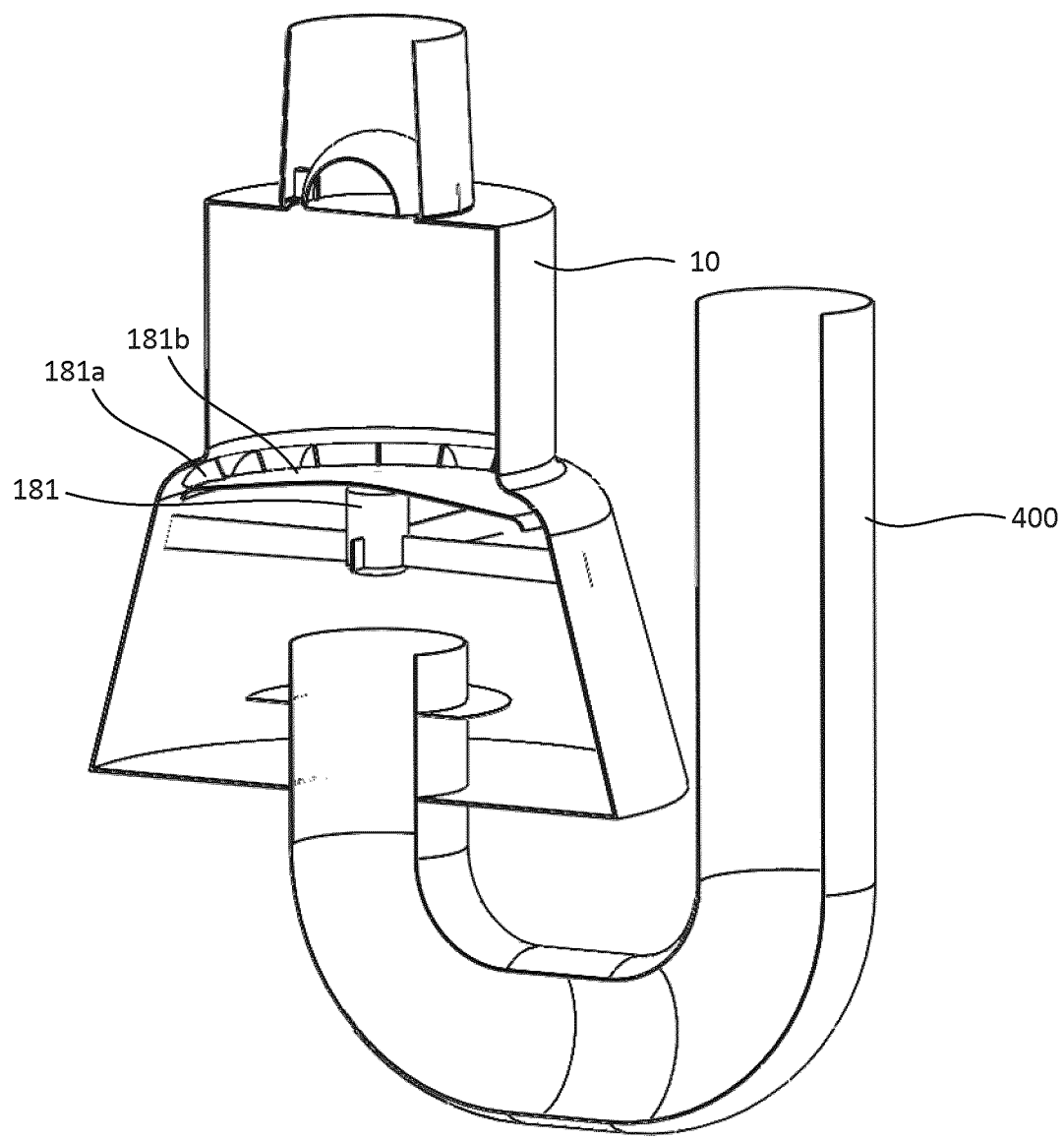
FIG. 19 is cross-sectional view of a shearing and demisting chamber with an induction rotor in accordance with one embodiment of the invention.

FIG. 19 shows a still further embodiment where the shearing chamber and demisting chamber are separated by an actively driven induction system. In this case, a motor 181 drives a series of blades 181a to draw gas with entrained mist into the demisting chamber and to impart centrifugal forces on the gas. In one embodiment, as shown, the induction system includes a rotating domed plate 181b that allows water to drain toward the outer edges of the domed plate and into the blades. In addition to assisting in the demisting process, this embodiment can also be used to control pressure and flow rates within the system.

In a still further embodiment, the system may be controlled to allow salts to precipitate during the concentration process. In this case, salt crystals may collect and settle within the concentrator tank 107 which may be removed by an appropriate screw auger or similar system.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method for optimizing raw water vaporization from a plurality of distributed raw water sources amongst a plurality of distributed raw water vaporization systems, combustion gas sources and/or engine exhaust systems, where each raw water vaporization system is connected to a combustion gas source and where each distributed raw water source and distributed raw water vaporization system has a known geographical location, comprising the steps of:
   a. monitoring a volume of raw water at each raw water source location;
   b. monitoring and/or calculating an amount of available heat energy at each raw water vaporization system location and determining a capacity for raw water vaporization, based on the amount of available heat/energy;
   c. determining a distance and an estimated time of moving raw water from a first raw water source location to a raw water vaporization system location;
   d. utilizing the distance and estimated time between the raw water source location and the raw water vaporization system location and correlating the estimated time to a transportation factor or other resource consumption factor; and
   e. mobilizing transportation equipment to move raw water if the estimated time of moving the raw water is below a pre-determined threshold when correlated to the transportation factor or other resource consumption factor.

2. A method for distributed management of raw water and combustion gas as a means of maximizing resource utilization comprising the steps of:
   establishing at least one physical or virtual hub to receive raw water or other resource or waste inputs from members, member sites and/or sites within a network of raw water generators, resource consumers or waste collectors;
   analyzing utilization data of the sites within the network to determine any locations with excess raw water evaporation availability;
   analyzing location data regarding transport equipment and transport equipment personnel of the sites within the network;
   using the utilization data and the location data to determine whether distribution or redistribution of raw water within the network would result in both excess raw water evaporation availability and excess combustion gas use being reduced; and
   distributing or redistributing the raw water within the network if it is determined that distribution or redistribution would result in both excess raw water evaporation availability and excess combustion gas use being reduced.

3. The method as in claim 2 wherein the at least one physical or virtual hub communicates utilization data to members within a group.

4. A method for optimizing raw water vaporization, the method comprising the steps of:
   determining an amount of raw water needed to be evaporated at each of a plurality of distributed raw water sources;
   determining an amount of available heat energy at each of a plurality of vaporization systems;
   determining a capacity for raw water vaporization based on the amount of available heat energy;
   determining a distance and an estimated time of moving raw water from each of the plurality of distributed raw water sources to each of the plurality of vaporization systems;
   correlating one of the distance and estimated time between each raw water source and each raw water vaporization system to a resource consumption factor;
   determining if any of the resource consumption factors is below a pre-determined threshold;
   moving the raw water from one raw water source to one raw water vaporization system if a corresponding resource consumption factor is below the pre-determined threshold.

* * * * *